United States Patent
Wang et al.

(10) Patent No.: US 12,160,402 B2
(45) Date of Patent: Dec. 3, 2024

(54) METHODS, ARCHITECTURES, APPARATUSES AND SYSTEMS DIRECTED TO MESSAGING THROUGH BLOCKCHAIN NETWORKS

(71) Applicant: InterDigital Patent Holdings, Inc., Wilmington, DE (US)

(72) Inventors: Chonggang Wang, Princeton, NJ (US); Xu Li, Plainsboro, NJ (US); Paul Russell, Lawrence, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/011,924

(22) PCT Filed: Jun. 30, 2021

(86) PCT No.: PCT/US2021/040024
§ 371 (c)(1),
(2) Date: Dec. 21, 2022

(87) PCT Pub. No.: WO2022/006361
PCT Pub. Date: Jan. 6, 2022

(65) Prior Publication Data
US 2023/0239264 A1    Jul. 27, 2023

Related U.S. Application Data

(60) Provisional application No. 63/045,852, filed on Jun. 30, 2020.

(51) Int. Cl.
*H04L 51/216* (2022.01)
*G06F 16/27* (2019.01)

(52) U.S. Cl.
CPC ............ *H04L 51/216* (2022.05); *G06F 16/27* (2019.01)

(58) Field of Classification Search
CPC ......... H04L 51/216; H04L 9/00; H04L 63/00; G06F 16/27; G06F 16/182
See application file for complete search history.

(56) References Cited

U.S. PATENT DOCUMENTS

| | | | |
|---|---|---|---|
| 7,877,511 B1 | 1/2011 | Berger et al. | |
| 10,299,128 B1 | 5/2019 | Suthar et al. | |
| (Continued) | | | |

FOREIGN PATENT DOCUMENTS

| | | | |
|---|---|---|---|
| CN | 110619317 A | 12/2019 | |
| CN | 111885133 A | 11/2020 | |
| (Continued) | | | |

OTHER PUBLICATIONS

3rd Generation Partnership Project; Technical Specification Group Services and System Aspects; Study on application layer support for Factories of the Future in 5G network; (Release 17), 3GPP TR 23.745 V0.8.0, May 2020, 36 pages.

(Continued)

*Primary Examiner* — Glenton B Burgess
*Assistant Examiner* — Jihad K Boustany
(74) *Attorney, Agent, or Firm* — Julian F. Santos

(57) ABSTRACT

Procedures, methods, architectures, apparatuses, systems, devices, and computer program products directed to messaging through blockchain networks are provided. Among such methods is a method that may be implemented in a device comprising circuitry, including a transmitter, a receiver and a processor, and may include any of receiving a request to send a message including a message and information indicating a source of the message, a destination of the message and a distributed ledger system; determining a first node associated with a distributed ledger system based, at least in part, the information indicating the distributed ledger system and the information indicating the (Continued)

General Workflow of a Blockchain System destination; generating a transaction for the message; and sending the transaction to a second node of the distributed ledger system.

20 Claims, 38 Drawing Sheets

(56) References Cited

U.S. PATENT DOCUMENTS

| | | | |
|---|---|---|---|
| 10,884,810 | B1 | 1/2021 | Verma et al. |
| 11,200,569 | B1* | 12/2021 | James .................. G06Q 20/381 |
| 2018/0121909 | A1 | 5/2018 | Christidis et al. |
| 2018/0225640 | A1 | 8/2018 | Chapman et al. |
| 2019/0182254 | A1 | 6/2019 | Christidis et al. |
| 2019/0278852 | A1 | 9/2019 | Jayachandran et al. |
| 2019/0280878 | A1 | 9/2019 | Xia |
| 2019/0373521 | A1 | 12/2019 | Crawford |
| 2020/0007513 | A1* | 1/2020 | Gleichauf ............. G06F 21/105 |
| 2020/0034839 | A1* | 1/2020 | Soundararajan ... G06Q 20/4014 |
| 2020/0092084 | A1 | 3/2020 | Maroney et al. |
| 2020/0143466 | A1* | 5/2020 | Wu ........................ H04L 9/3239 |
| 2020/0195495 | A1 | 6/2020 | Parker et al. |
| 2020/0219045 | A1 | 7/2020 | Kikinis |
| 2020/0374974 | A1 | 11/2020 | Sun et al. |
| 2020/0396065 | A1 | 12/2020 | Gutierrez-Sheris |
| 2021/0075610 | A1* | 3/2021 | Covaci .................. H04L 9/3066 |
| 2021/0126771 | A1* | 4/2021 | Bae ....................... G06F 21/602 |
| 2021/0136042 | A1 | 5/2021 | Wang et al. |
| 2021/0160312 | A1 | 5/2021 | Yang |
| 2021/0320926 | A1* | 10/2021 | Shina .................... H04L 63/102 |
| 2021/0406871 | A1* | 12/2021 | Ravinathan ........... H04L 9/3247 |
| 2022/0172180 | A1* | 6/2022 | Komiyama ............ G06F 21/64 |
| 2022/0337436 | A1* | 10/2022 | Beaudet ............... G06F 9/45558 |
| 2023/0206199 | A1* | 6/2023 | Chua .................... H04L 9/3239 705/64 |
| 2023/0245117 | A1* | 8/2023 | Higgins ................... H04L 9/50 705/39 |

FOREIGN PATENT DOCUMENTS

| | | |
|---|---|---|
| WO | WO 2019217428 A1 | 11/2019 |
| WO | WO 2022006320 A1 | 1/2022 |
| WO | WO 2022006324 A1 | 1/2022 |
| WO | WO 2022197650 A1 | 9/2022 |

OTHER PUBLICATIONS

Permissioned Distributed Ledger (PDL); Application Scenarios, ETSI GR PDL 003 V1.1.1, Dec. 2020, 38 pages.
English Language Abstract, Chinese Publication No. 110619317, Dec. 27, 2019, 1 page.
3rd Generation Partnership Project; Technical Specification Group Services and System Aspects; Study on support of the 5GMSG Service; (Release 17), 3GPP TR 23.700-24 V0.1.0 Aug. 2019, 13 pages.
Lu Yunlong et al: "Blockchain and Federated Learning for 5G Beyond", IEEE Network, IEEE Service Center, vol. 35, No. 1, Dec. 20, 2020, 7 pages.
3rd Generation Partnership Project; Technical Specification Group Services and System Aspects; 5G System (5GS) Location Services (LCS); Stage 2, (Release 16), 3GPP TS 23.273 V16.3.0, Mar. 2020, 94 pages.
3rd Generation Partnership Project; Technical Specification Group Services and System Aspects; Policy and charging control framework for the 5G System (5GS); Stage 2, (Release 16), 3GPP TS 23.503 V16.4.1, Apr. 2020,115 pages.
3rd Generation Partnership Project; Technical Specification Group Services and System Aspects; 5G System (5GS) Location Services (LCS); Stage 2, (Release 16), 3GPP TS 23.273 V16.0.0, Jun. 2019, 86 pages.
3rd Generation Partnership Project; Technical Specification Group Services and System Aspects; Study on application layer support for Unmanned Aerial Systems (UAS); (Release 17), 3GPP TR 23.755 V0.7.0 Apr. 2020, 19 pages.
Qiong Zhang et al.: "Demo: A Blockchain Based Protocol for Federated Learning", IEEE 28th International Conference on Network Protocols (ICNP), 13-Oct. 2020, 2 pages.
"O-RAN Architecture Description", O-RAN.WG1.O-RAN-Architecture-Description-v02.00, version 02.00.07, O-RAN Alliance, Jul. 2020, 28 pages.
English Language Abstract, Chinese Publication No. 111885133, Nov. 3, 2020, 1 page.
"Guidelines on writing a CR", 3GPP Tdoc S1-220008, 3GPP TSG SA1#97e, e-meeting, Feb. 14-24, 2022, 12 pages.
3rd Generation Partnership Project; Technical Specification Group Radio Access Network;NG Radio Access Network (NG-RAN); Stage 2 functional specification of User Equipment (UE) positioning in NG-RAN; (Release 16), 3GPP TS 38.305 V16.0.0, Mar. 2020, 107 pages.
3rd Generation Partnership Project; Technical Specification Group Services and System Aspects; Procedures for the 5G System (5GS); Stage 2, (Release 16), 3GPP TS 23.502 V16.4.0, Mar. 2020, 213 pages.
3rd Generation Partnership Project; Technical Specification Group Services and System Aspects; System architecture for the 5G System (5GS), 3rd Generation Partnership Project (3GPP), Stage 2, Release 16, 3GPP TS 23.501 V16.4.0, Mar. 2020, 430 pages.
3rd Generation Partnership Project; Technical Specification Group Services and System Aspects; Architecture enhancements for 5G System (5GS) to support network data analytics services (Release 16), 3GPP TS 23.288 V16.3.0, Mar. 2020, 62 pages.

* cited by examiner

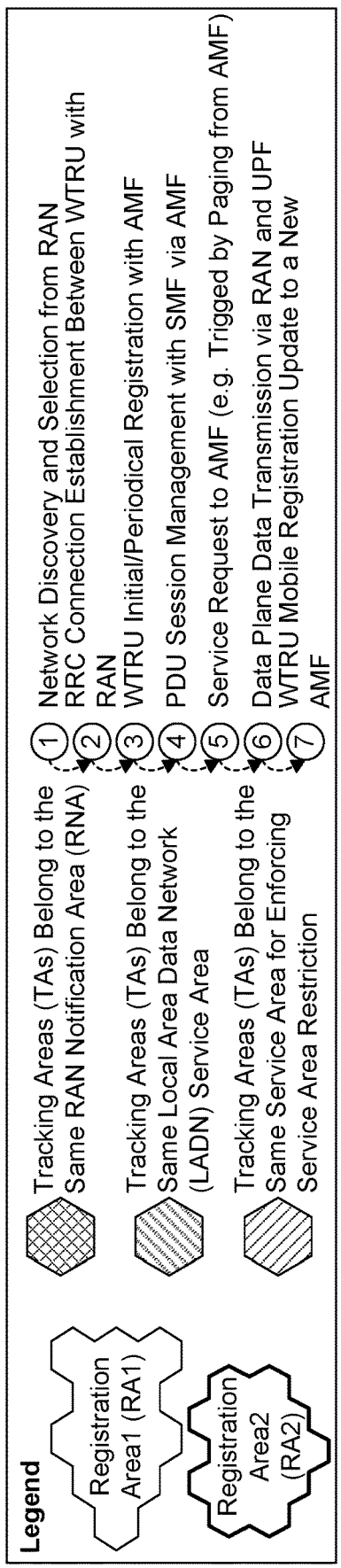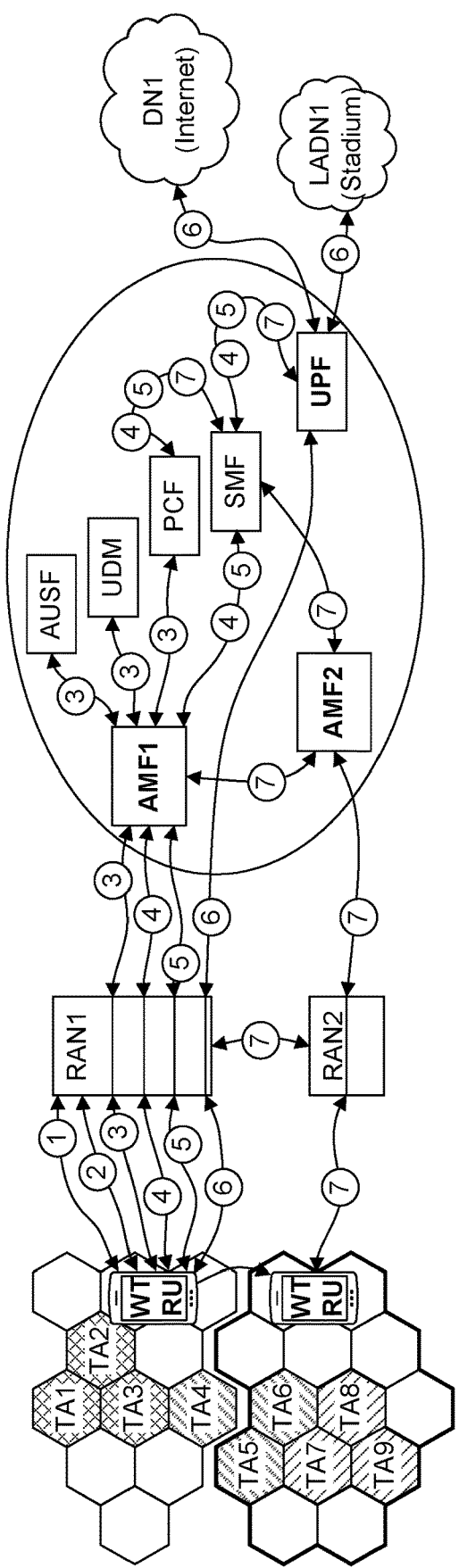
FIG. 5
General Procedures in 5G System Architecture

Policy Control Architecture for Non-Session Management

Policy Control Architecture for Session Management

5G Data Storage Architecture

Smart Manufacturing and Logistics

Examples of Messaging through Blockchain Networks

Sender-Initiated Unicast Blockchain Session Establishment

BCS-CONTEXT: Context Information of A Blockchain Session

BCS-CONTEXT-P1 (Blockchain-Exposable)

| | |
|---|---|
| BCS-ID: | The Identifier of this Blockchain Session |
| BCS-TYPE: | The Type of this Blockchain Session |
| BCS-LIFETIME: | The Lifetime Set for this Blockchain Session |
| S-BMS-ID: | The Identifier of the BMS as a Sender for this Blockchain Session |
| R-BMS-ID: | The Identifier of All BMSs as a Receiver for this Blockchain Session |
| S-BCN-ID: | The Identifier of the BCN as a Sender for this Blockchain Session |
| R-BCN-ID: | The Identifier of All BCNs as a Receiver for this Blockchain Session |
| TXN-TYPE: | The Type of Transactions to be Sent Over this Blockchain Session |
| BNWK-NAME: | The Name/Identifier of the Target Blockchain Network that this Blockchain Session will be Carried Over |
| APP-TYPE: | The Type of Application to Use This Blockchain Session |

Stored at BCNs/ BSCSF

BCS-CONTEXT-P2 (Privacy-Protected)

| | |
|---|---|
| S-APP-ID: | The Identifier of the BCA or the BNA as a Sender of This Blockchain Session |
| S-DEVICE-ID: | The Identifier of the Device which Hosts the BCA or the BNA as a Sender |
| R-APP-ID: | The Identifier of All BCAs and/or BNAs as a Receiver of this Blockchain Session |
| R-DEVICE-ID: | The Identifier of All Devices which Hosts BCAs or the BNAs as a Receiver |

Stored at BMSs/ BSCSF

Context Information of a Blockchain Session

FIG. 14

An Implementation Example of Sender-Initiated Unicast Blockchain Session Establishment in 5GS BMS-Initiated Unicast Blockchain Session Establishment An Example Format of Preliminary Transactions Generated by a BMS for a Target Blockchain Network

| TXN-TYPE | APP-TYPE | BCS-ID (Optional) | R-BCN-ID (Optional) |
|---|---|---|---|
| | | | |

Blockchain Application Header (braces over BCS-ID and R-BCN-ID)

Original Message (from a BCA or a BNA)

Fields Specific to the Target Blockchain Network

FIG. 20

An Example Format of Blockchain Transactions Generated by a BCN for a Target Blockchain Network BMS-Initiated Blockchain Session Cancellation 5G System Architecture Extension A with Blockchain Messaging Enablement 5G System Architecture Extension B with Blockchain Messaging Enablement WTRU-Initiated Blockchain Session Establishment in 5GS with Data Path Configuration ＃ METHODS, ARCHITECTURES, APPARATUSES AND SYSTEMS DIRECTED TO MESSAGING THROUGH BLOCKCHAIN NETWORKS

CROSS REFERENCE TO RELATED APPLICATIONS

This application is a U.S. National Stage Application under 35 U.S.C. § 371 of International Patent Application No. PCT/US2021/040024, filed Jun. 30, 2021, which claims the benefit of priority to U.S. Provisional Patent Application No. 63/045,852 filed Jun. 30, 2020, which is incorporated herein by reference.

BACKGROUND

This application is related to wired and/or wireless communications, including, for example, procedures in connection with messaging through blockchain networks.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 5 illustrates various procedures in a 5GS;

FIG. 14 illustrates example context information of a blockchain session;

FIG. 20 illustrates an example format of blockchain transactions generated by a BCN for a target blockchain network;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
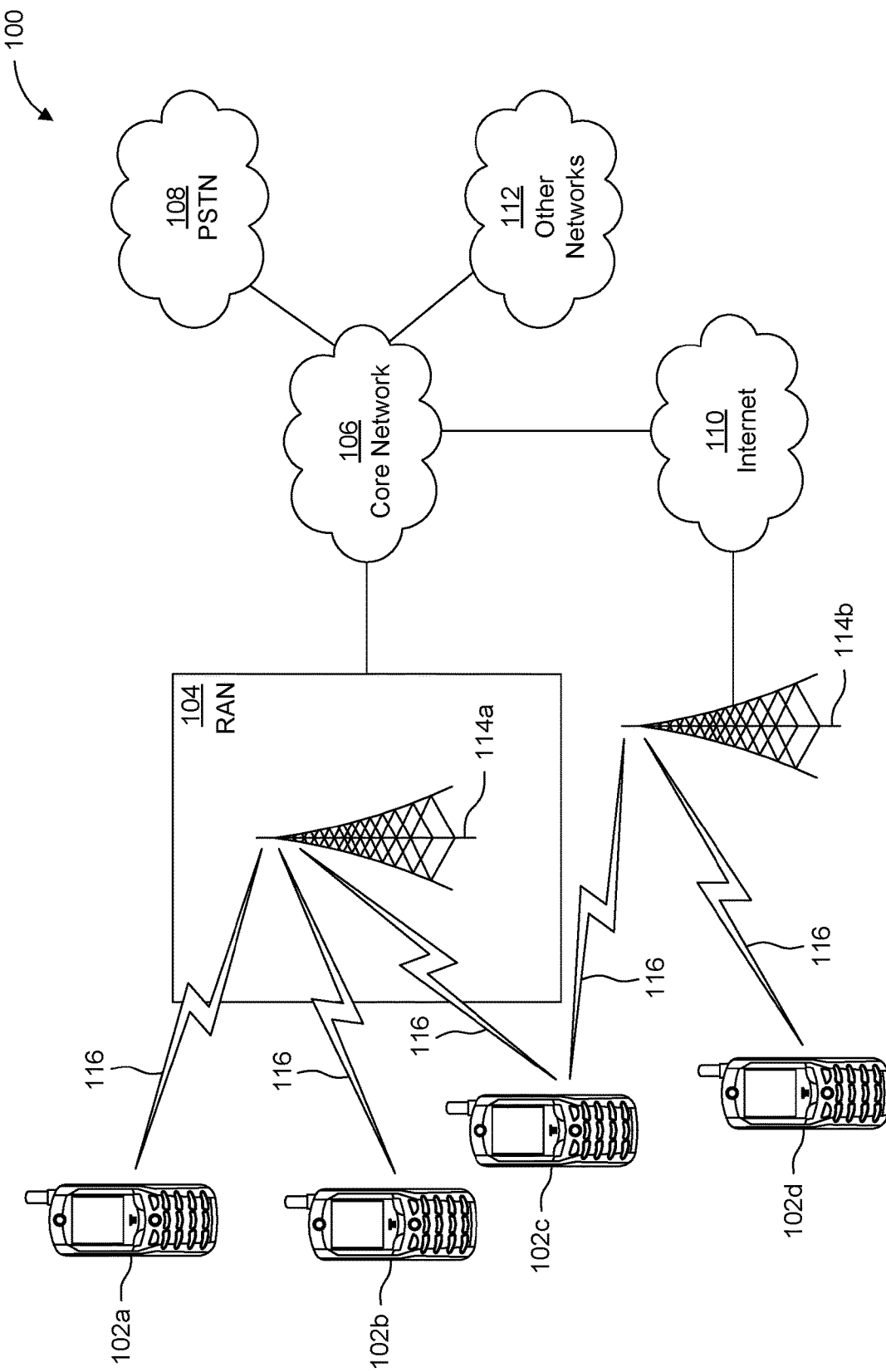
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
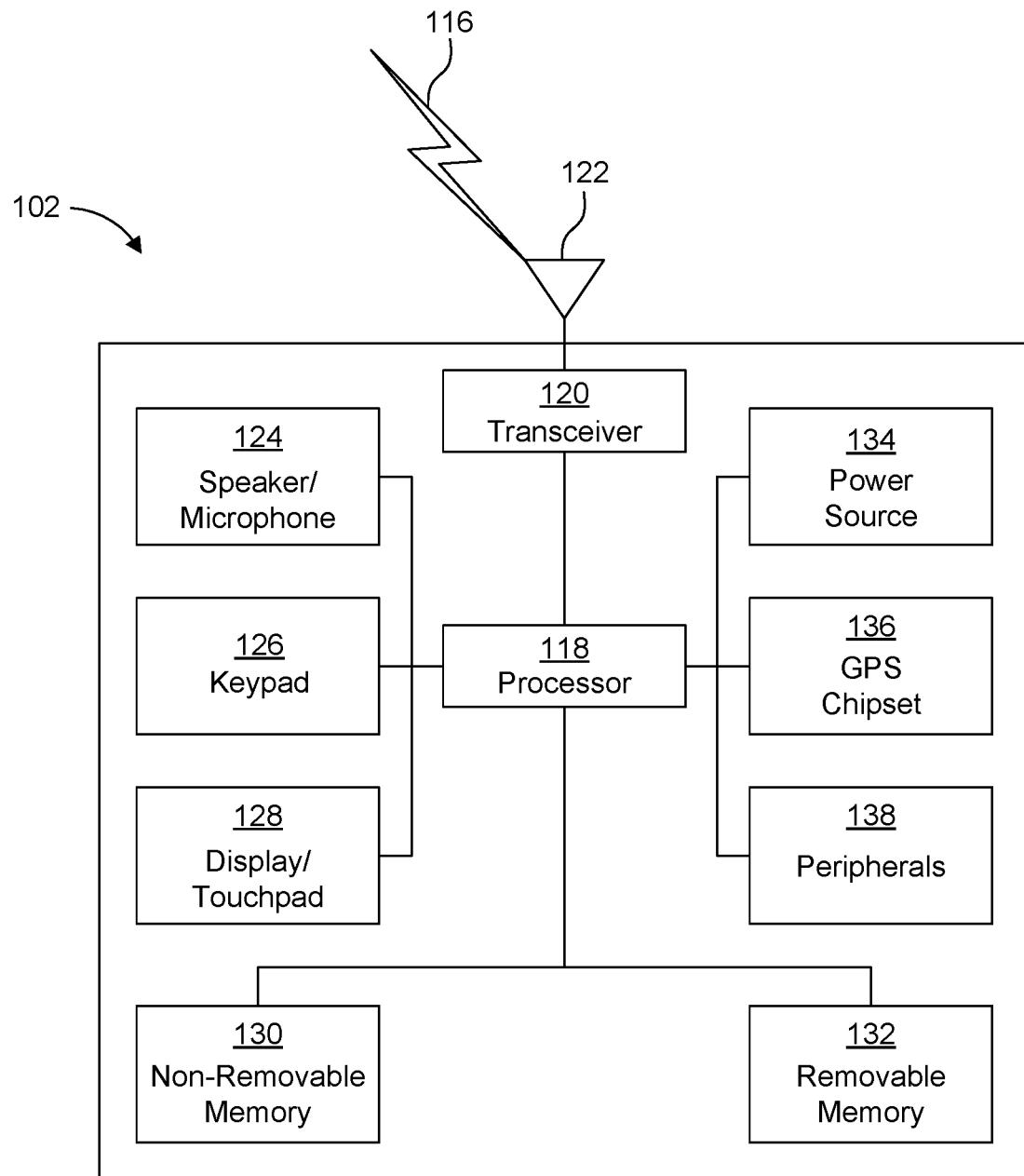
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
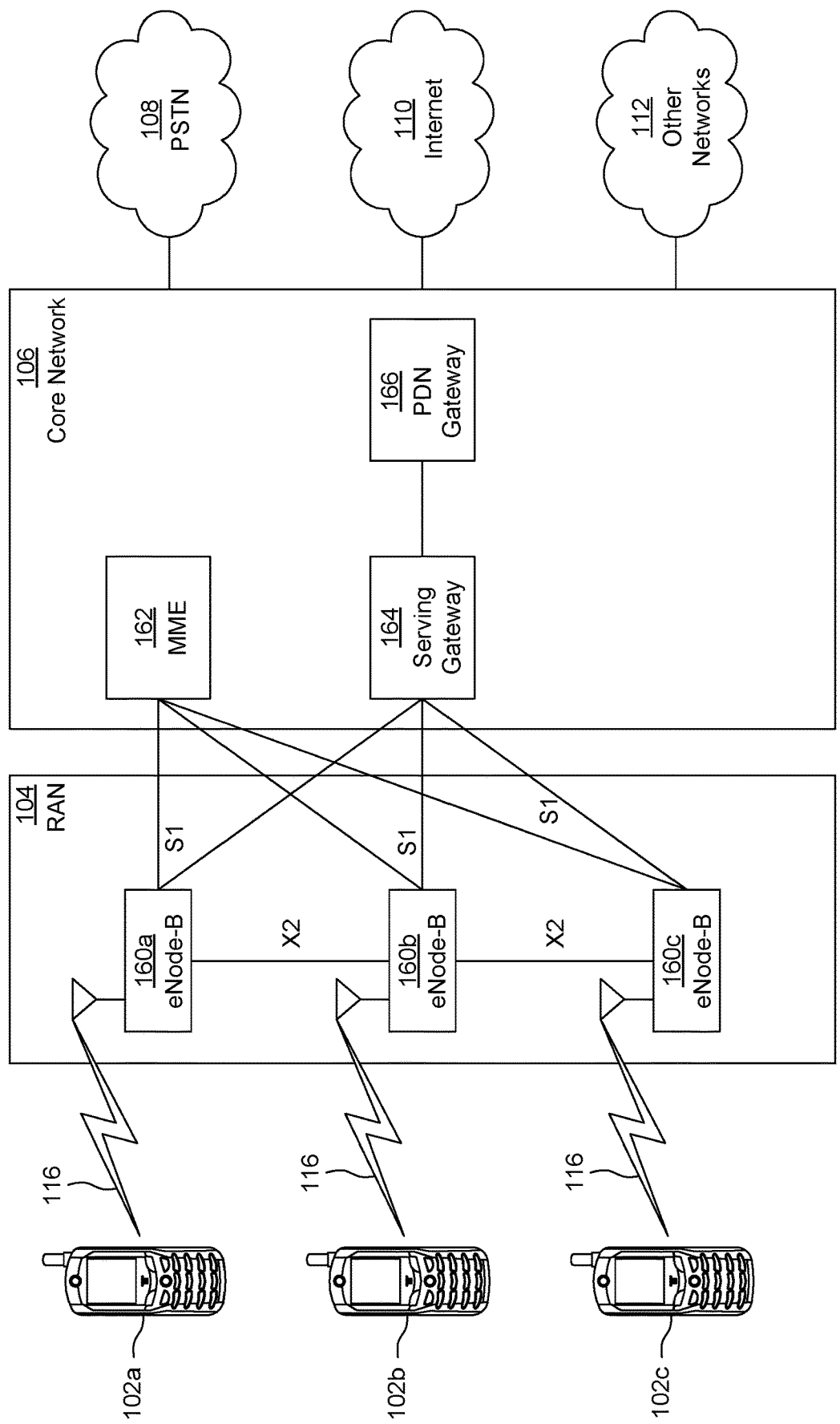
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging and/or mobile termination when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
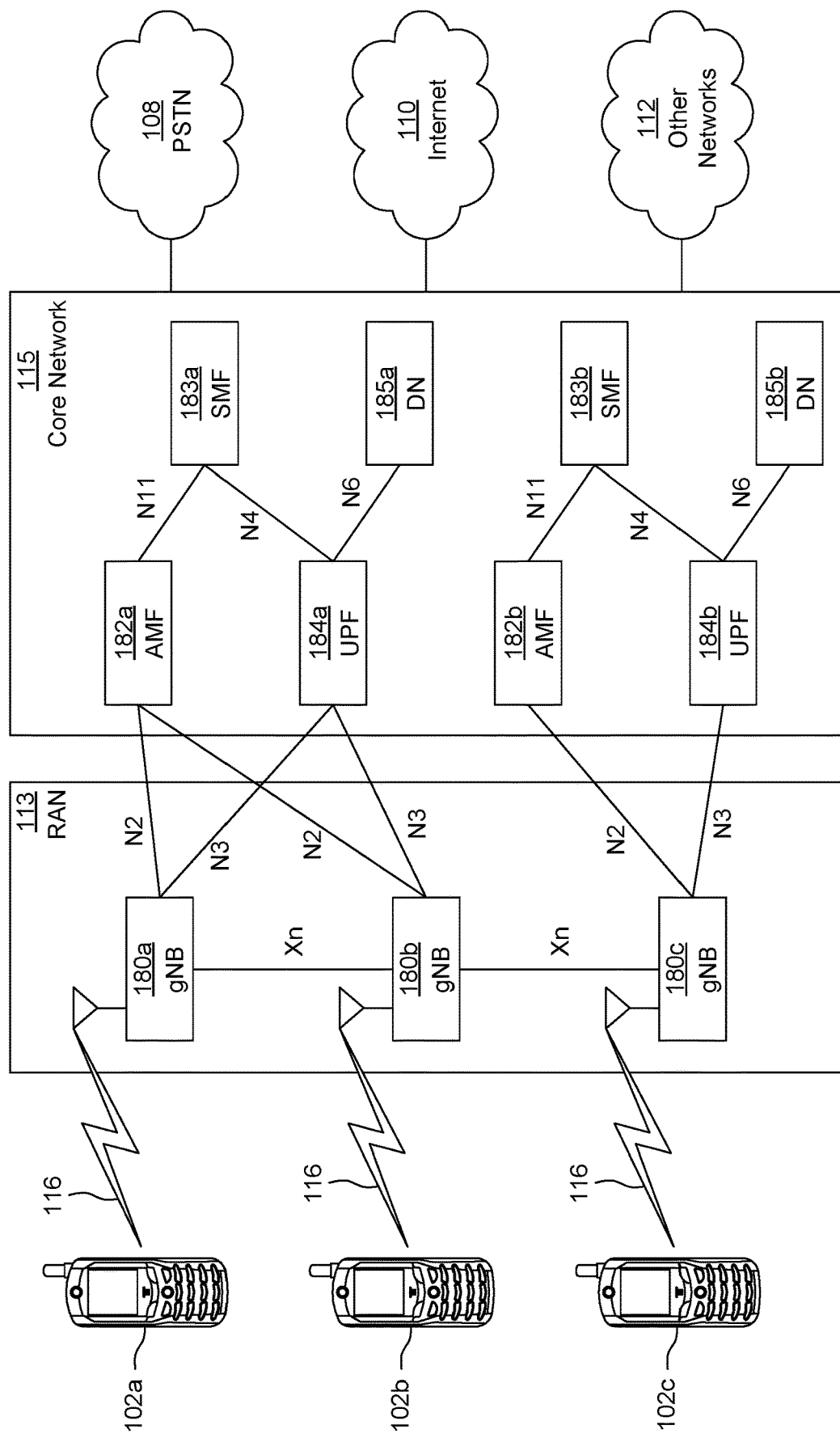
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

Blockchain Technology

Blockchain technology jointly uses and builds on top of various existing techniques, such as cryptography, hashing, Merkle tree, distributed ledgers, peer-to-peer (P2P) networking and consensus protocols. Blockchain technology innovatively combines such existing technologies to enable a system that can provide advanced features such as decentralization, immutability, transparency, and security.

A blockchain system is one in which blockchain technology is used. Applications supported by a blockchain system are referred to as blockchain applications. A blockchain system is underpinned by one or more underlying blockchain networks. Each blockchain network may include a plurality (e.g., many) participating blockchain nodes (BCN). Each BCN may host one or more distributed blockchains (a form of distributed ledgers), broadcast blocks using P2P networking, and perform consensus protocols with the other BCNs of the blockchain network to reach distributed trust and data consensus without relying on a centralized party.

A blockchain transaction may be any of a digital representation of a real-world transaction, a digital record of physical assets, a digital record of a physical event, a digital record of any action in an information system, a digital payment and a digital smart contract. A block groups multiple blockchain transactions together. A blockchain is a data structure to chain a growing number of blocks.

For simplicity of exposition, the terms "blockchain technology" are used herein. It should be understood that such terms also represent much broader distributed ledger technology. As such, the various embodiments are applicable to any specific blockchain technology and/or distributed ledger technology.

Figure 2:
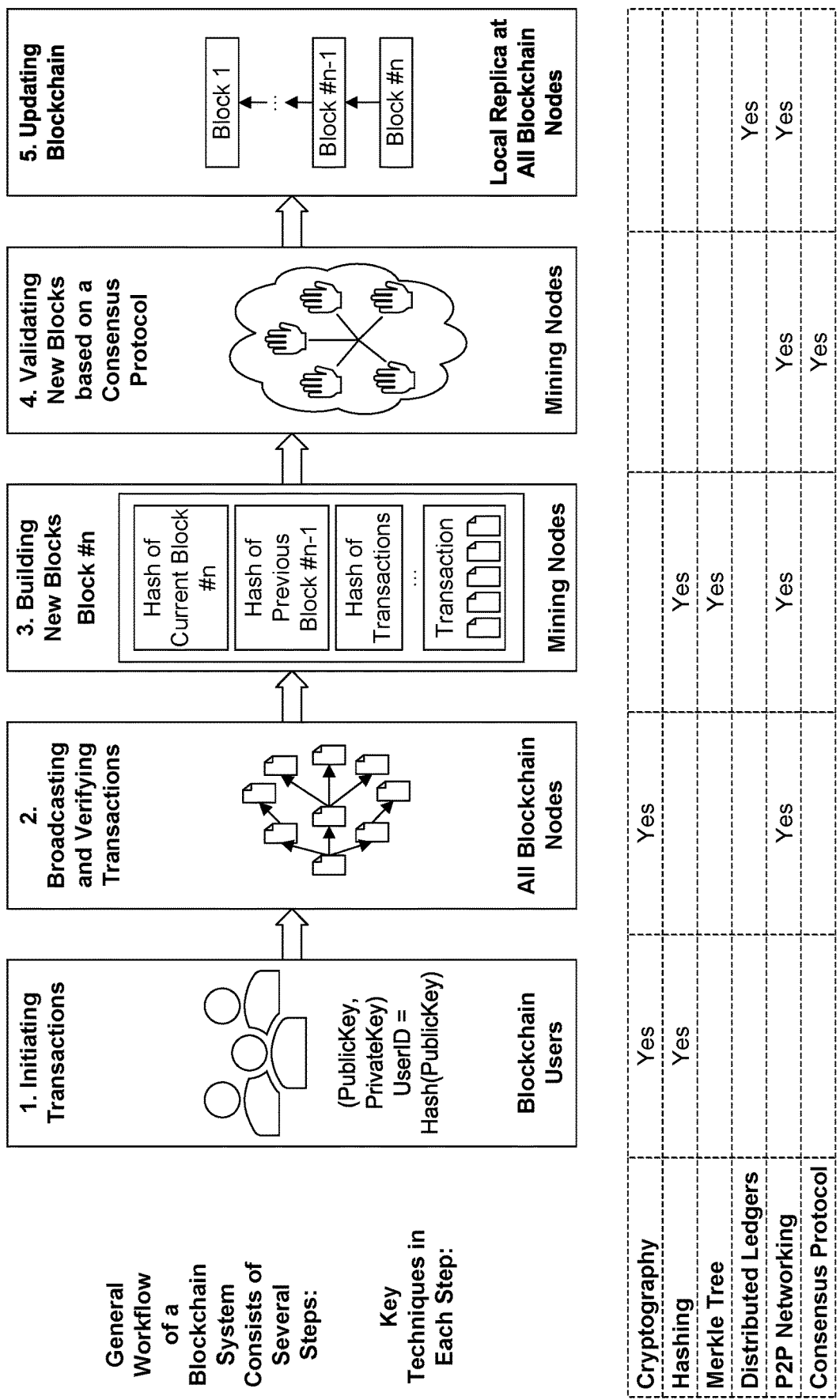
FIG. 2 illustrates an example workflow of a blockchain system.

FIG. 2 illustrates an example workflow of a blockchain system. The workflow may include initiating transactions (1), broadcasting and verifying transactions (2), building new blocks (3), validating new blocks based on a consensus protocol (4) and updating a blockchain (5).

Initiating transactions: Each participating user may generate new transactions independently. Each user may have a user identifier and/or account identifier. The user identifier and/or account identifier may be a hash of a public key of a user ("user's public key"). Each new transaction is signed using the user's private key. After a new transaction is generated, the user may send it to the blockchain network.

Broadcasting and verifying transactions: A new transaction may be received by some BCNs. The transaction may include the user's public key. The BCNs may verify its integrity using the user's public key After verification and if the new transaction is valid, it may be relayed and/or broadcasted within the blockchain network. Eventually, all blockchain nodes receive and possess a copy of any newly generated and valid transactions.

Building new blocks: Some BCN (referred to as mining nodes) start to group many newly generated and pending transactions together to generate a new block. The new block may include a block header and a block body. The block header may include a hash of the current block, a hash of the previously confirmed block, and a hash of all included transactions (e.g., Merkle tree). Dependent on the consensus protocol used, the block header may include other and/or additional information. The block body may include the content of all included transactions. Each mining node may independently attempt to create a new block.

Validating new blocks based on a consensus protocol. Under the Building New Blocks task, mining nodes may independently attempt to create a new block. They may run the same consensus protocol (e.g., Proof-of-Work in Bitcoin system) and may reach an agreement on who (i.e., a winner) may be allowed to insert a block into the existing blockchain. The winner of the consensus protocol may send its newly generated block to the blockchain network. This new block may be broadcasted. Allowing all mining nodes to receive and/or verify it.

Updating the blockchain. After the newly generated block is verified, it may be successfully appended to the existing blockchain, since it may include a hash of the previous blockchain.

Figure 3:
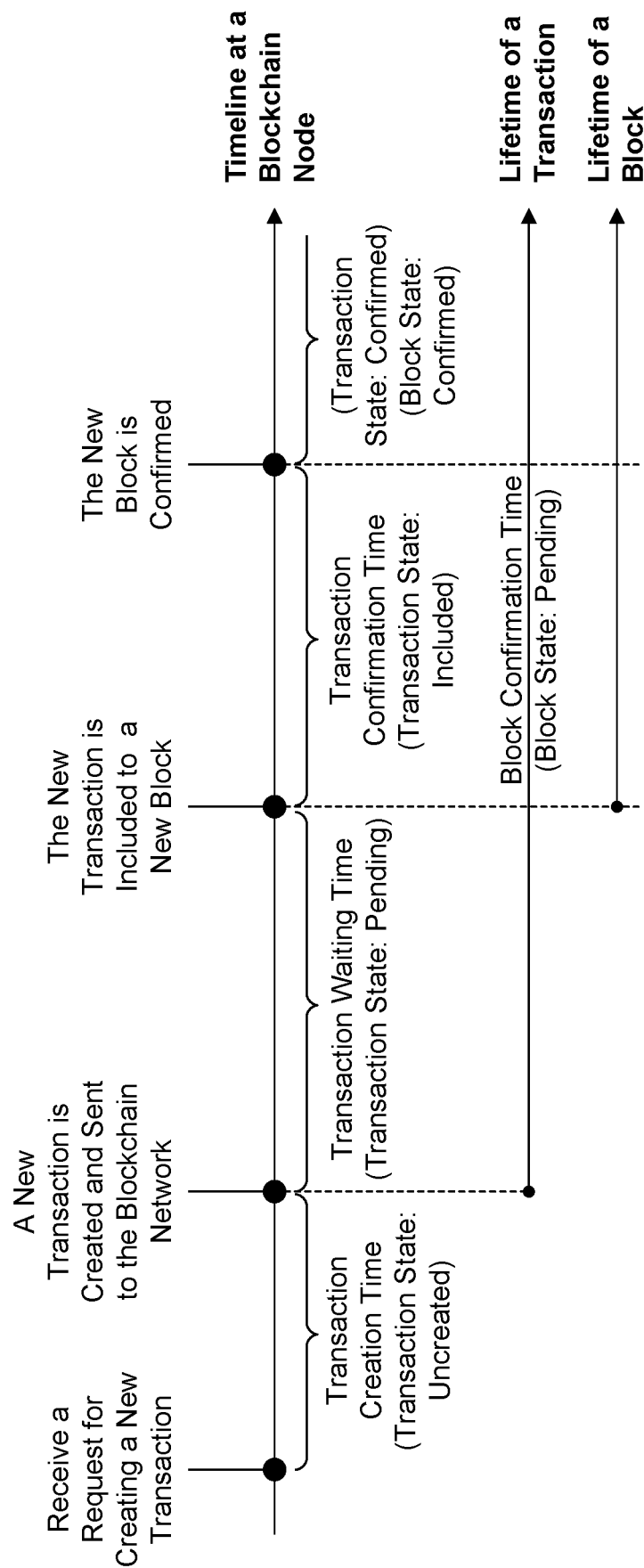
FIG. 3 illustrates example timeline at a blockchain node in connection with a processing a new transaction.

FIG. 3 illustrates example timeline at a BCN in connection with a processing a new transaction. Shown in connection with the timeline are transaction states and block states during periods between various stages of processing the new transaction. The periods may include a transaction creation time, a transaction waiting time, and a transaction confirmation time (or blockchain confirmation time).

The transaction creation time may refer to the period between a time at which a request for creating a new transaction is received and a time at which the new transaction is created. During the transaction creation time, the transaction state may be "uncreated".

The transaction waiting time may refer to the period between the time at which a new transaction is created and a time at which the new transaction is included in a new block. The duration of the transaction waiting time may depend on the underlying P2P networking and consensus mechanism. During the transaction waiting, both the transaction and block states may be "pending".

The transaction confirmation time (or blockchain confirmation time) may denote a period between the time at which a new transaction is included in a new block and a time at which the new block is confirmed. The duration of the transaction confirmation time (or blockchain confirmation time) may depend on the underlying P2P networking and consensus mechanism. During the transaction confirmation time (or blockchain confirmation time), the transaction state may be "included", and the block state may be "pending". Following confirmation of the block, its state may be "confirmed".

The speed of a transaction may be estimated as a sum of the transaction waiting time and transaction confirmation time.

5G System Architecture

Figure 4:
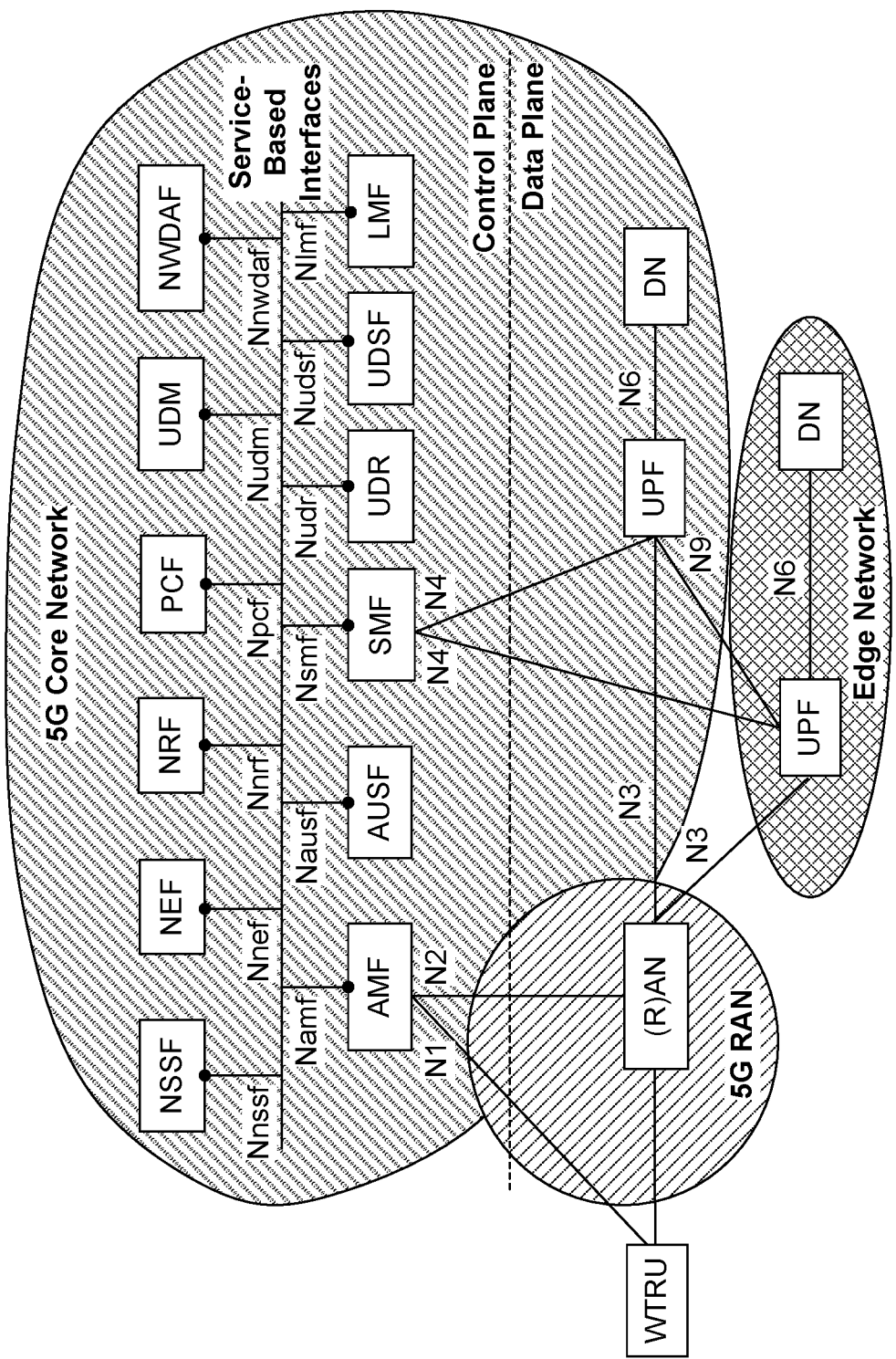
FIG. 4 is a block diagram illustrating a communications system configured as a 5G system (5GS)

FIG. 4 is a block diagram illustrating the communications system 100 (FIG. 1) configured as a (e.g., 3GPP defined) 5G system (5GS). The communications system 100 may include a RAN 113 and CN 115. One of design principles for 5GS architecture is service-centric or service-based.

The CN 115 may include various network functions. The network functions may work together to fulfill and/or provide services to the RAN 113, a WTRU 102 and/or an application server/service provider. The network functions may include a network repository function (NRF), an access and mobility management function (AMF), a session management function (SMF), an authentication server function (AUSF), a policy control function (PCF), a user plane function (UPF), a network exposure function (NEF), a unified data management (UDM), a unified data repository (UDR), an unstructured data storage function (UDSF), a network data analytics function (NWDAF) and a network slice selection function (NSSF).

A network function may access another network function. The network functions may access and/or interact with one another in any of a request/response mode and a subscription/notification mode. A network function may register with the NRF. Registering with the NRF may make the network function discoverable to the other network functions.

The AMF may manage access to, and mobility of, WTRUs 102 in the communications system 100. The SMF may be responsible for establishing sessions between a WTRU 102 and the CN 115. The AUSF may be in charge of authentication of users (e.g., WTRUs). The PCF may create and/or provide one or more policy rules for and/or to other control plane network functions and WTRUs 102. The PCF may assign identifiers for the created policy rules, and other control plane network functions and WTRUs 102 may use the identifiers to refer to (e.g., look up or otherwise obtain) the corresponding policy rules.

The UPF may be a function for the user plane. The UPF may monitor, manage, control and redirect user plane traffic flows, such as between a WTRU and an application server. The NEF may expose control plane functions to entities (e.g., network applications) that are outside of the 5GS and/or not in the same trusted domain.

The CN may provide data storage and analytics services through functions, such as any of the UDM, the UDR, the UDSF and the NWDAF. The communications system may support network slicing. Network slicing may be facilitated by the NSSF.

Although the network functions may be defined as separate logical entities, some or all of the network functions may be combined. One or more than one of the network functions may be invoked and/or used in connection with a particular procedure or operation. By way of example, the AMF, AUSF and SMF may be involved in WTRU mobility. One or more than one instance of a network function may be instantiated. The NRF may maintain the information of each network function instance. Although shown within a single cloud, one or more of network functions may be deployed in an edge network, such as one that supports edge computing and/or that is in close proximity to and/or co-located with the RAN 113. It may be advantageous to deploy the UPF and/or the NEF in an edge network that supports edge computing, which can save certain communication costs since the policy control can be applied to the event/data directly at the edge (i.e., where data/events are generated).

FIG. 5 illustrates various procedures in a 5GS. The various procedures are described with reference to the communications system 100 of FIG. 4 for convenience. The various procedures may be carried out using other architectures, as well. For convenience and simplicity of exposition, the refs. in the disclosures accompanying FIG. 5 are shown with the prefix "5:".

As denoted at (5:1), a WTRU may discover and/or may select a network (e.g., a PLMN, a RAN, a cell, etc.) based on received system information block (SIB) broadcast by one or more RAN nodes. As denoted at (5:2), the WTRU may establish a radio resource control (RRC) connection with a selected RAN (e.g., RAN1). The WTRU may communicate with the 5GS CN via the selected RAN. As denoted at (5:3), the WTRU may initiate registration towards an AMF. The selected RAN may determine/select, from one or more AMFs, a serving AMF for the WTRU. As denoted at (5:3), the serving AMF may check with the AUSF for primary access authentication and authorization, request subscription data from the UDM, check with the PCF for access and mobility policies, and/or contact the SMF to activate any existing PDU session (e.g., if indicated by the WTRU).

A registration area (RA) may be defined within the 5GS. The RA may be formed from one or more tracking areas (TAs). Each of which may cover one or more cells. An advantage of the RA is that it reduces signaling overhead by not requiring registration updates with the serving AMF while within the RA unless a periodic registration timer expires. If the WTRU moves from one RA (e.g., RA1) to another RA (e.g., RA2), then the WTRU may perform a new registration, such as, for example, with a registration type set to mobility registration update (as described herein and denoted at (5:7)). A larger RA may reduce registration overhead, but it may increase paging signaling overhead due to the serving AMF having to page the WTRU in a larger number of TAs (or cells).

After successful registration, the WTRU may enter RM-REGISTERED state and/or may access and/or interact with other control plane NFs via the serving AMF. In various embodiments, the serving AMF might be the only entry point for the WTRU to access and interact with the CN control plane. The procedures denoted at (5:3), (5:5) and (5:7), for example, may be related to connection management.

As denoted at (5:4), the WTRU may establish a PDU session for a DN with an SMF. The serving AMF may determine/select the serving SMF for the PDU session. As denoted at (5:4), the SMF may check with the PCF for PDU session policies and/or may select a UPF as an anchor for the PDU session ("PDU session anchor"). The WTRU may access the DN and/or exchange packets with the DN via the PDU session anchor (PSA). The PCF may retrieve subscription data of the WTRU from a UDR in connection with the SMF checking with the PCF for session policies and may provide it to the SMF. The SMF may perform primary session authentication using the WTRU's subscription data as retrieved from the UDM, and may perform secondary authentication between the WTRU and a DN-AAA server, e.g., using an extensible authentication protocol (EAP), such as defined in RFC3748 and RFC5247. The procedure denoted at (5:4) and the procedure denoted at (5:5) may be jointly performed.

As denoted at (5:5), the WTRU may be in a CM-IDLE state (e.g., after connection with the serving AMF is released), and may initiate a service request procedure to reestablish a connection with the serving AMF and enter a CM-CONNECTED state. The WTRU may be in mobile initiated connections only (MICO) mode when it initiates the service request procedure to reestablish the connection with the serving AMF. If the WTRU is not in MICO mode, then the serving AMF may page and/or trigger the WTRU to initiate service request procedure, for example, to receive any downlink packets. A non-access-stratum (NAS) connection may be established between the WTRU and the serving AMF in connection with the service request.

The service request may be carried out together with WTRU registration, in which case, the WTRU may enter CM-CONNECTED state. The WTRU may move within the RA without notifying the serving AMF while in CM-CONNECTED state. If WTRU remains within the RA but moves out of a RAN notification area (RNA), then the WTRU may perform a RAN update to trigger the RAN to update the WTRU context and the corresponding RRC connection maintained by the RAN. The RNA may be smaller than the RA. For example, the RNA may include a subset of TAs forming the RA (e.g., TA1, TA2, and TA3, as shown).

As denoted at (5:6), the WTRU may carry out data transmission (data plane) with the DN via RAN 113 and the UPF as the PSA. The DN may have a data network name (DNN). Although not shown, the 5GS may include and/or be communicatively coupled with more than one DN, and the DN may have respective DNNs.

As denoted at (5:7), the WTRU may detect when it moves from RA1 to RA2. For example, the WTRU may detect such event by checking a list of TAs for each RA configured by the serving AMF. As denoted at (5:7), the WTRU may perform a mobile registration update with a new serving AMF. As denoted at (5:7), a (e.g., Xn-based or N2-based) inter-RAN handover from the current RAN to a new RAN with a serving AMF change may be performed. A new serving AMF may contact the old serving AMF for transferring WTRU's context information. As denoted at (5:7), the SMF may contact the PCF and/or the UPF to update existing PDU sessions with the WTRU.

As shown in FIG. 5, multiple TAs can be grouped together as a local area data network (LADN) service area to support LADN service. As an example, TA4, TA5, and TA6 may form a LADN service area. The WTRU may be allowed to access LADN1 if (e.g., if and only if) the WTRU remains within TA4, TA5, or TA6.

A set of TAs may be grouped as a service area. The 5GS may specify and/or enforce service area restrictions for a WTRU. For example, the 5GS may configure a WTRU for service area restriction for a service area formed from TA7, TA8, and TA9, where the WTRU may be allowed to access 5GS if (e.g., if and only if) the WTRU remains within TA7, TA8, or TA9.

The various procedures disclosed herein and denoted in FIG. 5 need not be carried out in the order shown or described, and not all of the procedures need to be performed. For example, the procedures denoted at (5:7) may be performed before the procedures denoted at (5:6), and the procedure denoted at (5:5) need not be performed.

Representative Policy Control Function (PCF)

Figure 6:
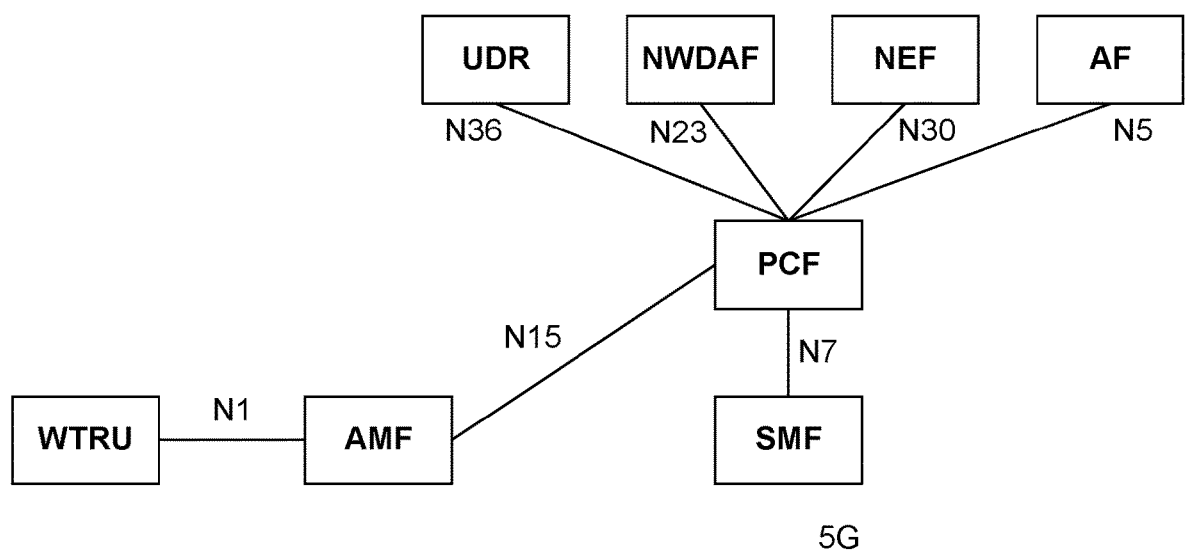
FIG. 6 illustrates an example policy control reference architecture for non-session management related policy control.
Figure 7:
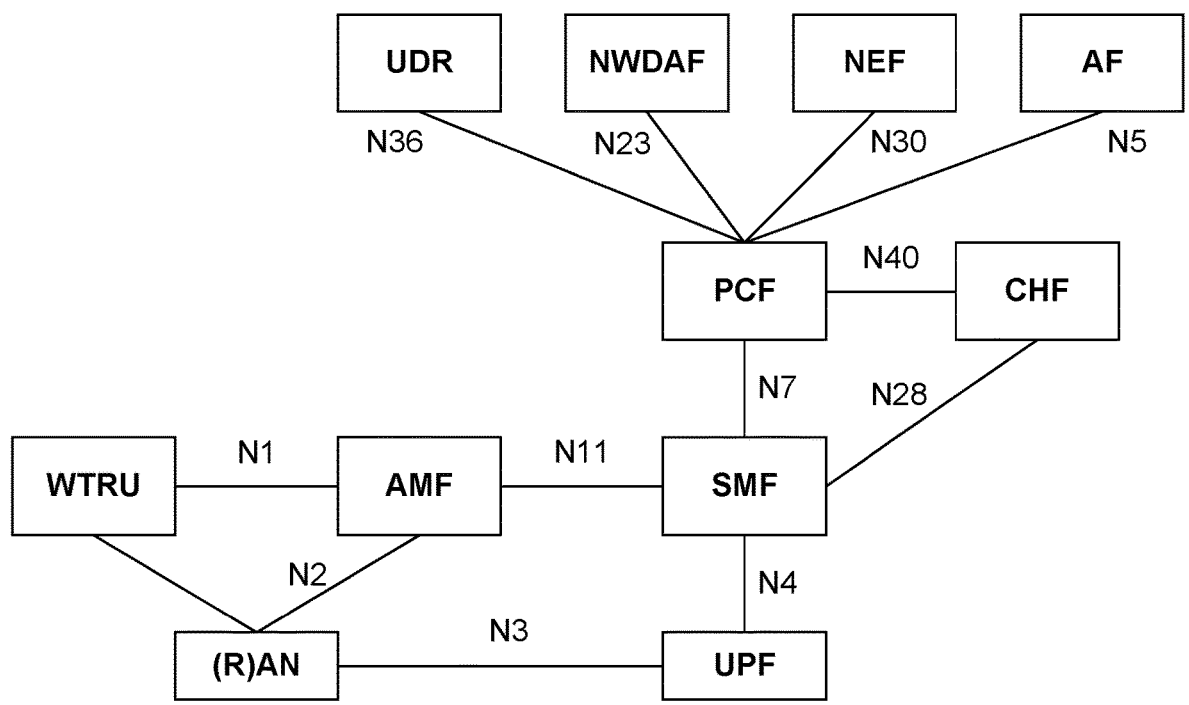
FIG. 7 illustrates an example policy control reference architecture for session management related policy control.

Policy control in a 5GS may include non-session management related policy control and session management related policy control. FIG. 6 illustrates an example policy control reference architecture for non-session management related policy control. FIG. 7 illustrates an example policy control reference architecture for session management related policy control. A Charging Function (CHF) is introduced in FIG. 7.

Examples of non-session management related policy control include access and mobility related policy control, WTRU access selection and PDU session selection related policy (WTRU policy) control, management of Packet Flow Descriptions (PFD), and network status analytics information requirement. Examples of session management related policy control include QoS control for PDU sessions and Service Data Flows (SDFs), charging control for PDU sessions and SDFs, reporting PDU session events to an AF, usage monitoring control, application detection policy control, service capability exposure policy control, and traffic steering policy control.

The PCF may provide various functionalities for both non-session management related policy control and session management policy control. The PCF may provision different policies to control plane functions (e.g., AMF, SMF, NEF), WTRUs, and AFs, at which the provisioned policies may be enforced. The PCF may retrieve subscription data from a UDR to create new policies. An operator can configure policies at the PCF. The policies may be stored at a UDR. The policies may be dynamically, semi-statically and/or statically configured at various entities, devices, etc., such as to any of an AMF, an SMF and a WTRU.

For example, access and mobility related policy control may provide any of management of service area restrictions, management of RAT/frequency selection priority (RFSP) functionalities, and management of SMF selection. A serving AMF and a PCF may perform "AM Policy Association Establishment" for a WTRU (e.g., when the WTRU performs an initial registration and selects (e.g., only selects) the serving AMF). The serving AMF and PCF may exchange access and mobility related policies, e.g., following the AM Policy Association Establishment.

Based on operator-defined policies, a PCF can modify service area restrictions for a WTRU as a part of subscription data. Operator-defined policies in the PCF may depend on input data such as WTRU location, time of day, the information provided by other NFs, etc. When a WTRU registers with a serving AMF, the serving AMF may retrieve its service area restrictions from a UDM as a part of its subscription data. The serving AMF may report the service area restrictions to a PCF. The PCF may modify the service area restrictions and/or may send the modified service area restrictions to the serving AMF. The AMF may store the modified service area restrictions and/or may enforce the modified service area restrictions to determine the mobility restrictions for the WTRU.

A RFSP index may be used by a serving AMF to manage radio resources for a WTRU. A PCF may modify the RFSP index, e.g., based on operator-defined policies. For example, operator-defined policies in the PCF may depend on input data such as accumulated usage, load level information per network slice instance etc. When a WTRU registers with the serving AMF, the serving AMF may retrieve the RFSP index from a UDM, e.g., as a part of subscription data. The serving AMF may report the RFSP index to the PCF. The PCF may modify the RFSP index and/or may send it to the serving AMF. The AMF may send the modified RFSP index to a (R)AN node. The RAN node may enforce the modified RFSP index.

A PCF may configure a WTRU with various policies via a serving AMF. The policies may include an access network discovery and selection policy (ANDSP) for non-3GPP access, and a WTRU Route Selection Policy (URSP) related to applications and PDU sessions. The WTRU may use URSP rules to determine whether to use an already established PDU session and/or trigger an establishment of a new PDU session for an application, e.g., according to a traffic descriptor specifying matching criteria included in a (e.g., each) URSP rule. If the WTRU is in CM-IDLE state, the serving AMF may send a paging message to the WTRU to trigger the WTRU to perform a WTRU-initiated service request procedure so that the serving AMF may deliver ANDSPs and URSPs (received from the PCF) to the WTRU.

Application detection as a type of session management related policy control may be provided through interactions among a PCF, a SMF, and a UPF. The PCF may install (or activate) one or more policy and charging control (PCC) rules including enforcement actions to the SMF. The SMF may instruct the UPF to detect events in specific application traffic. The UPF may apply configured enforcement actions on specific application traffic, such as gating control (e.g., blocking application traffic), QoS control (e.g., bandwidth limitation), and traffic redirection.

The UPF may detect an event, and may report the detected event to the PCF via the SMF. The PCF may modify the PCC rules and/or install modified PCC rules to the SMF based on one or more reported events.

Representative Data Storage Architecture

Figure 8:
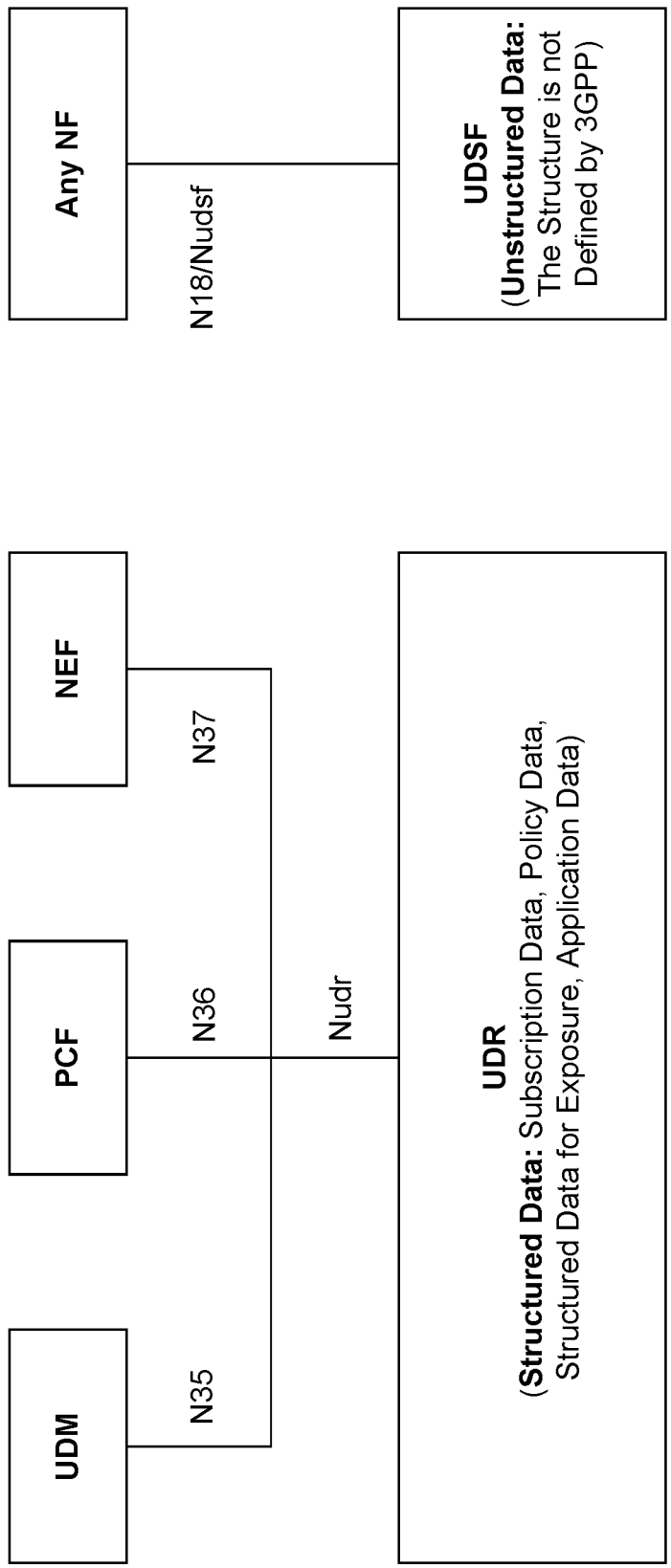
FIG. 8 illustrates an example data storage architecture.

FIG. 8 illustrates an example data storage architecture, e.g., for a 5GS. The data storage may include a UDM, a UDR, and a UDSF. The UDR may be implemented in (e.g., as a part of) a UDM, a PCF, or an NEF. The UDR may serve multiple UDMs, PCFs, and NEFs. The UDSF may be implemented in (e.g., as a part of) an NF. The UDSF may serve multiple NFs. The UDR and the UDSF may be co-located.

Data in communications system may be classified into unstructured data and structured data. The unstructured data may be any type of data. The structured data may include subscription data, policy data, structured data for exposure, and application data, such as packet flow descriptions (PFDs) for application detection and AF request information for multiple WTRUs.

Examples of data storage functions that may be provided may include: (i) a UDM may store subscription data to a UDR and/or may retrieve subscription data from the UDR; (ii) a PCF may store policy data to a UDR and/or may retrieve policy data from the UDR; (iii) a NEF may store structured data for exposure and/or application data to a UDR and/or may retrieve such data from the UDR; (iv) an NF may store unstructured data to a UDSF and/or may retrieve unstructured data from the UDSF; (v) a UDR may allow an NF consumer to retrieve, create, update, subscribe for change notifications, unsubscribe for change notifications, and/or delete data stored in the UDR, e.g., based on the set of data applicable to the NF consumer; and (vi) a UDSF may allow a NF consumer to retrieve, create, update, and delete data stored in the UDSF.

The UDM may provide any of the following functionalities: (i) generate (e.g., 3GPP) authentication and key agreement (AKA) authentication credentials and/or send the AKA authentication credentials to a serving AMF (e.g., when a WTRU registers with the serving AMF); (ii) handle user identification (e.g., storage and/or management of subscription permanent identifier (SUPI) of each subscriber in the 5GS); (iii) support de-concealment of privacy-protected subscription concealed identifier (SUCI), which may be based on a SUPI with privacy protection; (iv) authorize WTRU access to the 5GS based on its subscription data, such as roaming restrictions; (v) manage a WTRU's serving NFs (e.g., storing the serving AMF for a WTRU, storing the serving SMF for a WTRU's PDU session); (vi) support service and session continuity (e.g., storing SMF/DNN assignment of ongoing sessions); and (vii) handle 5G LAN group management.

Representative Use Case 1—Internet of Vehicles

Figure 9:
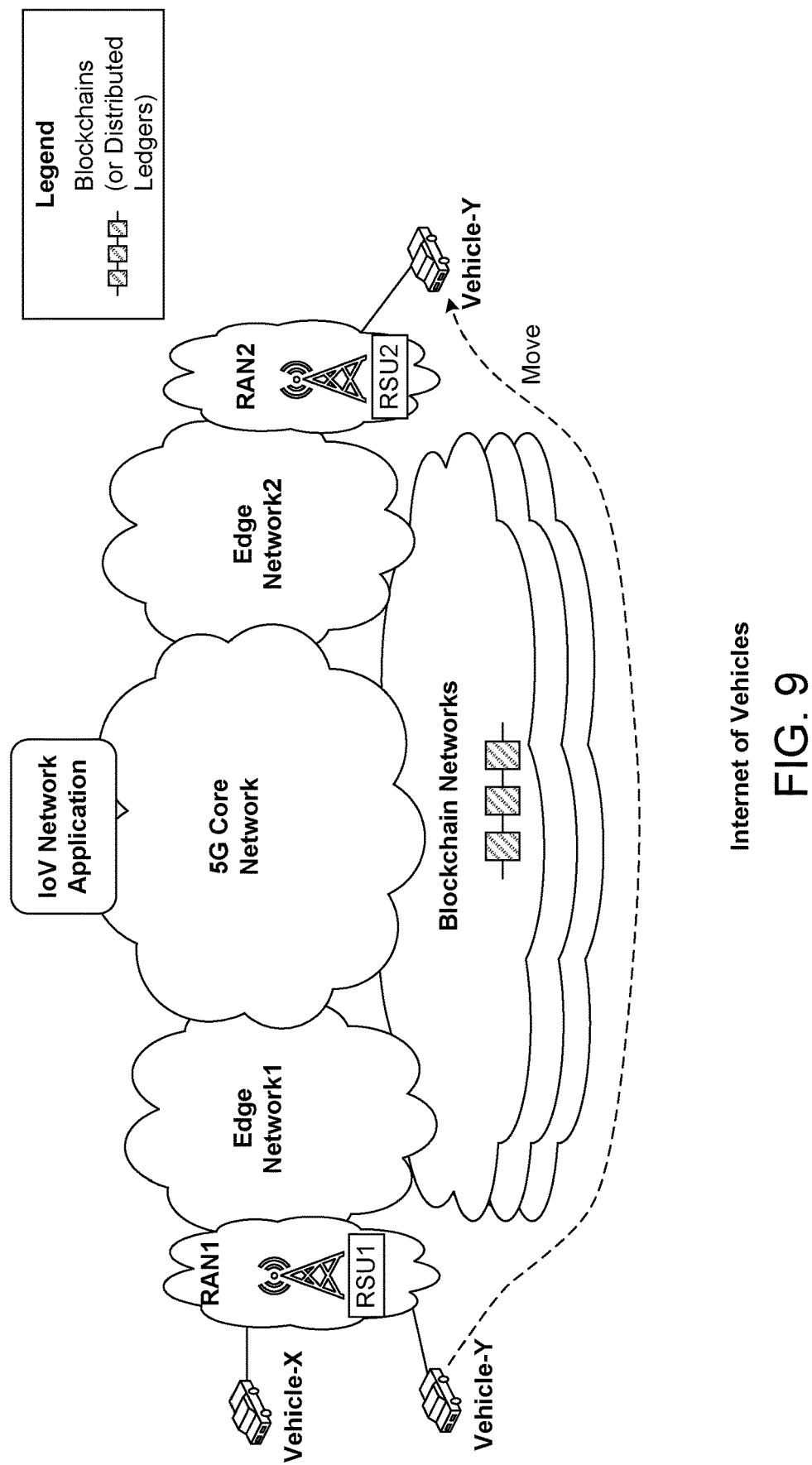
FIG. 9 illustrates an example use case for an internet of vehicles.

FIG. 9 illustrates an example use case for an internet of vehicles (IoV). Each vehicle may have a connection to the internet via at least a wireless connection (e.g., 5G) with a roadside unit (RSU) (or a base station). The RSU may include or have access to a local edge network with computing and storage resources.

A vehicle may move from one RSU to another RSU. A vehicle can communicate with another vehicle, an RSU, an edge network, a core network, and/or an application server.

In this use case, Vehicle-X needs to send one-time or periodical updates (e.g., the location of Vehicle-X, events related to Vehicle-X, car conditions related to Vehicle-X) to the IoV application in the cloud. In the meantime, these updates are critical for checking the history. These updates may also need to be shared with many other parties (such as the vehicle owner, the car manufacturer, the passengers, the driver, the passengers, the owner of goods carried by the vehicle) and should be immutable. Similarly, Vehicle-X communicates with Vehicle-Y even after Vehicle-Y moves from RSU1 to RSU2. Both vehicles require their communications (e.g., event notification) to be recorded for future queries by themselves and/or other parties. Blockchain networks can be leveraged for providing shared, distributed, and immutable ledgers or blockchains to this use case.

Representative Use Case 2—Smart Manufacturing and Logistics

Figure 10:
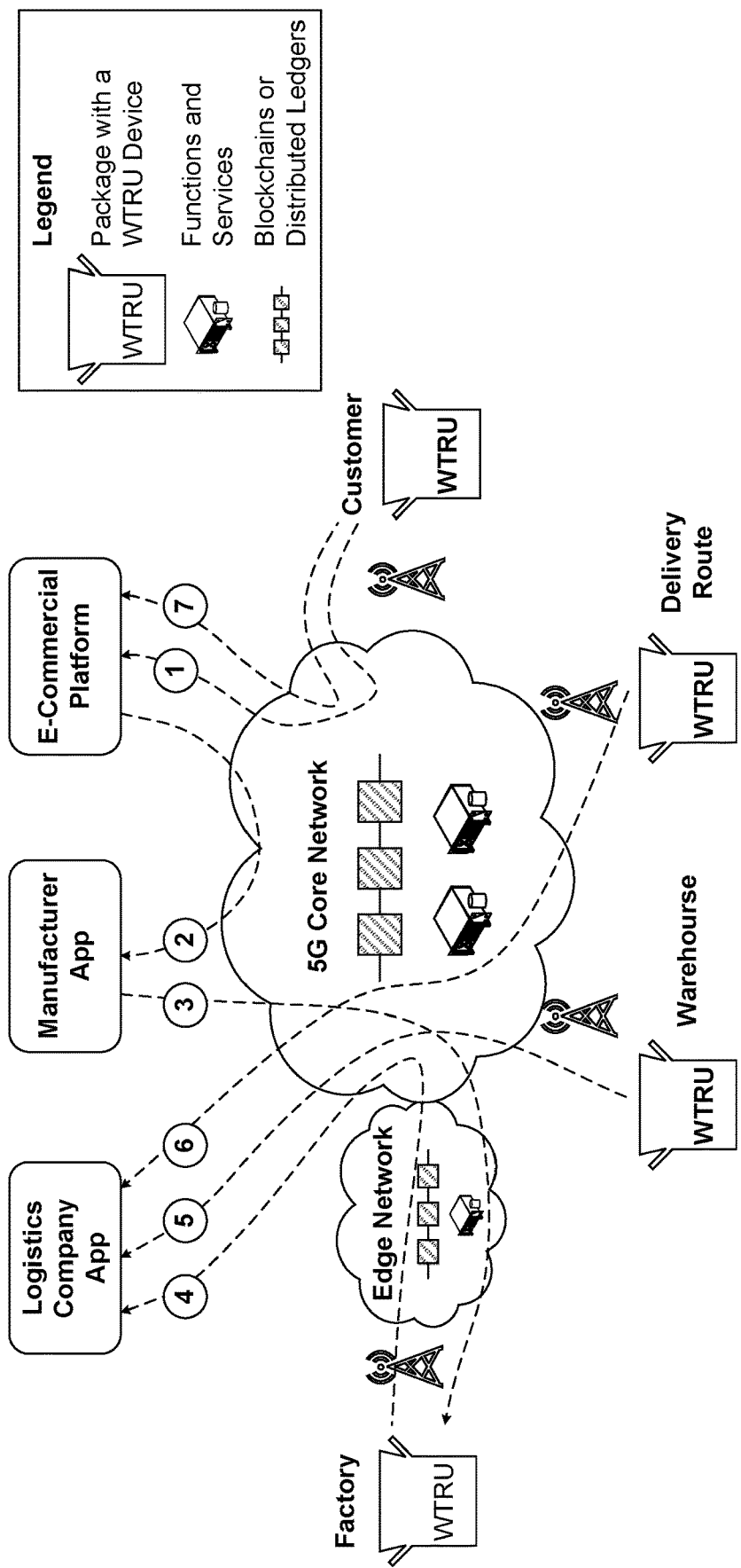
FIG. 10 illustrates a smart manufacturing and logistics use case.
Figure 11:
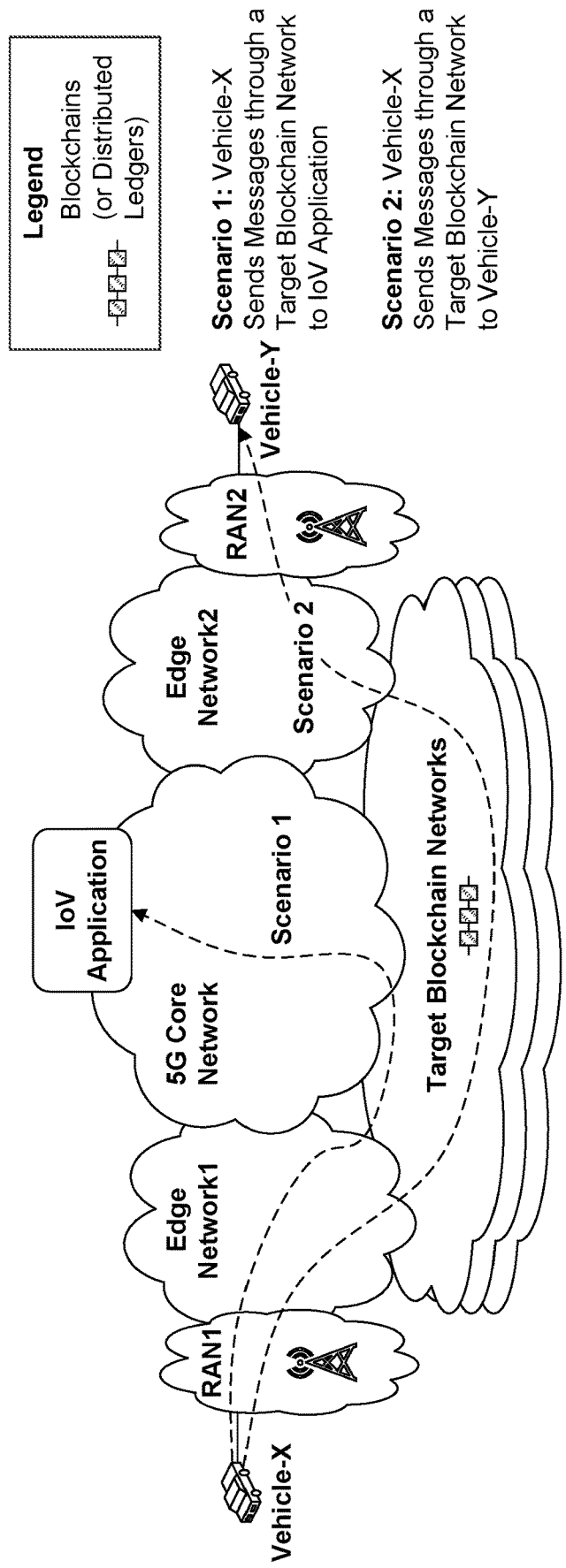
FIG. 11 illustrates examples of messaging through blockchain networks.

FIG. 10 illustrates a smart manufacturing and logistics use case. For convenience and simplicity of exposition, reference numerals accompanying operations set forth in the disclosures accompanying the figures may include a prefix consisting of the figure number and a colon.

The smart manufacturing and logistics use case may include four participating parties: a customer, an e-commercial company, a manufacturer, and a logistics company. These four parties may use an internet of things (IoT) and/or 5G technologies to enable a smart manufacturing and logistics process. The smart manufacturing and logistics process may include any of the following:

Step or operation 1: The customer may submit a purchase request to an e-commercial platform (application of the e-commercial company) (12:1). For the sake of simplicity, the purchase request may be for a single product item.

Step or operation 2: The manufacturer application may receive the list of product items ordered by the customer (12:2), likely from the e-commercial platform.

Step or operation 3: The manufacturer application may send the list to a factory, where the ordered product item is produced and ready for shipping to the customer (12:3).

Step 4: The logistics company application may receive a notification from the factory to pick up the produced item from the factory and ship it towards the customer (12:4).

Step 5: The shipped item arrives at a warehouse (12:5), which may be owned or rented by the logistics company. A notification may be sent to the logistics company application.

Step or operation 6: The item may be sent for delivery on route towards the customer (12:6). When the item passes through some key locations, a notification may be sent to the logistics company application.

Step or operation 7: The item may arrive at and be received by the customer (12:7).

Step or operation 8: The e-commercial platform may receive a notification (12:8).

In this case, each step or operation may trigger one or more actions for the corresponding party, and any (e.g., each) of such events may be created as a blockchain transaction and be stored onto a designated blockchain. However, the WTRU attached to each package may be very resource-constrained for the sake of cost reduction. The WTRU might not have the capability to create transactions and/or to participate in the blockchain system (e.g., to store the blockchain, to perform consensus mechanism, etc.). As used herein, the term "step" is understood to encompass "one or more operations", and thus, for convenience and simplicity of exposition, the terms "step and "operation(s)" may be used interchangeably herein.

In this case, each step triggers an event notification, which is sent from one party to another party. These events are not only required for real-time notification, but also critical for history tracking and querying, which blockchain technology can help. However, the WTRU device attached to each package may be very resource-constrained for the sake of cost reduction. Thus, the WTRU may not have adequate capability to directly access and leverage blockchain networks (e.g., to store the blockchain, to perform consensus protocols).

Embodiments address the following key issues described with reference to the use cases disclosed herein.

Key Issue #1—Many applications currently use off-chain communications for normal data transmission, and only leverage blockchain networks for selective history recording. This approach has two problems: 1) It involves two separate processes (i.e., off-chain and on-chain communications) and is inefficient in terms of overall overhead. However, in some cases, it may be more desired to leverage blockchain networks to support both on-chain and off-chain communication; 2) The application needs to directly deal with blockchain networks, which might not be affordable especially when the application is hosted by resource-constrained devices. As a result, new functionalities as blockchain application enablement need to be designed to help the application to interact with the designated blockchain system on behalf of applications.

Key Issue #2—When considering leveraging blockchain networks to transport and record original messages (or data) simultaneously, how to efficiently identify and transmit messages over a target blockchain network is an issue. For example, when a sender application sends a message to a receiver application through a target blockchain network, the target blockchain network needs to be able to route the message to the right blockchain node and eventually to the receiver application. Given the massive number of applications (e.g., hosted by IoT devices), it is inefficient and impractical to modify let blockchain nodes and let them to identify messages and their routing for these applications. In addition, an application may continuously send many messages through a blockchain network, while another application may only send sporadic messages through the blockchain network. Different approaches should be designed for such applications, which have different message generation and transmission needs.

Key Issue #3—When considering leveraging blockchain networks to transport and record original data or messages (or data) simultaneously, another issue is how to enable these applications can flexibly and efficiently use various blockchain systems. An application may need to use different type of blockchain systems (e.g., permissioned blockchains and permissionless blockchains) but do not have adequate capability to discover any available blockchain system and maintain its information. Plus, the application even cannot directly interact with a blockchain node participating in a particular blockchain node in order to reduce its complexity. New functionalities as blockchain application enablement need to be designed to help the application to interact with the target blockchain system to reduce the burden at the application side.

Key Issue #4—When considering leveraging blockchain networks to transport and record original messages (or data) simultaneously, how to efficiently transform and adapt application messages to blockchain transactions is also an issue for several reasons: 1) It may be required that the message content cannot be seen by every other entities but entities involved in a blockchain-based vertical application such as blockchain-based SML application; 2) The message content also should be transparent to a blockchain node, but the blockchain node needs to know which messages are from which applications so that messages from different applications may be handled by blockchain nodes differently based on their needs; and 3) The size of an application message may be too small and to include it in a blockchain transaction may cause high overhead.

Overview

Methods, apparatuses, systems, etc. directed to messaging through blockchain networks are disclosed herein. In various embodiments, methods for, and/or for use in connection with, messaging through blockchain networks may be implemented in a device comprising circuitry, including a transmitter, a receiver and a processor, such as any of a wireless transmit and receive unit (WTRU), a base station or other network element. Among the methods is a first method that may include any of receiving a request to send a message including a message and information indicating a source of the message, a destination of the message and a distributed ledger system; determining a first node associated with a distributed ledger system based, at least in part, the information indicating the distributed ledger system and the information indicating the destination; generating a transaction for the message; and sending the transaction to a second node of the distributed ledger system.

Among the methods is a second method that may include any of receiving a request to send a message including a message and information indicating a source of the message, a destination of the message and a distributed ledger system; determining a first node associated with a distributed ledger system based, at least in part, the information indicating the distributed ledger system and the information indicating the destination; sending, to the first node, a notification to receive a message including the information indicating the source of the message; receiving, from the first node, a confirmation to the notification; generating a transaction for the message; and sending the transaction to a second node of the distributed ledger system.

Among the methods is a third method that may include any of receiving a request to send a message including a message and information indicating a source of the message and a destination of the message; determining a first node associated with a distributed ledger system based, at least in part, the information indicating the destination; generating a transaction for the message; and sending the transaction to a second node of the distributed ledger system.

In various embodiments, the third method may include any of sending, to the first node, a notification to receive a message including the information indicating the source of the message; receiving, from the first node, information indicating the distributed ledger.

In various embodiments, determining a first node may include determining a first node associated with a distributed ledger system based, at least in part, the information indicating the destination and the information indicating the distributed ledger.

In various embodiments of any of the first-third methods, generating a transaction for the message may include generating the transaction for the message based at least in part on one or more policy rules. In various embodiments, any of the first-third methods may include receiving the one or more policy rules. In various embodiments, any of the first-third methods may include any of retrieving the one or more policy rules from a repository based at least in part on any of (i) the information indicating the source of the message and (ii) the information indicating the destination of the message. In various embodiments, any of the first-third methods may include any o receiving, from the first node, third information that identifies the distributed ledger system; and updating the one or more policy rules based on the third information.

In various embodiments of any of the first-third methods, generating a transaction for the message may include generating the transaction for the message based at least in part on information indicating a type of transaction. In various embodiments of any of the first-third methods, the request comprises the information indicating a type of transaction.

In various embodiments of any of the first-third methods may include any of retrieving the information indicating a type of transaction from a repository based at least in part on any of (i) the information indicating the source of the message and (ii) the information indicating the destination of the message. In various embodiments, any of the first-third methods may include any of determining the second node based at least in part on the information indicating distributed ledger system. In various embodiments of any of the first-third methods, the request may include the information indicating distributed ledger system.

In various embodiments, any of the first-third methods may include receiving the information indicating distributed ledger system from the first node.

In various embodiments, any of the first-third methods may include retrieving the information indicating distributed ledger system from a repository based at least in part on any of (i) the information indicating the source of the message and (ii) the information indicating the destination of the message.

In various embodiments, any of the first-third methods may include receiving, from the first node, information indicating a status of reception of the message.

In various embodiments of any of the first-third methods, the request to send a message is received from the sender.

In various embodiments of any of the first-third methods. the information indicating the destination of the message may include any of address associated with the destination, a locator associated with the destination and an identifier associated with the destination.

In various embodiments of any of the first-third methods, the information indicating the source of the message may include any of address associated with the source, a locator associated with the source and an identifier associated with the source. In various embodiments of any of the first-third methods, the information indicating the distributed ledger system may include any of address associated with the distributed ledger system, a locator associated with the distributed ledger system and an identifier associated with the distributed ledger system.

In various embodiments, any of the first-third methods may include determining any of a type and a format for the transaction based on the one or more policy rules, wherein generating a transaction for the message comprises generating the transaction for the message based at least in part on any of the type and the format for the transaction.

In various embodiments, any of the first-third method may include authorizing the request.

In various embodiments of any of the first-third methods, the first node may be at least one device having at least one first service-based function that interfaces with a first participating node of the distributed ledger system. In various embodiments of any of the first-third methods, the second node may include at least one device having at least one second service-based function that interfaces with a second participating node of the distributed ledger system. In various embodiments of any of the first-third methods, the second node may be a second participating node of the distributed ledger system.

In various embodiments of any of the first-third methods, the request may include any of an identifier of the sender, an identifier of the receiver, a name of the distributed ledger system, a type of transaction, a type of blockchain session being established, a session security requirement, a session privacy requirement and security credentials between the sender and the receiver. In various embodiments of any of the first-third methods.

Among the methods is a fourth method that may be implemented in a first blockchain messaging server (BMS) and may include any of: receiving, from a sender, a request to establish a blockchain session with a receiver; identifying a blockchain node (BCN) that participates in a target blockchain network; discovering a second BMS that can reach the receiver; sending, to the second BMS on behalf of the sender, a second request to establish the blockchain session with the receiver; receiving, from the second BMS, a response indicating whether the requested blockchain session is established; and sending a session notification to the BCN.

In various embodiments, the fourth method may include authorizing the first request.

In various embodiments, the fourth method may include generating a second response based on the first response.

In various embodiments, the fourth method may include sending the second response towards the sender.

In various embodiments, any of the first and second BMSs may be deployed in any of a radio access network (RAN) node, a core network (CN) node, a server, a gateway and a WTRU. In various embodiments, the sender may be deployed in any of a radio access network (RAN) node, a core network (CN) node, a server, a gateway and a WTRU. In various embodiments, sender may be any of a blockchain client application (BCA) and a blockchain network application (BNA). In various embodiments, the receiver may be any of a blockchain client application (BCA) and a blockchain network application (BNA). In various embodiments, the first BMS or second BMSs and the sender may be deployed and/or co-located in any of a same radio access network (RAN) node, a same core network (CN) node, a same server, a same gateway and a same WTRU. In various embodiments, the first request may include any of an identifier of the sender, an identifier of the receiver, a name of the target blockchain network, type of blockchain transactions, type of blockchain session being established, a session security requirement, a session privacy requirement and security credentials between the sender and the receiver.

In various embodiments, the first request from the sender may be relayed by a blockchain messaging client (BMC) to the first BMS. In various embodiments, the first request may include and/or indicate one or more parameters, and wherein the second request may include the same parameters. In various embodiments, the second request include an identifier of the first BMS and/or an identifier of the first BCN.

In various embodiments, the first response may include context information of the established blockchain session. In various embodiments, context information may include any of a session identifier, a transaction type, and a lifetime of the established session.

In various embodiments, the session notification may include at least one of one or more parameters included in and/or indicated by the first response. In various embodiments, the second response may include at least one of one or more parameters included in and/or indicated by the first response. In various embodiments, the second response may include relayed by the BMC if the sender is a BCA.

Among the methods is a fourth method that may include any of sending a first request to a first node to establish a blockchain session with a receiver; and receives a first response from the first node indicating whether the request blockchain session is established. In various embodiments, the sender may be deployed in any of a radio access network (RAN) node, a core network (CN) node, a server, a gateway and a WTRU. In various embodiments, the sender may be any of a blockchain client application (BCA) and a blockchain network application (BNA). In various embodiments, the receiver may be any of a blockchain client application (BCA) and a blockchain network application (BNA).

In various embodiments, the first node is may be blockchain messaging client (BMC). In various embodiments, the first node may be a blockchain messaging server (BMS).

In various embodiments, the first request may include any of an identifier of the sender, an identifier of the receiver, a name of the target blockchain network, type of blockchain transactions, type of blockchain session being established, a session security requirement, a session privacy requirement and security credentials between the sender and the receiver. In various embodiments, the first response may include context information of the established blockchain session.

In various embodiments, the context information may include any of a session identifier, a name of target blockchain name, a session type, a session lifetime, a transaction type, am application type, an identifier of the sender, an identifier of the receiver, an identifier of the device at which the sender resides, an identifier of the device at which the receiver resides, an identifier of a blockchain node (BCN) that may forward the sender's messages to the target blockchain network, an identifier of the second BCN that may receive the sender's messages from the target blockchain network, an identifier of the first BMS that may forward the sender's messages to the first BCN, and an identifier of the second BMS that may receive the sender's messages from the second BCN.

Among the apparatuses, is an apparatus, which may include any of a receiver, transmitter, a processor and memory, configured to perform a method as in at least one of the preceding methods.

Representative Blockchain Messaging Architecture

Figure 12:
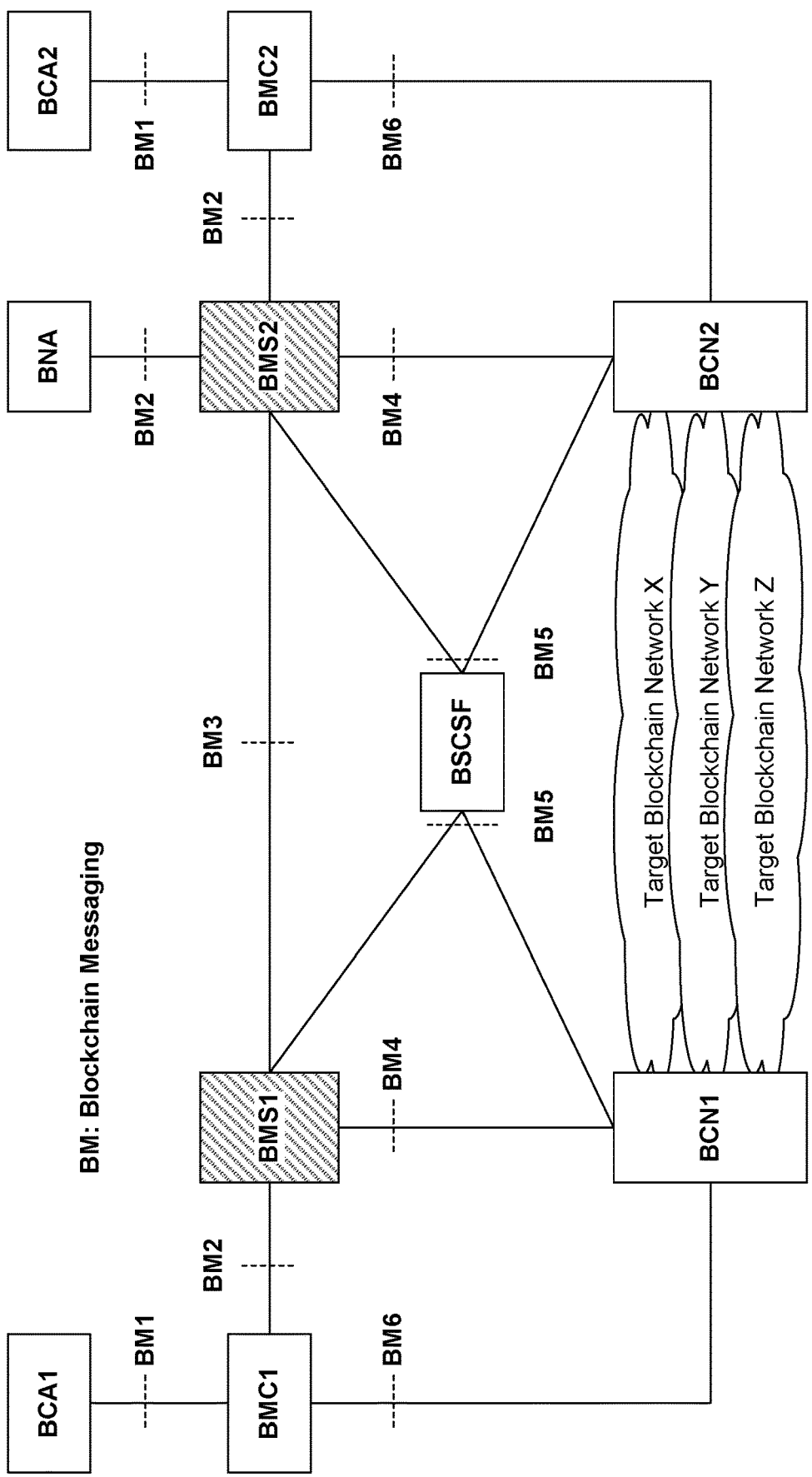
FIG. 12 illustrates an example architecture of messaging through blockchain networks.

Messaging through Blockchain Networks (or Blockchain Messaging) is proposed as a new process, where a sender may send messages to a target blockchain network. Then, messages may be broadcasted within the target blockchain network. Finally, messages may be forwarded from the sender to receivers through a target blockchain network. As a result of this process, messages are transmitted from the sender to the receivers and also stored into the target blockchain, which means such a process may achieve two objectives at the same time, i.e., delivering messages from the sender to the receivers and recording the message exchange events in the blockchain. For example, FIG. 12 shows two blockchain messaging scenarios.

In Scenario 1, Vehicle-X may send messages to the IoV application through a target blockchain network. Each message may be routed from Vehicle-X to RAN1, Edge Network1, the Target Blockchain Network, 5G Core Network, and eventually to the IoV Application.

In Scenario 2, Vehicle-X may send messages to Vehicle-Y through a target blockchain network. Each message may be routed from Vehicle-X to RAN1, Edge Network1, the Target Blockchain Network, Edge Network2, RAN2, and eventually to Vehicle-Y.

In both scenarios, we may need to not only support the messaging, but also need to record those messaging as system logs for e.g., future auditing or charging purpose. In particular, in those scenarios, multiple providers or stakeholders are involved, such as 5G network operator, edge network or edge service provider, IoV application provider, vehicular application service provider, etc. Therefore, it is not desired to use a centralized database of a particular stakeholder to record the messaging history due to being lack of mutual trust if those service providers do not build mutual trust agreement in advance. It is time-consuming to even build such multi-party agreements also may significantly slow down the rapid deployments of new applications. Therefore, blockchain systems may be leveraged to help transmit messages and record the messaging history/log concurrently.

There may be different types of target blockchain networks which the sender may leverage. But the following two blockchain messaging methods are proposed to transmit messages through target blockchain networks.

Non-Session-based Blockchain Messaging: The sender may send each message one-by-one directly through the target blockchain network without any setup and preparation. This approach is more applicable for applications which only sends sporadic messages. But for each message, an efficient functionality for determining the sender and the receiver of the message at the border of the target blockchain network is still needed. Since the application only generates sporadic messages, such functionality may only introduce minimal impact and overhead to the target blockchain network.

Session-based Blockchain Messaging: The sender first establishes a blockchain session with all receivers over the target blockchain network. Each established blockchain session has a unique identifier (referred to as a BCS-ID) and/or a unique transaction type (referred to as TXN-TYPE). Then the sender starts to use the established blockchain session to transmit messages through the target blockchain network to the receivers. In other words, each message may include BCS-ID and/or TXN-TYPE, which may be used to easily determine the sender and the receivers of the message. Establishing a blockchain session introduces certain extra overhead. But once the session is established, to transmit messages using the established session is more efficient than a non-session-based approach, especially when the sender has many and continuous messages to send. In contrast, this approach is more applicable for applications which need to transmit many continuous messages through a blockchain network.

Various applications may need to leverage different target blockchain networks. It is inefficient to redesign functionalities for each application and each target blockchain network. A functional architecture in FIG. 12 is proposed as a blockchain messaging enablement, which may be residing below applications but above target blockchain networks. This blockchain messaging enablement may provide various functionalities (e.g., translate application messages to blockchain transactions and recover application messages from blockchain transactions) and may be easily leveraged by various applications to leverage different target blockchain networks. The proposed blockchain messaging functional architecture in FIG. 12 consists of the following logic entities.

Blockchain Client Application (BCA): A BCA (e.g., a BCA1 and a BCA2) is an end application, which may act as a sender to send messages to receivers (e.g., one or more BNAs) via a target blockchain network. In addition, the BCA may also receive messages from other senders (e.g., one or more BNAs) via the same or different target blockchain network. The BCA may also issue or receive a request for establishing one or multiple blockchain sessions. The BCA usually resides in a device or a gateway such as a 3GPP WTRU. The BCA may (e.g., may only) interacts with a Blockchain Messaging Client (BMC). A device may host multiple BCAs. The BCA may be a client-side entity for a blockchain-based vertical application, which may have one BNA as server-side entity to manage and control many BCAs belonging to the same vertical application. For example, in a blockchain-based SML application, each IoT device may host a BCA as the client-side entity, while a BNA residing in the cloud acts as the server-side entity.

Blockchain Messaging Client (BMC): A BMC (e.g., a BMC1 and a BMC2) may serve one or multiple BCAs. On behalf of these BCAs, The BMC relays original messages or blockchain session-related requests/responses between BCAs and a Blockchain Messaging Server (BMS). The BMC usually resides in a device or a gateway such as a 3GPP WTRU. A device may have one BMC, or one BMC plus one or multiple BCAs. Optionally, the BMC may also interact with a BCN directly to relay original messages between a BCA and the BCN.

Blockchain Messaging Server (BMS): A functionality of a BMS is related to blockchain session establishment and cancellation. For this functionality and as an example, a BMS1 (or a BMS2) may receive blockchain session-related requests from the BMC1 (or a BNA) and may send (forward) them to the BMS2 (or the BMS1). Then, the BMS2 (or the BMS1) may process requests and may send session-related responses to the BMS1 (or the BMS2), which may send (forward) them to the BMC1 (or the BNA). As for messaging functionality, a BMS (e.g., the BMS1 and the BMS2) is responsible for receiving original messages from the BMC or the BNA, transforming the message to blockchain transactions, and transmitting blockchain transactions to a Blockchain Node (BCN). On the other hand, a BMS is also responsible for receiving blockchain transactions from a BCN, transforming transactions to original messages, and transmitting original messages to the BMC or the BNA. A BMS may be implemented as a network function such as a 3GPP control plane NF.

Blockchain Node (BCN): A BCN (e.g., a BCN1 and a BCN2) may receive transactions from a BMS and may send them to a target blockchain network. On the other hand, a BCN also may receive transactions from a target blockchain network and may send (forward) them to a the BMS. The BCN may also support direct interaction with a BMC. The BCNs may be the (e.g., only) entity that directly interfaces target blockchain networks. The BCN hides details of a target blockchain network from a the BMS or the BMC. In other words, a target blockchain network is transparent to any other entities in FIG. 12 except the BCNs. In addition, one BCN may interface with multiple target blockchain networks. For example, when the BCN receives a message from the BMS (or the BMC), the BCN may send the same message to each target blockchain networks. Then, this message may be received by multiple other BCNs which each participates in a target blockchain network and may send (forward) the message to other BMSs (or BMCs). The BMS (or the BMC) may send the message to the BCN once, but the BCN may transmit it multiple times and each time to a different blockchain target network. As a result, the message is traveled through multiple blockchain networks, stored in multiple blockchains, and received by one or multiple receivers.

Blockchain Network Application (BNA): A BNA may (e.g., may only) interact with a BMS and usually resides in the cloud and/or in an application server. The BNA may be implemented as a 3GPP AF. Similar to a BCA, the BNA as an application, may act as a sender to send messages to receivers via a target blockchain network, and/or as a receiver to receive messages from a sender via the same or different target blockchain network. The BNA may also issue or receive a request for establishing one or multiple blockchain sessions. In addition, the BNA may be a server-side application entity for a particular blockchain-based vertical application (e.g., Blockchain-based V2X application, Blockchain-based SML application) and interacts with a set of BCAs, which are client-side application entities for the same blockchain application. As an example, for a blockchain-based V2X application, there may be one BNA residing in the cloud or 5GS, while each vehicle may host a BCA.

Blockchain Session Context Storage Function (BSCSF): A BSCSF is responsible for storing context information of established blockchain sessions (referred to as BCS-CONTEXT). A BMS may store such context information to the BSCSF. the BMS or a BCN may also search or query BCS-CONTEXT of any established blockchain session from the BSCSF. The BSCSF may be implemented as a part of a BMS or a BCN. The BSCSF may be implemented as a part of the 3GPP control plane UDSF.

Based on FIG. 12, some examples of messaging through blockchain networks may be:

Non-Session-based Blockchain Messaging from a BCA1 and the BNA: In this case, the BCA1 may send an original message to the BMC1, which may send (forward) the message to BMS1. Then, BMS1 generates a blockchain transaction including the original message and may send this blockchain transaction to the BCN1. In the meantime, BMS1 informs BMS2 that the original message may be sent through Target Blockchain Network X; BMS2 may determine that the BCN2 connects to Target Blockchain Network X and thus instruct it to send (forward) the future transaction including the original message to BMS2. The BCN1 may receive this blockchain transaction from BMS1 and may send them into Target Blockchain Network X, where this blockchain transaction may be broadcasted and eventually reach the BCN2. The BCN2 may receive this blockchain transaction from Target Blockchain Network X and may send (forward) it to BMS2. Then, BMS2 recovers the original message from the blockchain transaction received from the BCN2. Finally, BMS2 may send (forward) the original message to the BNA.

Session-Based Blockchain Messaging from a BCA1 to a BCA2: This case needs two phases (i.e., blockchain session establishment and message transmission). In the blockchain session establishment phase, the BCA1 may send a blockchain session establishment request to a BMC1, a BMS1, and a BMS2. The BMS2 may make the decision and may create the requested blockchain session on behalf of the BCA2. BMS2 then notifies the BCA2 via the BMC2 and may send a response to the BMS1, the BMC1, and the BCA1. BMS1 (and BMS2) also configures the BCN1 and the BCN2 with the context information of the established blockchain session. In the message transmission phase, the BCA1 may send an original message to the BMS1 via the BMC1. Then, BMS1 generates a blockchain transaction including the original message. The generated blockchain transaction may include the identifier of the established blockchain session and/or its transaction type, which is used to uniquely identify any message from the BCA1 to the BCA2 (or from BMS1 to BMS2). BMS1 may send the generated blockchain transaction to the BCN1, which may send the transaction into Target Blockchain Network Y. The BCN2 may receive this transaction from Target Blockchain Network Y and knows it needs to be forwarded to BMS2, based on the blockchain session identifier and/or its transaction type. BMS2 may receive this blockchain transaction from the BCN2, recovers the original message from the received blockchain transaction, and may send (forward) it to the BCA2 via the BMC2.

Representative Blockchain Session Establishment

Representative Unicast Blockchain Session Establishment

Figure 13:
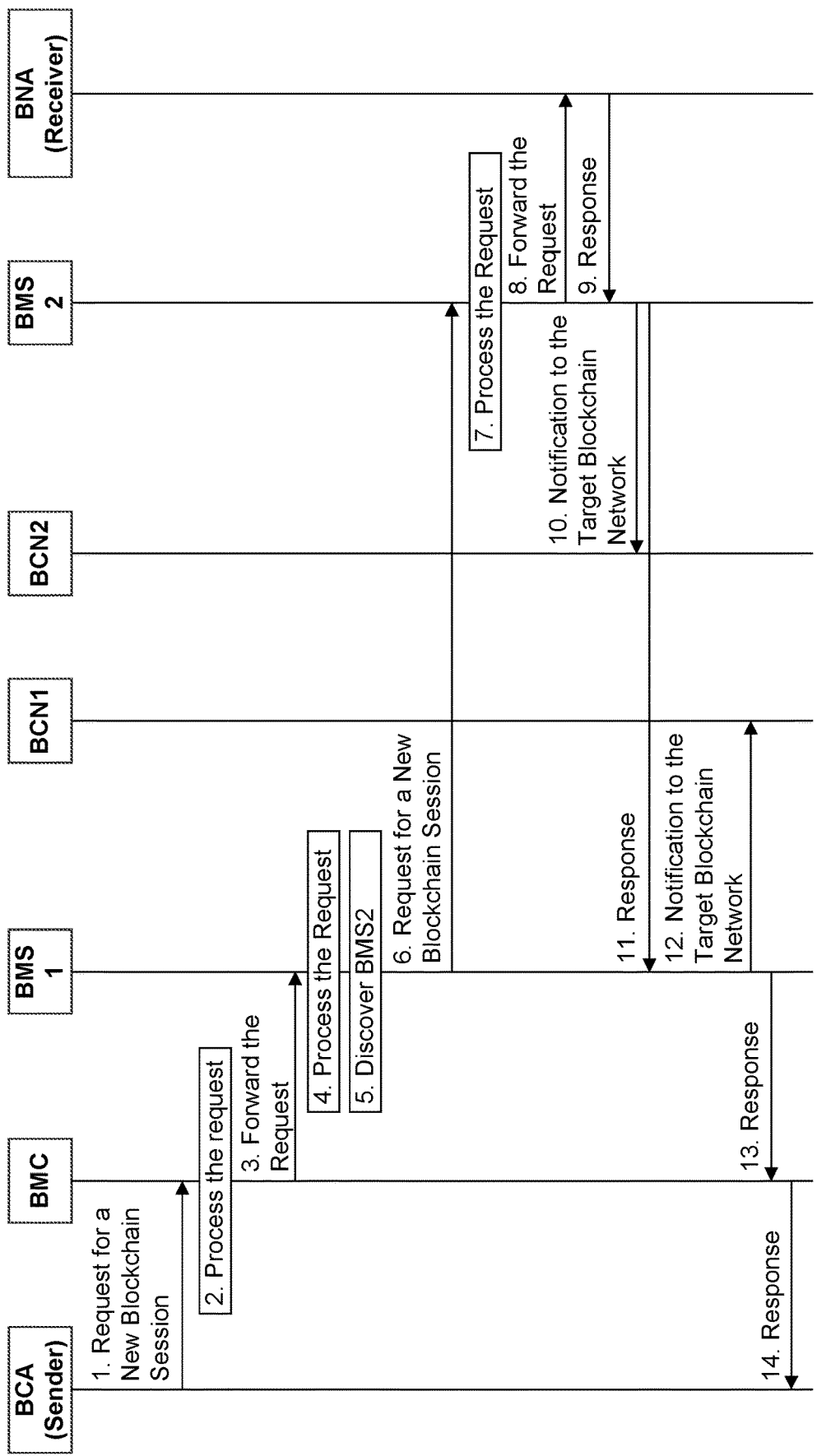
FIG. 13 illustrates an example sender-initiated unicast blockchain session establishment.

FIG. 13 illustrates the procedure for a sender (e.g., a BCA) to trigger to establish a unicast blockchain session with a receiver (e.g., a BNA) across a target blockchain network. The entities involved in this procedure include the BCA, a BMC, a BMS1, a BCN1, a BCN2, a BMS2, and the BNA. Note that the sender may be either the BCA or the BNA. The receiver may also be either the BCA/BMC or the BNA. The BMS1 accesses the target blockchain network via the BCN1, while the BMS2 accesses the target blockchain network via the BCN2.

In addition to the BCN1 and the BCN2, there may be more BCNs in the target blockchain network. In this procedure, the sender first may send a blockchain session request to the BMC, which may send the request to the BMS1. Then, the BMS1 contacts another the BMS2 requesting to establish a blockchain session towards the BNA. After receiving the request from the BMS1, the BMS2 decides if such a request can and/or be approved and satisfied. It then may send the request to the BNA. In the meantime, the BMS2 notifies the BCN2 of the blockchain session being established including its context information such as the identifier of the blockchain session (BCS-ID), the name of the target blockchain network (BNWK-NAME) and the type of transactions for the established blockchain session (TXN-TYPE). To complete the requested blockchain session establishment, the BMS2 may send a response to the BMS1 which may include the context information of the blockchain session being established. The BMS1 may notify the BCN1 of the context information of the blockchain session being established and generates a response to the BCA via the BMC. As a result of this process, the sender may start to use the established blockchain session including its context information (e.g., BCS-ID, BNWK-NAME, TXN-TYPE) to send messages to the receiver. This procedure occurs before the sender sends an original message via a target blockchain network to the receiver. Especially, when the sender has multiple sequential messages to be sent to the receiver, the sender may first establish a blockchain session with the receiver, then send messages to the receiver using the established blockchain session.

Pre-Condition: The BCA has registered to or associated with the BMC. The BMC has registered to or associated with the BMS1. The BCN1 and the BCN2 participate in the target blockchain network. The BMS1 knows the BCN1 and can communicate with it, while the BMS2 knows the BCN2 and can communicate with it. The BNA has registered to or associated with the BMS2. The BCA has discovered or configured with the BNA. The BCA knows the identifier of the BNA.

Step 1: The BCA may send a blockchain session establishment request to the BMC indicating the requirement for establishing a blockchain session between the BCA and the BNA. This request may include the following parameters. Note that the BCA may not provide TXN-TYPE and/or BNWK-NAME since the BMS1 (or the BMC) can and/or may help to assign and determine an appropriate TXN-TYPE and BNWK-TYPE for the BCA in Step 4 (or Step 2). Also, the BMS1 (or the BMC) may even have selected TXN-TYPE and BNWK-NAME for the BCA and have maintained the selection locally and may use them directly without explicit indication from the BCA.

SENDER-ID: The identifier of the sender BCA (e.g., a BCA-ID);

RECV-ID: The identifier of the receiver BNA (e.g., a BNA-ID);

TXN-TYPE: The type of blockchain transactions that may be generated to include original messages to be sent from the BCA to the BNA after the requested blockchain session is established. TXN-TYPE needs to be unique for each established blockchain session within the target blockchain network;

BNWK-NAME: The name of the target blockchain network which the blockchain transactions including original messages may be transmitted through;

BCS-TYPE: The type of blockchain session to be established, which may be unidirectional (e.g., from the BCA to the BNA) or bidirectional. If it is a bidirectional one, the BNA may leverage it to send messages to the BCA too;

BCS-LIFETIME: The requested lifetime for the blockchain session to be created;

BCS-SEC-REQ: The blockchain session security requirement indicating whether an original message needs to be encrypted when it is included in a blockchain transaction;

BCS-PRV-REQ: The blockchain session privacy requirement (PRV-REQ) indicating whether the identifier of the sender and the identifier of the receiver should not be exposed to the target blockchain network; and/or SENDER-SEC-CRED: Security credentials which the BMC has assigned to the sender BCA if any when the BCA registered itself to or associated itself with the BMC.

Step 2: The BMC may process the request received from Step 1. It authorizes if the BCA is allowed to establish a blockchain session, for example, based on security credentials SENDER-SEC-CRED if included in Step 1.

Step 3: The BMC may send the request to the BMS1. The BMC may append its identifier (e.g., a BMC-ID) in the request. If the following parameters are not included in Step 1, the BMC may determine them for the BCA based on some local blockchain messaging policies and the context information of the BCA. Alternatively, the BCA may have stored the values of these parameters in the BMC and the BMC looks up its local storage and determines the value of these parameters. Then, the BMC inserts these parameters including their determined values to the request before it may send the request to the BMS1.

TXN-TYPE: The type of blockchain transactions that may be generated to include original messages to be sent from the BCA to the BNA after the requested blockchain session is established. TXN-TYPE needs to be unique for each established blockchain session within the target blockchain network;

BNWK-NAME: The name of the target blockchain network which the blockchain transactions including original messages may be transmitted through;

BCS-TYPE: The type of blockchain session to be established, which may be unidirectional (e.g., from the BCA to the BNA) or bidirectional. If it is a bidirectional one, the BNA may leverage it to send messages to the BCA;

BCS-LIFETIME: The requested lifetime for the blockchain session to be created;

BCS-SEC-REQ: The blockchain session security requirement indicating whether an original message needs to be encrypted when it is included in a blockchain transaction; and/or BCS-PRV-REQ: The blockchain session privacy requirement (PRV-REQ) indicating whether the identifier of the sender and the identifier of the receiver should not be exposed to the target blockchain network.

Step 4: The BMS1 may process the request received from Step 3. It authorizes if the BCA/BMC has the right to establish a blockchain session over the target blockchain network based on information as included in the request such as SENDER-ID, RECV-ID, BNWK-NAME, TXN-TYPE, BCS-TYPE, BCS-SEC-REQ, and/or BCS-PRV-REQ. The BMS1 may check its local database to find the appropriate TXN-TYPE and BNWK-NAME, which may have been previously determined and configured for the BCA. As such, the BMS1 may just use such TXN-TYPE and BNWK-NAME if the BCA may indicate both parameters in Step 1.

Step 5: Using RECV-ID (e.g., the BNA-ID) included in Step 3, the BMS1 discovers the BMS2 which the BNA has registered to or associated with. If the BMS2 cannot be found, Steps 2-14 may be skipped.

Step 6: The BMS1 may send a request to the BMS2 indicating the requirement for establishing a blockchain session. This request may include the same or partial set of parameters as included in Step 3. The BMS1 may also include its identifier (BMS1-ID) and the BCN1's identifier (BCN1-ID) in this request. The BMS1 may overwrite the values of some parameters as included in Step 3. For instance, if TXN-TYPE received in Step 3 may not be unique for the target blockchain network, the BMS1 may generate a new and unique TXN-TYPE and may include it in this request to the BMS2. A unique TXN-TYPE may be a hash or other functions of BCA-ID, the BNA-ID, the BMS1-ID, a BMS2-ID, and a random number. If the indicated BNWK-NAME becomes unavailable, the BMS1 may choose a new target blockchain network and may include its name to the request to the BMS2.

Step 7: The BMS2 may process the request received from Step 6. It authenticates and authorizes if such a blockchain session with the BNA is allowed. The BMS2 may directly reject the request based on any pre-configured policy rules on behalf of the BNA. If the request is authorized, the BMS2 may create the requested blockchain session with an identifier (e.g., BCS-ID) and a lifetime (BCS-LIFETIME); BCS-ID should be unique within the target blockchain network. If the BCN2 is not available, the BMS2 may discover a new BCN for the target blockchain network as denoted by BNWK-NAME. When discovering a new BCN, the BMS2 may leverage the BCN1 information as received in Step 6 to select the BCN2 which is closer to the BCN1 to improve the routing efficiency when transactions are forwarded between the BCN1 and the BCN2 after the session is established. When discovering a new BCN, the BMS2 may contact the BMS1 to find one for it. In this case, the BMS1 may also select the BCN2 which is closer to the BCN1 to improve the routing efficiency when transactions are forwarded between the BCN1 and the BCN2 after the session is established. If the BCN2 is not available, and the BMS2 may not find a new BCN (even after soliciting help from the BMS1), the BMS2 may reject this request. As a result, the BMS2 skips Steps 8-10 and may send a response indicating a failure to the BMS1 in Step 10.

Each created blockchain session has a set of associated parameters, referred to as its context information (e.g., BCS-CONTEXT). As shown in FIG. 14, BCS-CONTEXT of a blockchain session may include the following fields in two parts: Blockchain-Exposable part (e.g., BCS-CONTEXT-P1) and Privacy-Protected part (BCS-CONTEXT- P2). The BMSs may store the whole BCS-CONTEXT locally or in a standalone BSCSF, while the BCNs may (e.g., may only) store BCS-CONTEXT-P2 locally or in a standalone BSCSF. Parameters included in BCS-CONTEXT for a blockchain session include:

- BCS-ID: Indicates the identifier of this established blockchain session, which is unique within the target blockchain network;
- BNWK-NAME: Indicates the name of a target blockchain network, which this blockchain session may be carried over;
- BCS-TYPE: Indicates the type of this blockchain session, which may be unidirectional or bi-directional; If this parameter indicates a bi-directional session, other parameters including S-BMS-ID, R-BMS-ID, S-BCN-ID, R-BCN-ID, S-APP-ID, R-APP-ID, S-DEVICE-ID, and R-DEVICE-ID represent both a sender role and a receiver role.
- BCS-LIFETIME: Indicates the lifetime set for this blockchain session. After this time duration, BCS-CONTEXT became invalid and may be removed;
- S-BMS-ID: Indicate the identifier of the BMS as a sender for this blockchain session. In other words, this BMS is responsible for transforming original messages into blockchain transactions with the type set to TXN-TYPE and send these blockchain transactions to a BCN as denoted by S-BCN-ID;
- R-BMS-ID: Indicates the identifier of all BMSs as a receiver for this blockchain session. In other words, these BMSs receive blockchain transactions with the type set to TXN-TYPE from the BCNs as denoted by R-BCN-ID and recover original messages from these blockchain transactions;
- S-BCN-ID: Indicates the identifier of the BCN as a sender for this blockchain session. This BCN is responsible for receiving blockchain transaction with the type set to TXN-TYPE from the BMS as denoted by S-BMS-ID and sending these transactions to the target blockchain network as denoted by BNWK-NAME;
- R-BCN-ID: Indicates the identifier of all BCNs as a receiver for this blockchain session. These BCNs receive blockchain transactions with the type set to TXN-TYPE from the target blockchain network and may send them to BMSs as denoted by R-BMS-ID;
- TXN-TYPE: Indicates the type of transactions to be sent over this blockchain session. TXN-TYPE is unique within the target blockchain network for each blockchain session;
- APP-TYPE: Indicates the type of the application to use this blockchain session;
- S-APP-ID: Indicates the identifier of the BCA or the BNA which is the sender for generating original messages and using this blockchain session for transmitting them;
- S-DEVICE-ID: Indicates the identifier of the device which may host the BCA or the BNA as the sender as denoted by S-APP-ID;
- R-APP-ID: Indicates the identifier of all BCAs and/or BNAs as a receiver of this blockchain session. If this session is a unicast session, R-APP-ID only stands for one BCA or one BNA. If this session is a multicast session, R-APP-ID may include a list of identifiers of BCAs and/or BNAs; and
- R-DEVICE-ID: Indicates the identifier of devices which host BCAs or BNAs as the receiver as denoted by R-APP-ID.

After the BMS2 creates the requested blockchain session in Step 7, the BMS2 sets its context information as follows an example:

BCS-ID="12345678"
BCS-TYPE="UNIDIRECTIONAL"
BCS-LIFETIME=600 (unit: second)
S-BMS-ID=BMS1-ID
R-BMS-ID=BMS2-ID
S-BCN-ID=BCN1-ID
R-BCN-ID=BCN2-ID
TXN-TYPE="EVENT-NOTIF"
BNWK-NAME="BNWK1234"
APP-TYPE="INTERNET-OF-VEHICLE"
S-APP-ID=BCA-ID
S-DEVICE-ID=DEV1-ID (assume Device1 which hosts the BCA have the identifier DEV1-ID)
R-APP-ID=BNA-ID
R-DEVICE-ID=DEV2-ID (assume Device2 which hosts the BCA have the identifier DEV2-ID)

Step 8: The BMS2 may send a request to the BNA. The request may include the whole BCS-CONTEXT of the created blockchain session for the BNA or just part of it such as the BCA-ID, BCS-ID, BCS-TYPE, and BCS-LIFETIME.

Step 9: The BNA may send a response to the BMS2. If the BNA rejects the created blockchain session, it may indicate a rejection in this response, and the BMS2 may skip Step 10. In this response, the BNA may request the BMS2 to change the established blockchain session from unidirectional to bidirectional. The BNA may also request to change other context information of this created blockchain session. In this response, the BNA may indicate that it also needs to send messages to the BCA. As a result, the BMS2 sets BCS-TYPE="BIDIRECTIONAL" and updates BCS-CONTEXT as created in Step 7.

Step 10: The BMS2 may send a notification to the BCN2. This notification may include the Blockchain-Exposable part of BCS-CONTEXT of the created blockchain session in Step 7. The BCN2 may store the entire or a partial of BCS-CONTEXT-P1 for the BMS2 locally or in a standalone BSCSF. In the future, when the BCN2 receives a blockchain transaction, it may compare its transaction type (e.g., TXN-TYPE) and/or blockchain session identifier (e.g., BCS-ID) included in the received transaction with the one(s) included in BCS-CONTEXT-P1, and may be able to determine the right BMS (e.g., R-BMS-ID), which the received transaction should be forwarded to. The BCN2 may set an expiration timer equal to BCS-LIFETIME for BCS-CONTEXT-P1. After this timer gets expired, the BCN2 may safely remove BCS-CONTEXT-P1.

If BCS-TYPE in BCS-CONTEXT-P1 indicates that the established blockchain session is bidirectional, it means that the BMS2 may send some transactions via the target blockchain network to the BMS1. In other words, the BCN2 may send transactions through the target blockchain network to the BCN1. In order to expedite such transaction forwarding between the BCN2 and the BCN1, the BCN2 may add the BCN1 as its direct next-hop peer so that the BCN2 may send (forward) transactions directly to the BCN1 to decrease the number of forwards and reduce transmission latency in the target blockchain network. The essential idea is to let a BMS instruct a BCN to appropriately select other BCNs as its direct next-hop peers and thus positively impact transaction forwarding within a blockchain target network, although this idea needs some changes to existing BCNs.

Step 11: The BMS2 may send a response to the BMS1, which may include BCS-CONTEXT of the blockchain session being created in Step 7. The BMS2 may have set BCS-TYPE="BIDIRECTIONAL" and include it in this response to notify the BMS1 that messages may also be sent from the BNA to the BCA via the same blockchain network. In this case, the BNA and the BCA act as both a receiver and a sender. The BMS1 may store the received BCS-CONTEXT locally or in a standalone BSCSF.

Step 12: Similar to Step 10, the BMS1 may send a notification including the entire of a partial of BCS-CONTEXT-P1 to the BCN1. The BCN1 may store the received BCS-CONTEXT-P1 locally or in a standalone BSCSF. This step may not be needed if the established blockchain session is unidirectional from the BCA to the BNA. But when the established blockchain session is unidirectional, the BMS1 still can and/or may send such a notification to the BCN1; with such a notification, the BCN1 would know the BCN2 (e.g., R-BCN-ID) and may add the BCN2 as its direct next-hop peer within the target blockchain network. As a result, when the BMS1 may send the BCN1 a blockchain transaction belonging to the establish blockchain session, the BCN1 may directly forward the transaction to the BCN2 and achieves a reduced latency and a faster transaction speed.

But when the established blockchain session is bidirectional between the BCA and the BNA (or bidirectional between the BMS1 and the BMS2), this step is needed so that the BCN1 can and/or may forward the right transactions to the BMS1 when the BNA may send messages to the BCA using the established blockchain session. The BCN1 also may set an expiration timer for BCS-CONTEXT-P1 and discard it when the timer becomes expired.

Step 13: The BMS1 may send a response to the BMC including the identifier of the established blockchain session (or the whole BCS-CONTEXT-P1).

Step 14: The BMC may send the response to the BCA.

It is worth noting that the BCA may be hosted by a movable device such as a vehicle. When the device moves to a new location and the BCA cannot access the BMS1 anymore, the BCA needs to re-establish a new blockchain session with its receiver using the process in FIG. 13. When the BCA re-establishes a new blockchain session, it needs to select and register to a new sender BMS (referred to as New-BMS), which acts as the same role of the BMS1 (referred to as Old-BMS) in both FIG. 13. Then, the BCA may indicate the identifier of the Old-BMS (e.g., OLD-BMS-ID) to the New-BMS. The NEW-BMS may contact the OLD-BMS to retrieve the context information of the blockchain session which the BCA has had with the Old-BMS. The New-BMS may leverage such context information to expedite the reestablishment process (e.g., to reuse the blockchain session identifier (e.g., BCS-ID), to reuse the receiver BMS (e.g., R-BMS-ID), to reuse the receiver BCN (e.g., R-BCN-ID), etc.)

Figure 15:
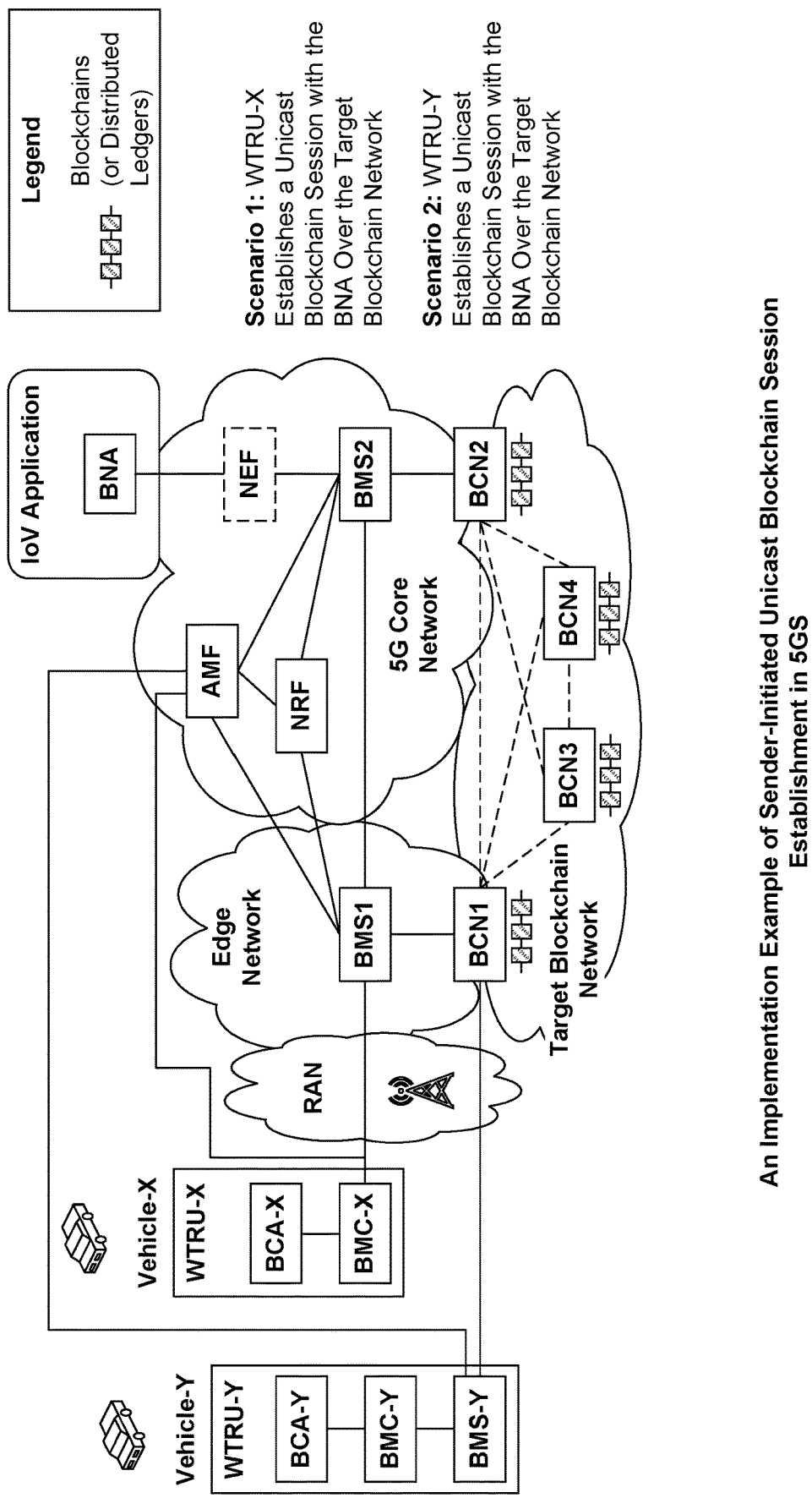
FIG. 15 illustrates an example of sender-initiated unicast blockchain session establishment in 5GS.

FIG. 15 illustrates an implementation example of sender-initiated unicast blockchain session establishment in 5GS, according to the procedure in FIG. 13. In this example, the 5GS consists of two WTRUs (e.g., WTRU-X representing Vehicle-X and WTRU-Y representing Vehicle-Y), a RAN, an edge network, a core network, and an IoV application. The IoV application is a BNA. There is a target blockchain network consisting of four BCNs, among which the BCN1 and the BCN2 are leveraged by 5GS. The edge network may host the BMS1 and a BCN1, while the BMS2 and a BCN2 reside in the core network. The BMS1 interacts with BCN1, while the BMS2 interfaces with BCN2. The BNA registers to and communicates with the BMS2, which may be optionally through an NEF. WTRU-X may include a BCA-X and a BMC-X, which register to and communicate with the BMS1. In contrast, WTRU-Y may include a BCA-Y, a BMC-Y, and a BMS-Y. The BMS-Y may communicate with the BMS2 via WTRU-Y's serving AMF. The BMS-Y also interacts with BCN1 through the RAN and the edge network. The BMS1, the BMS2, and the BMS-Y as a function may register to an NRF hosted in the core network. As a result, they may discover each other including BCAs and BNAs being registered with them. Note that the BMS-Y may register to the NRF via WTRU-Y's serving AMF. The following two blockchain session establishment scenarios may be realized using the procedure shown in FIG. 13.

Scenario 1: WTRU-X may host a BCA and a BMC and cannot talk to a BCN directly. It needs to establish a unicast blockchain session with a BNA over the target blockchain network. For this scenario, a BCA-X has registered to a BMC-X. The BMC-X has registered to a BMS1, which may be done via WTRU-X's serving AMF. Using the procedure shown in FIG. 13, the BCA-X first may send a unicast blockchain session establishment request including the identifier of the BNA (e.g., a BNA-ID) to the BMS1 via the BMC-X. The BMS1 may process this request and discovers the BMS2 using the BNA-ID from the NRF. Then, the BMS1 may send the unicast blockchain session establishment request to a BMS2, which may also include WTRU-X's identifier. The BMS2 authorizes the request and may create the requested unicast blockchain session over the target blockchain network (as denoted by BNWK-NAME) with a unique session identifier and transaction type. Then, the BMS2 informs both the BNA and the BCN2. The BMS2 also may send a response to the BMS1 indicating the created unicast blockchain session and its context information. The BMS1 may notify the BCN1 of the created unicast blockchain session and its context information (e.g., the BCN2-ID) and also may send the response to the BCA-X via the BMC-X. The BCN1 and the BCN2 may add each other as their direct next-hop peer so that they can send blockchain transactions to each other directly without relaying by the BCN3 and/or the BCN4, for instance.

Scenario 2: WTRU-Y may host a BMS and can interact with a BCN directly. It needs to establish a unicast blockchain session with a BNA over the target blockchain network. For this scenario, a BCA-Y has registered to a BMC-Y. The BMC-Y has registered to a BMS-Y. Using the procedure shown in FIG. 13, a BCA-X first may send a unicast blockchain session establishment request including the identifier of the BNA (e.g., a BNA-ID) to the BMS-Y via the BMC-Y. The BMS-Y may process this request and discovers a BMS2 using the BNA-ID from the NRF. Note that the BMS-Y may talk to the NRF via WTRU-Y's serving AMF. Then, the BMS-Y may send the unicast blockchain session establishment request to the BMS2 via WTRU-Y's serving AMF, which may also include WTRU-Y's identifier. The BMS2 authorizes the request and may create the request unicast blockchain session over the target blockchain network (as denoted by BNWK-NAME) with a unique session identifier and transaction type. Then, the BMS2 informs both the BNA and a BCN2. The BMS2 also may send a response to the BMS-Y indicating the created unicast blockchain session and its context information via WTRU-Y's serving AMF. The BMS-Y may notify a BCN1 of the created unicast blockchain session and its context information (e.g., a BCN2-ID) and also may send the response to the BCA-Y via the BMC-Y. The BCN1 and the BCN2 may add each other as their direct next-hop peer so that they can send transactions to each other directly without relaying by a BCN3 and/or a BCN4, for instance.

The procedure shown in FIG. 13 is an on-demand approach, where the BMS1 passively waits for a session request from the BCA when the BCA needs to send a message. This approach introduces some extra latency since the message cannot be transmitted immediately before the whole session establishment process is completed. In some cases, the BMS may proactively and intelligently decide to establish blockchain sessions beforehand for some BCAs and/or BNAs without any request from them. As such, when a BCA (or a BNA) does need to establish a session, the BMS does not need to perform the whole session establishment process and may assign an established session to the BCA (or the BNA), which helps to latency reduction.

Figure 16:
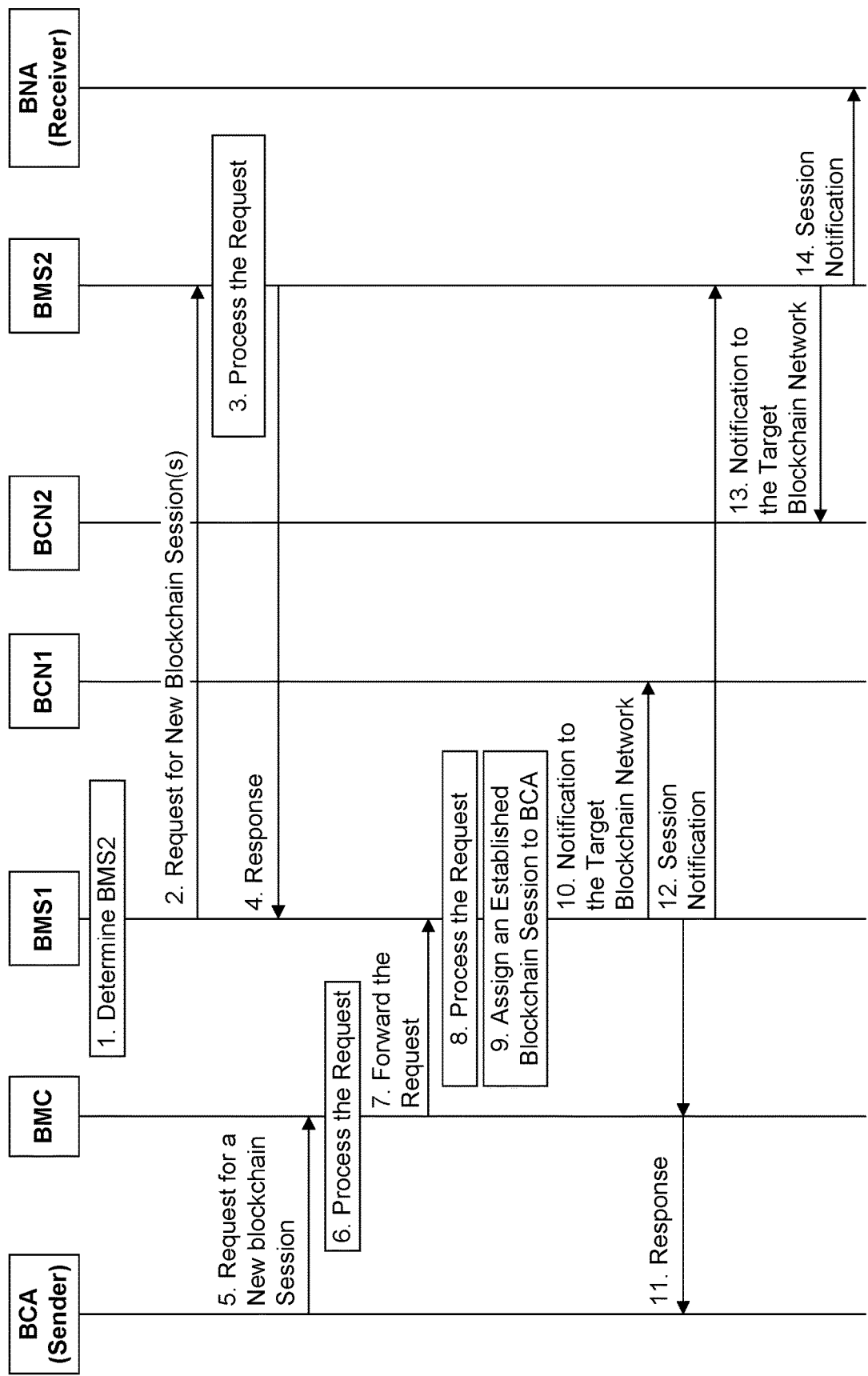
FIG. 16 illustrates an example BMS-initiated unicast blockchain session establishment.

FIG. 16 illustrates another procedure for a BMS1 to proactively trigger to establish one or multiple unicast blockchain sessions with another BMS2 across a target blockchain network. Then, the BMS1 may select and assign an established unicast blockchain session to a sender (e.g., a BCA) when the sender requests a unicast blockchain session from the BMS1. The entities involved in this procedure include the BCA, a BMC, the BMS1, a BCN1, a BCN2, a BMS2, and a BNA as the receiver. Note that the sender may be either the BCA or the BNA. The receiver may also be either the BCA/BMC or the BNA. The BMS1 accesses the target blockchain network via the BCN1, while the BMS2 accesses the target blockchain network via the BCN2. In addition to the BCN1 and the BCN2, there may be more BCNs in the target blockchain network.

In this procedure, the BMS1 first contacts the BMS2 requesting to establish one (or multiple) unicast blockchain session(s) between them across the target blockchain network. After receiving the request from the BMS1, the BMS2 decides if such a request can and/or may be approved and satisfied. If the request is approved, the BMS2 may create one (or multiple) unicast blockchain session(s) as requested. In the meantime, the BMS2 may notify the BCN2 of the unicast blockchain session being established including its context information (BCS-CONTEXT) such as the identifier of the unicast blockchain session (BCS-ID), the name of the target blockchain network (BNWK-NAME) and/or the type of transactions for the established unicast blockchain session (TXN-TYPE). To complete the blockchain session establishment, the BMS2 may send a response to the BMS1 which may include the context information of the blockchain session being established. Then, the BMS1 may notify the BCN1 of the context information of the blockchain session being established. When the BCA sends a blockchain session request to the BMS1 via the BMC to request to establish a unicast blockchain session with the BNA, the BMS1 selects and assigns an established unicast blockchain session to the BCA. Then, the BMS1 may notify the BMS2 of such an assignment, which the BMS2 may inform the BNA as well. This procedure occurs before the sender sends an original message via a target blockchain network to the receiver. Especially, when the sender has multiple sequential messages to be sent to the receiver, the sender may first establish a blockchain session with the receiver, then send messages to the receiver using the established blockchain session.

Pre-Condition: The BCA has registered to or associated with the BMC. The BMC has registered to or associated with the BMS1. The BCN1 and the BCN2 participate in the target blockchain network. The BMS1 knows the BCN1 and can communicate with it, while the BMS2 knows the BCN2 and can communicate with it. The BNA has registered to or associated with the BMS2. The BCA has discovered or configured with the BNA. The BCA knows the identifier of the BNA.

Step 1: The BMS1 discovers the BMS2 (or other BMSs) and decides to pre-establish one or multiple unicast blockchain sessions between the BMS1 and the BMS2 over the target blockchain network.

Step 2: The BMS1 may send a request to the BMS2 indicating the requirement for establishing a blockchain session. This request may include the following parameters:
The identifier of the BMS1 (e.g., a BMS1-ID);
The identifier of the BCN1 (e.g., the BCN1-ID);
The BMS1 may request to establish multiple unicast blockchain sessions with the BMS2.

For each session to be established, the following parameters may be presented:
BNWK-NAME: The name of the target blockchain network;
BCS-ID: The proposed identifier of the unicast blockchain session to be established;
TXN-TYPE: The type of blockchain transactions which the BMS1 may send to the BCN1 and the BMS2 needs to receive from the BCN2. TXN-TYPE needs to be unique for each established session within the target blockchain network;
BCS-TYPE: The type of blockchain session to be established, which may be unidirectional (e.g., from the BMS1 to the BMS2) or bidirectional. If it is a bidirectional one, the BMS2 may leverage it to send blockchain transactions to the BCN2 too.
BCS-SEC-REQ: Blockchain session security requirement indicating whether an original message needs to be encrypted when it is included in a blockchain transaction; and
BCS-PRV-REQ: Blockchain session privacy requirement indicating whether the identifier of the BCA and the identifier of the BNA should not be exposed to the target blockchain network.

Step 3: The BMS2 may process the request received from Step 2. It authenticates and authorizes if such a blockchain session request is allowed. The BMS2 may reject the request based on any pre-configured policy rules and/or if the target blockchain network and the BCN2 are available. If the BCN2 is not available, the BMS2 may discover a new BCN for the target blockchain network as denoted by BNWK-NAME. When discovering a new BCN, the BMS2 may contact the BMS1 to find one for it. If the BCN2 is not available, and the BMS2 may not find a new BCN (even after seeking help from the BMS1), it may reject the request. As a result, the BMS2 skips Step 4 and may send a response indicating a failure to the BMS1 in Step 5. If the request is authorized and approved, the BMS2 may create the requested blockchain session(s). The BMS2 may assign a lifetime (e.g., BCS-LIFETIME) and re-assign an identifier (e.g., BCS-ID) for each approved session. Note that BCS-ID should be unique for each established blockchain session within the target blockchain network. For each created blockchain session, the BMS2 maintains blockchain session context information (BCS-CONTEXT). BCS-CONTEXT may include two parts: 1) Blockchain-Exposable part (e.g., BCS-CONTEXT-P1) which consists of BNWK-NAME, TXN-TYPE, a BMS1-ID as a sender, the BCN1-ID as a sender, the BCN2-ID as a receiver, a BMS2-ID as a receiver, BCS-ID, BCS-TYPE, and BCS-LIFETIME; and 2) Privacy-Protected part (BCS-CONTEXT-P2) which is empty for the moment.

Step 4: The BMS2 may send a response to the BMS1, which may include BCS-CONTEXT of the blockchain session being created in Step 3. The BMS1 stores the received BCS-CONTEXT locally or store it to a BSCSF.

Step 5: The BCA may send a request to the BMC indicating the requirement for establishing a blockchain session between the BCA and the BNA. This request may include the following parameters.

SENDER-ID: The identifier of the sender BCA (e.g., a BCA-ID);

RECV-ID: The identifier of the receiver BNA (e.g., a BNA-ID);

TXN-TYPE: The type of blockchain transactions that may be generated to include original messages to be sent from the BCA to the BNA after the requested blockchain session is established. TXN-TYPE needs to be unique for each established blockchain session within the target blockchain network;

BNWK-NAME: The name of the target blockchain network which the blockchain transactions including original messages may be transmitted through;

BCS-TYPE: The type of blockchain session to be established, which may be unidirectional (e.g., from the BCA to the BNA) or bidirectional. If it is a bidirectional one, the BNA may leverage it to send messages to the BCA too;

BCS-LIFETIME: The requested lifetime for the blockchain session to be created;

BCS-SEC-REQ: The blockchain session security requirement indicating whether an original message needs to be encrypted when it is included in a blockchain transaction;

BCS-PRV-REQ: The blockchain session privacy requirement (PRV-REQ) indicating whether the identifier of the sender and the identifier of the receiver should not be exposed to the target blockchain network; and/or SENDER-SEC-CRED: Security credentials which the BMC has assigned to the sender BCA if any when the BCA registered itself to or associated itself with the BMC.

Step 6: The BMC may process the request received from Step 5. It authorizes if the BCA is allowed to establish a blockchain session, for example, based on security credentials if any included in Step 5.

Step 7: The BMC may send the request to the BMS1. The BMC may append its identifier (e.g., a BMC-ID) in the request. This request may include the same or a partial of parameters as included in Step 1. The BMC may perform similar operations as in Step 3 of FIG. 13, before the BMC may send this request to the BMS1.

Step 8: The BMS1 may process the request received from Step 7. It authorizes if the BCA has the right to establish a blockchain session over the target blockchain network based on information as included in this request such as the BCA-ID, BNWK-NAME, TXN-TYPE, SEC-REQ, and/or PRV-SEQ. Based on the BNA-ID included in Step 7, the BMS1 may search and knows it is the BMS2 that can reach the BNA.

Step 9: If the request is authorized, the BMS1 selects an appropriate blockchain session from the established ones with the BMS2. The context information of any selected blockchain session should match parameters as included in Step 7. Then, the BMS1 assigns the selected blockchain session to the BCA. Finally, the BMS1 may include the BCA-ID and the BNA-ID into BCS-CONTEXT-P2 of the selected session.

Step 10: The BMS1 may send a notification including BCS-CONTEXT-P1 as received in Step 4 to the BCN1. This step may not be needed if the established blockchain session is unidirectional from the BMS1 to the BMS2. Even if the established blockchain session is unidirectional, the BMS1 still may send such a notification to the BCN1; with such a notification, the BCN1 would know the BCN2 and may add the BCN2 as its direct next-hop peer within the target blockchain network. As a result, when the BMS1 may send the BCN1 a blockchain transaction belonging to the established blockchain session, the BCN1 may directly forward the transaction to the BCN2 and achieves a reduced latency and faster transaction speed.

But when the established blockchain session is bidirectional between the BMS1 and the BMS2, this step is needed so that the BCN1 can forward the right blockchain transactions to the BMS1 when the BMS2 may send blockchain transactions to the BCN2 towards the BCN1 using the established blockchain session. The BCN1 also may set an expiration timer for BCS-CONTEXT-P1 and discard it when the timer becomes expired.

Step 11: The BMS1 may send a response to the BCA via the BMC. This response may include the entire or a partial of BCS-CONTEXT of the established blockchain session which was assigned to the BCA in Step 9. When the BMC may send this response to the BCA, it may remove some parameters from this response but store them locally.

Step 12: The BMS1 may send a notification to the BMS2. This notification may include the identifier of the selected session in Step 9, the BCA-ID, and the BNA-ID.

Step 13: The BMS2 may send a notification to the BCN2. This notification may include the Blockchain-Exposable part of BCS-CONTEXT of the selected blockchain session in Step 9 and the BCN2 stores the entire or a partial of BCS-CONTEXT-P1 for the BMS2. In the future, when the BCN2 receives a blockchain transaction, it may compare its transaction type and/or blockchain session identifier included in the received transaction with the one(s) included in BCS-CONTEXT-P1, and may be able to determine the right BMS (e.g., R-BMS-ID), which the received transaction should be forwarded to. The BCN2 may set an expiration timer equal to BCS-LIFETIME for BCS-CONTEXT-P1. After this timer gets expired, the BCN2 may safely remove BCS-CONTEXT-P1.

If BCS-TYPE in BCS-CONTEXT-P1 indicates that the established blockchain session is bidirectional, it means that the BMS2 may send some blockchain transaction via the target blockchain network to the BMS1. In other words, the BCN2 needs to forward transactions through the target blockchain network to the BCN1. In order to expedite such blockchain transaction forwarding between the BCN2 and the BCN1, the BCN2 may add the BCN1 as its direct next-hop peer so that the BCN2 may forward transactions directly to the BCN1 to decrease the number of forwarding and reduce transmission latency in the target blockchain network. The essential idea is to let a BMS instruct a BCN to appropriately select other BCNs as its direct next-hop peers and thus expedite to forward transactions including application messages within a blockchain target network, although this idea introduces some changes to existing BCNs.

Step 14: From the notification received in Step 12, the BMS2 knows the BNA-ID and may send a notification to the BNA, which may include the whole BCS-CONTEXT or just part of it such as the BCA-ID, BCS-ID, and BCS-TYPE, as received from Step 12.

Representative Multicast Blockchain Session Establishment

Figure 17:
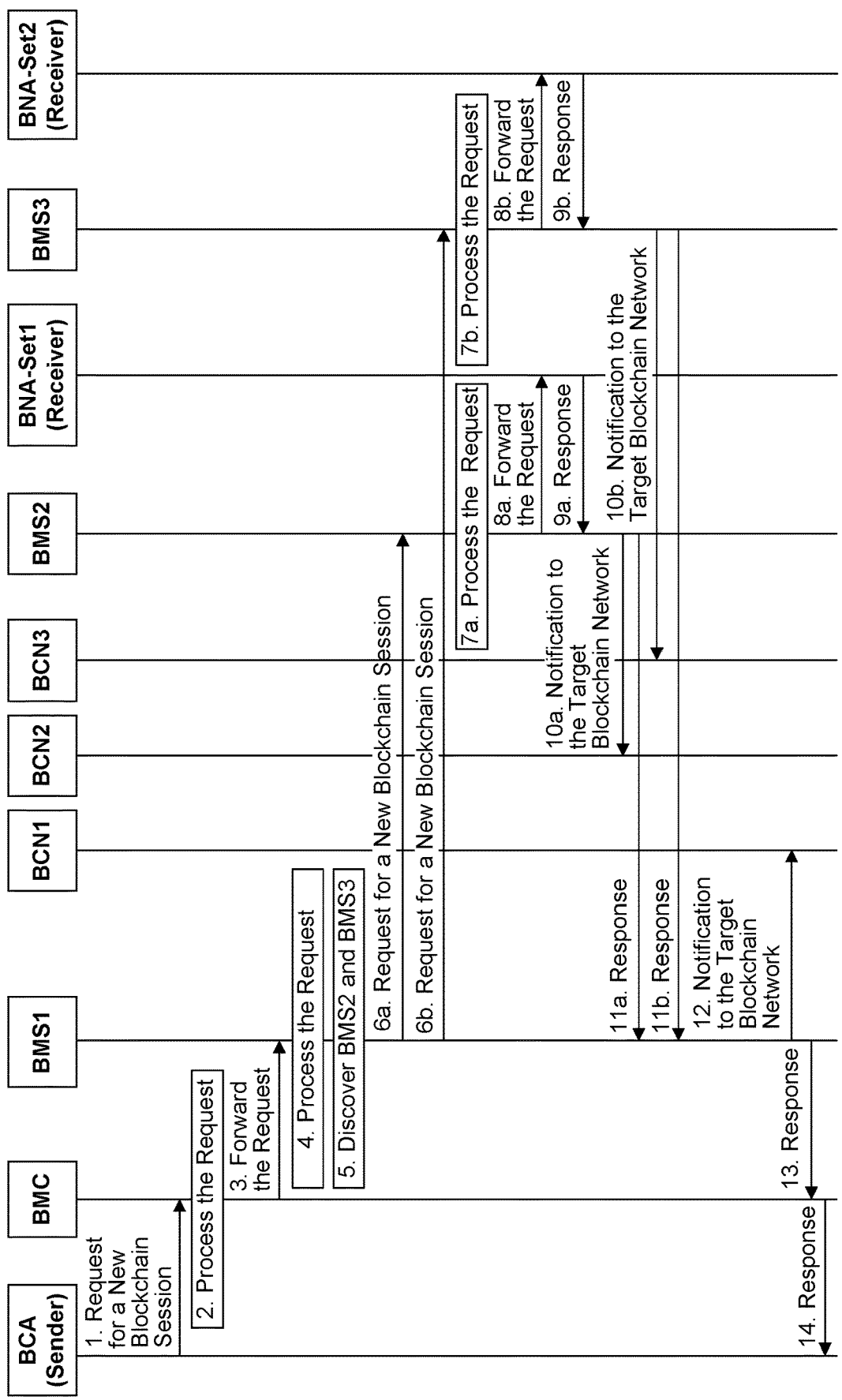
FIG. 17 illustrates an example sender-initiated multicast blockchain session establishment.

FIG. 17 illustrates the procedure for a sender (e.g., a BCA) to trigger to establish a multicast blockchain session with a group of receivers (e.g., a BNA-Set1 and a BNA-Set2) across a target blockchain network. The BNA-Set1 consists of multiple BNAs that have registered to or associated with a BMS2. The BNA-Set2 also may include multiple BNAs but they have registered to or associated with a different a BMS3. The entities involved in this procedure include the BCA, a BMC, a BMS1, a BCN1, a BCN2, a BCN3, the BMS2, a BMS3, and a group of BNAs included in the BNA-Set1 and the BNA-Set2. Note that the sender may be either the BCA or the BNA; each receiver may also be either the BCA/BMC or the BNA. The BMS1 accesses the target blockchain network via the BCN1, the BMS2 accesses the target blockchain network via the BCN2, and the BMS3 accesses the target blockchain network via the BCN3. The BCN2 and the BCN3 may be the same the BCN. In addition to the BCN1, the BCN2, and the BCN3, there may be more BCNs in the target blockchain network.

In this procedure, the sender first may send a blockchain session request to the BMC, which may send the request to the BMS1. Then, the BMS1 authenticates the request and generates a unique identifier for the multicast blockchain session (e.g., BCS-ID) to be established. Then the BMS1 contacts both the BMS2 and the BMS3 requesting to establish a multicast blockchain session with BCS-ID towards a group of BNAs. After receiving the request from the BMS1, the BMS2 and the BMS3 independently decide if such a request can and/or may be approved and satisfied. They then may send the request to their BNAs. In the meantime, the BMS2 may notify the BCN2 (and the BMS3 may notify the BCN3) of the blockchain session being established including its context information such as the identifier of the blockchain session (BCS-ID), the name of the target blockchain network (BNWK-NAME) and/or the type of transactions for the established blockchain session (TXN-TYPE). To complete the requested blockchain session establishment, both the BMS2 and the BMS3 send a response to the BMS1 which may include the context information of the blockchain session being established. The BMS1 may notify the BCN1 of the context information of the blockchain session being established and generates a response to the BCA via the BMC. As a result of this process, the sender may start to use the context information of the established multicast blockchain session (e.g., BCS-ID, BNWK-NAME, TXN-TYPE) to send messages to multiple receivers. This procedure occurs before the sender multicasts an original message via a target blockchain network to multiple receivers. Especially, when the sender has multiple sequential messages to be sent to these receivers, the sender may first establish a multicast blockchain session with these receivers, then send messages to them using the established multicast blockchain session.

Pre-Condition: The BCA has registered to or associated with the BMC. The BMC has registered to or associated with the BMS1. The BCN1, the BCN2 and the BCN3 participate in the target blockchain network. The BMS1 knows the BCN1 and can communicate with it, the BMS2 knows the BCN2 and can communicate with it, and the BMS3 knows the BCN3 and can communicate with it. The BNAs included in the BNA-Set1 have registered to or associated with the BMS2, while the BNAs included in the BNA-Set2 have registered to or associated with the BMS3. The BCA has discovered or configured with all BNAs and knows their identifiers. Alternatively, the BMS1 can discover all BNAs on behalf of the BCA.

Step 1: Similar to Step 1 in FIG. 13. It may differ in that Step 1 in FIG. 17 includes a list of identifiers of multiple BNAs as included in the BNA-Set1 and the BNA-Set2. Alternatively, the BCA may not indicate any specific receiver (e.g., BNAs or other BCAs) in this step, but may (e.g, may only) indicate a receiver filter (referred to as RECV-FILTER). When the context information of the BNA or the BCA meets this filter, it may be regarded as a receiver of the session being established. In other words, the BMS1 (or even the BMC) may receive RECV-FILTER from Step 1 and uses it to determine the right receivers by discovering any BNAs/BCAs which matches any condition as included in RECV-FILTER. For example, RECV-FILTER may include a geographical region. As a result, the BMS1 (or the BMC) may decide that any BCA or BNA that are currently located within this region is a receiver of the blockchain session being established.

Step 2: Same as Step 2 in FIG. 13. If RECV-FILTER is included in Step 1, the BMC may use it to discover and determine any appropriate BNA or the BCA as the receiver of the blockchain session being requested. Then the BMC may include any discovered receiver in Step 3.

Step 3: Same as Step 3 in FIG. 13. Any receiver if discovered and determined by the BMC in Step 2 may be included in Step 2. Alternatively, the BMC may insert a new RECV-FILTER in Step 3 on behalf of the BCA.

Step 4: Same as Step 4 in FIG. 13. If RECV-FILTER is included in Step 3, the BMS1 may use it to discover and determine any appropriate BNA or the BCA as the receiver of the blockchain session being requested.

Step 5: Based on the list of BNA identifiers included in Step 1 and/or Step 3, the receivers as included in Step 3, and the receivers as discovered in Step 4, the BMS1 may find all other BMSs which handle and may reach these BNAs/receivers. As an example, assume the BMS1 discover that some of the BNAs (e.g., in the BNA-Set1) have registered to the BMS2 with an identifier BMS2-ID), while all other BNAs (e.g., in the BNA-Set2) have registered to the BMS3 with an identifier BMS3-ID. Then, the BMS1 generates a unique identifier (e.g., BCS-ID) for the multicast blockchain session to be established. BCS-ID may be based on a BCA-ID, the BMS1-ID, the BMS2-ID, a BMS3-ID, the list of BNA identifiers, and/or a random number.

Step 6a: Similar to Step 6 in FIG. 13. The BMS1 may send a request to the BMS2 but may include an additional parameter BCS-ID.

Step 6b: Similar to Step 6 in FIG. 13. The BMS1 may send a request to the BMS3 but may include an additional parameter BCS-ID.

Step 7a: Similar to Step 7 in FIG. 13. The BMS2 may process the request received from Step 6a.

Step 7b: Similar to Step 7 in FIG. 13. The BMS3 may process the request received from Step 6b.

Step 8a: Similar to Step 8 in FIG. 13. The BMS2 may send a request sequentially to each BNA in the BNA-Set1. Step 8b: Similar to Step 8 in FIG. 13. The BMS3 may send a request sequentially to each BNA in the BNA-Set2.

Step 9a: Similar to Step 9 in FIG. 13. Each BNA in the BNA-Set1 may send a response to the BMS2. If the BNA rejects the created blockchain session, it may indicate a rejection in this response. If all BNAs in the BNA-Set1 reject the created blockchain session, the BMS2 may skip Step 10.

Step 9b: Similar to Step 9 in FIG. 13. Each BNA in the BNA-Set2 may send a response to the BMS3. If the BNA rejects the created blockchain session, it may indicate a rejection in this response. If all BNAs in the BNA-Set2 reject the created blockchain session, the BMS3 may skip Step 10.

Step 10a: Similar to Step 10 in FIG. 13. The BMS2 may send a notification to the BCN2.

Step 10b: Similar to Step 10 in FIG. 13. The BMS3 may send a notification to the BCN the BCN3.

Step 11a: Similar to Step 11 in FIG. 13. The BMS2 may send a response to the BMS1.

Step 11b: Similar to Step 11 in FIG. 13. The BMS3 may send a response to the BMS1.

Step 12: After receiving the responses from Step 11a and Step 11b, the BMS1 builds a complete context information of the established multicast blockchain session with two parts: 1) BCS-CONTEXT-P1 consisting of BNWK-NAME, TXN-TYPE, the BMS1-ID as a sender, a BCN1-ID as a sender, a BCN2-ID as a receiver, the BMS2-ID as a receiver, a BCN2-ID as a receiver, the BMS3-ID as a receiver, BCS-ID, BCS-TYPE, BCS-LIFETIME, etc.; and 2) BCS-CONTEXT-P2 may include the BCA-ID, the list of BNA identifiers, RECV-FILTER, etc. Then, the BMS1 may send a notification including the entire of a partial of BCS-CONTEXT-P1 to the BCN1. With this notification, the BCN1 would know the BCN2 and the BCN3. Then the BCN1 may add the BCN2 and the BCN3 as its direct next-hop peers within the target blockchain network. As a result, when the BMS1 sends to the BCN1 a blockchain transaction belonging to the established multicast blockchain session, the BCN1 may directly forward the transaction to the BCN2 and the BCN3 to achieve a reduced latency and a faster transaction speed.

Step 13: The BMS1 may send a response to the BMC including the entire or a partial of BCS-CONTEXT-P1.

Step 14: The BMC may receive the response from Step 13, may remove some parameters from the response and store them locally, and may send the response to the BCA.

Representative Message Unicast through a Blockchain Network

Figure 18:
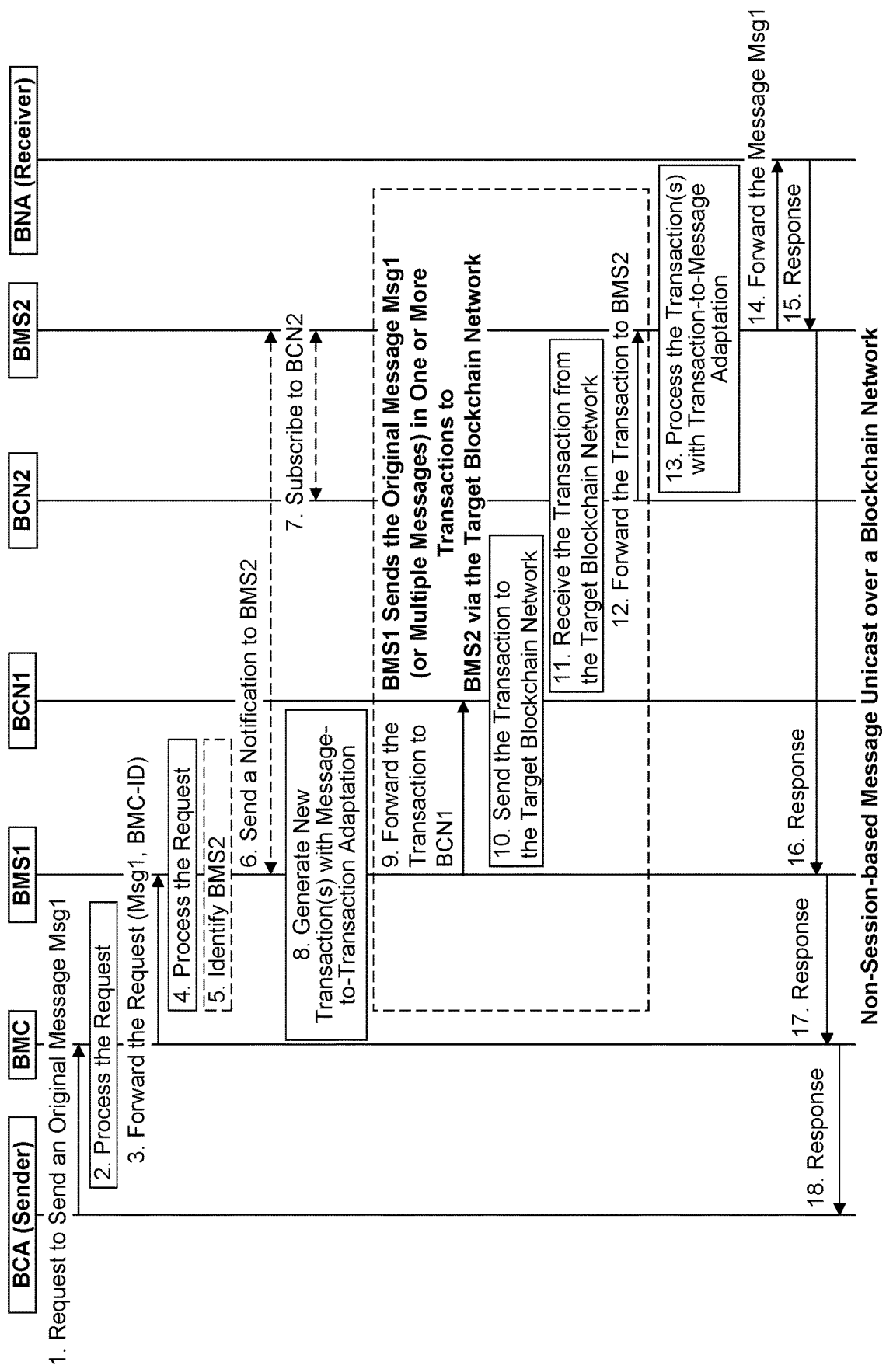
FIG. 18 illustrates an example non-session-based message unicast over a blockchain network.

FIG. 18 illustrates a procedure for a sender (e.g., a BCA) to send an original message to a receiver (e.g., a BNA) through a target blockchain network without using any blockchain session. The BCN1 and the BCN2 participate in the target blockchain network. The entities involved in this procedure include the BCA, a BMC, a BMS1, the BCN1, the BCN2, a BMS2, and the BNA. Note that the sender may be either the BCA or the BNA. The receiver may also be either the BCA or the BNA. In addition to the BCN1 and the BCN2, there may be more BCNs in the target blockchain network.

In this procedure, the sender first may send an original message to the BMC, which may forward the original message to the BMS1. The BMS1 generates a preliminary transaction including the original message and may send the preliminary transaction to the BCN1. The BCN1 generates a new blockchain transaction including the preliminary transaction and broadcast the new blockchain transaction within the target blockchain network; eventually, the BCN2 may receive the new blockchain transaction and recover the preliminary transaction, which may be forwarded to the BMS2. The BMS2 may be able to recover the original message from the preliminary transaction and send it to the receiver. As a result of this process, the original message is also stored into the target blockchain.

Pre-Condition: The BCA has registered to or associated with BMC. The BMC has registered to or associated with the BMS1. The BCN1 and the BCN2 participate in the target blockchain network. The BMS1 knows the BCN1 and can interact with it. The BMS2 knows the BCN2 and can communicate with it. The BNA has registered to or associated with the BMS2. The BCA has discovered or configured with the BNA. The BCA knows the identifiers of the BNA.

Step 1: The BCA may send a blockchain messaging request to the BMC. This request may include the original message Msg1, which is to be sent to the BNA. Both the identifier of the BCA (e.g., the BCA-ID) and the identifier of BNA (e.g., a BNA-ID) may be included in this request. Optionally, this request may include the following additional parameters:

The identifier of the BCN1 (e.g., BCN1-ID)

The name of the target blockchain network in which the BCN1 participates (e.g., BNWK-NAME).

The type of the transaction (e.g., TXN-TYPE) to be created in Step 8. A specific transaction type may be configured and used for the dedicated communications between the BCA and the BNA. With such a specific transaction type, the BMS1 and the BMS2 may indicate it to the BCN1 and the BCN2. As a result, the BCN2 (and any other BCNs) would be able to know that any transaction with this specific transaction type is for the BCA and the BNA and needs to be forwarded to the BMS2.

Step 2: The BMC may receive the request. It authenticates and authorizes if the BCA is allowed to send the original message via the BMC.

Step 3: The BMC may send the request to the BMS1 and optionally may include its identifier (e.g., a BMC-ID). The BMC may insert BNWK-NAME and TXN-TYPE into this request if both parameters are not included in Step 1.

Step 4: The BMS1 may process the request. It first obtains the BCA-ID and/or the BMC-ID and uses them to look up any applicable blockchain policy rules as maintained locally. Based on any found blockchain policy rule, the BMS1 authenticates and authorizes if the BCA is allowed to leverage the target blockchain network to send a message to the BNA. Based on these blockchain policy rules, the BMS1 may also determine an appropriate TXN-TYPE for the transaction to be created at Step 8 if it is not indicated in Step 1 or the one indicated in Step 1 is not allowed. Before performing the following steps, the BMS1 may send an immediate response to the BMC confirming that the request from Step 3 has been received.

Step 5: If the BMS1 has not known the BMS2 which the BNA has registered to or associated with, the BMS1 obtains the BNA-ID from the request as received in Step 3. Then, the BMS1 uses the BNA-ID to discover and determine the BMS2.

Step 6: The BMS1 may send a notification to the BMS2 to inform it that a message from the BCA may be sent to the BNA, which the BMS2 is responsible for. This notification may include BNWK-NAME, the BNA-ID, TXN-TYPE, a BMS1-ID, the BCN1-ID, etc. The BMS2 may receive the notification from the BMS1 and takes the BNA-ID to determine if it agrees to receive a message from the target blockchain network on behalf of the BNA. Then, the BMS2 may send a response to the BMS1 to inform the BMS1 if it agrees or not. In this response, the BMS2 may indicate a new TXN-TYPE and/or a new BNWK-NAME and request the BMS1 to use a different transaction type and/or a different target blockchain network. In addition, based on BCS-SEC-REQ in BCS-CONTEXT, the BMS1 may determine to encrypt the original message before it is included in a preliminary transaction (e.g., in Step 8). As such, the BMS1 may include sufficient decryption information in this notification, which the BMS2 may leverage to perform decryption in Step 13 in order to recover the original message.

Step 7: The BMS2 may send a request to the BCN2 to subscribe any future transaction with the type set to TXN-TYPE from the target blockchain network as denoted by BNWK-NAME. Note that both TXN-TYPE and BNWK-ID have been received and determined in Step 6. As a result, the BCN2 may forward any future transaction which it may receive from the target blockchain network with the type equal to TXN-TYPE (e.g., in Step 12) to the BMS2. The BCN2 maintains the mapping between TXN-TYPE and the BMS2. Note that, the BMS2 may leverage the BCN1 information as received in Step 6 to select a new BCN2 which is closer to the BCN1 to improve the routing efficiency when the transaction is forwarded between the BCN1 and the BCN2 through the target blockchain (e.g., between Step 10 and Step 11).

Step 8: The BMS1 may receive the response from the BMS2 as a part of Step 6. If the BMS2 has indicated a new BNWK-NAME in this response, the BMS1 may use it as the new target blockchain network to find a new BCN to replace the BCN1. If the BMS2 has indicated a new TXN-TYPE in this response, the BMS1 may use it to overwrite any TXN-TYPE as received or determined in previous steps. Then, the BMS1 takes the original message Msg1 as an input to generate one or multiple preliminary transactions with the type set to TXN-TYPE and corresponding target blockchain network set to BNWK-NAME, which is referred to as message-to-transaction adaptation since one original message may result in multiple preliminary transactions and/or multiple original messages may be all included in one preliminary transaction.

To let the BMS1 handle such message-to-transaction adaptation brings a multitude of benefits: 1) It first alleviates the complexity for the BCA and the BMC, from the sender's perspective; 2) It is transparent to the target blockchain network and has no impact to underlying blockchain networks and introduce the minimum change to the BCNs; 3) the BMS2 on the other end may perform the reverse process (e.g., transaction-to-message adaptation) in Step 13 to recover the original message(s), which mitigates the complexity for the BNA from the receiver's perspective; 4) the BMS1 may encrypt the original message before performing message-to-transaction adaptation while the BMS2 performs decryption after transaction-to-message adaptation. As such, the content of the original message is not exposed to the target blockchain network.

BMS1 and the BMS2 may negotiate some details of such message-to-transaction adaptation and transaction-to-message adaptation through Step 6 without introducing extra overhead to the target blockchain network.

Figure 19:
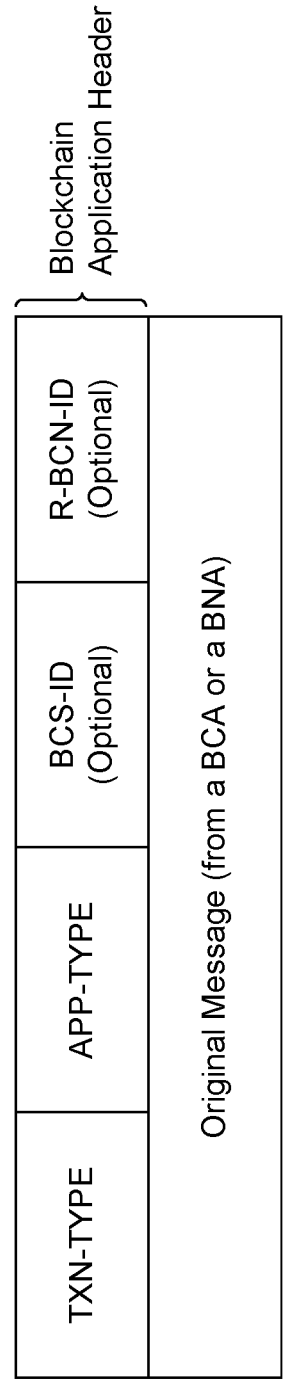
FIG. 19 illustrates an example format of preliminary transactions generated by a BMS for a target blockchain network.

The generated preliminary transaction may include the following fields as shown in FIG. 19.

TXN-TYPE: The type of this transaction (e.g., "MESSAGING");
APP-TYPE: The type of application which the BCA supports, and the original message belongs to (e.g., "INTERNET-OF-VEHICLES)"; and
The original message Msg1.

Note that BCS-ID and R-BCN-ID in FIG. 19 are for session-based message unicast and not needed for FIG. 18.

Step 9: The BMS1 may send the preliminary transaction generated in Step 8 to the BCN1. The BCN1 may also indicate BNWK-NAME to the BCN1, which may help the BCN1 to identify the target blockchain network, especially when the BCN1 participates in multiple blockchain networks.

Step 10: The BCN1 may receive the preliminary transaction from Step 8. The BCN1 generates a new blockchain transaction with the format shown in FIG. 20 by simply adding extra fields or parameters which are specific to the target blockchain network. The BCN1 may send the new blockchain transaction to the target blockchain network as denoted by BNWK-NAME. Note that when the new blockchain transaction is forwarded within the target blockchain network by other BCNs, these BCNs do not need to understand the content of the preliminary transaction (e.g., "Blockchain Application Header" or "Original Message").

Step 11: As a result of Step 7, the BCN2 has started to listen to the target blockchain network as denoted by BNWK-NAME. The BCN2 may receive the transaction from the blockchain network which was sent by the BCN1 in Step 10.

Step 12: The BCN2 may remove the fields specific to the target blockchain network from the received blockchain transaction and the rest part is the preliminary transaction. Then, it may send the preliminary transaction (e.g., Blockchain Application Header and the Original Message) to the BMS2. Note that the BCN2 needs to understand "Blockchain Application Header". For example, the BCN2 uses TXN-TYPE to look up the mapping information it maintains in Step 7 and may be able to find the BMS2.

If multiple preliminary transactions have been generated in Step 8, Steps 9-12 may be repeated multiple times until all these transactions have been successfully transmitted from the BMS1 to the BMS2.

Step 13: The BMS2 performs transaction-to-message adaptation to recover the original message(s) from the preliminary transaction(s) received in Step 12.

Step 14: The BMS2 may send the original message(s) to the BNA.

Step 15: The BNA may send a response to the BMS2 confirming the receipt of the original message(s). The BNA may explicitly indicate in this response that it needs this response to be stored in the same target blockchain network as well.

Step 16: The BMS2 may send the response to the BMS1 directly without going through the blockchain network to confirm that the original message(s) has been received by the BNA.

Alternatively, the BMS2 may send this response to the BMS1 through the same blockchain network, which is useful especially when the response for each transmitted message needs to be maintained in the same blockchain as well (e.g., as indicated by the BNA in Step 15, the BMS2 may decide this in Step 15, and/or the BMS1 may request this in Step 6 or Step 8). For doing this, the BMS2 may forward the response to the BCN2 indicating the BMS1 is the receiver. Then the BCN2 generates a new transaction including this response (referred to as a response transaction) and may send this response transaction to the same target blockchain network. This response transaction may include the sequence number or the identifier of the transaction generated in Step 8, which included the original message. this response transaction may be received by the BCN1 from the target blockchain network. The BCN1 may send the received response transaction to the BMS1. Finally, the BMS1 recovers the response from the response transaction and may now forward it to the BMC in Step 17. Essentially, the response generated by the BMS2 is not only delivered to the BMS1 but also stored in the target blockchain. If the transaction including the original message as generated in Step 8 is referred to as message transaction, this alternatively approach achieves to store the original message and the corresponding response in two separate transactions (e.g., the message transaction and the response transaction).

If the original message and the corresponding response need to be included in the same transaction as requested by the BCA/BNA or determined by the BMS1/BMS2, a new idea is proposed here to achieve this goal. When the BMS1 generates the message transaction in Step 8, it adds a new parameter (referred to as COMBINE-INDICATOR) to this transaction to indicate to the BCN1 (and all other BCNs participating in the same target blockchain network) that this transaction needs to be combine with a future response transaction. As such, the BCN1 and all other BCNs still may send this message transaction through the target blockchain network so that the BMS2 may receive it from the BCN2. However, with this COMBINE-INDICATOR parameter, the BCN1, the BCN2 and all other BCNs may not try to add the message transaction to a new block but keep it in the pending transaction pool, until they receive the corresponding response transaction. After receiving the response transaction, each BCN may use the sequence number or identifier of the message transaction as included in the response transaction to discover the corresponding message transaction from the pending transaction pool. Then each BCN may integrate the message transaction and the response transaction together a new and single transaction, which may be included into a new block now. Also, each BCN may still treat the message transaction and the response transaction as two separate transaction but always add them together into a new block.

Step 17: The BMS1 may send the response to the BMC confirming that the original message(s) has been received by the BNA.

Step 18: The BMC may send the response to the BCA confirming that the original message(s) has been received by the BNA.

After the transaction which was sent to the target blockchain network in Step 10 is added into the target blockchain and gets fully confirmed, the BCN1 (or the BCN2) may send a notification to the BMS1 (or the BMS2). If the BMS2 receives such a notification, it may forward the notification to the BMS1. Then, the BMS1 may notify the BCA via the BMC that the original message has also been successfully added into the target blockchain and fully confirmed.

Figure 21:
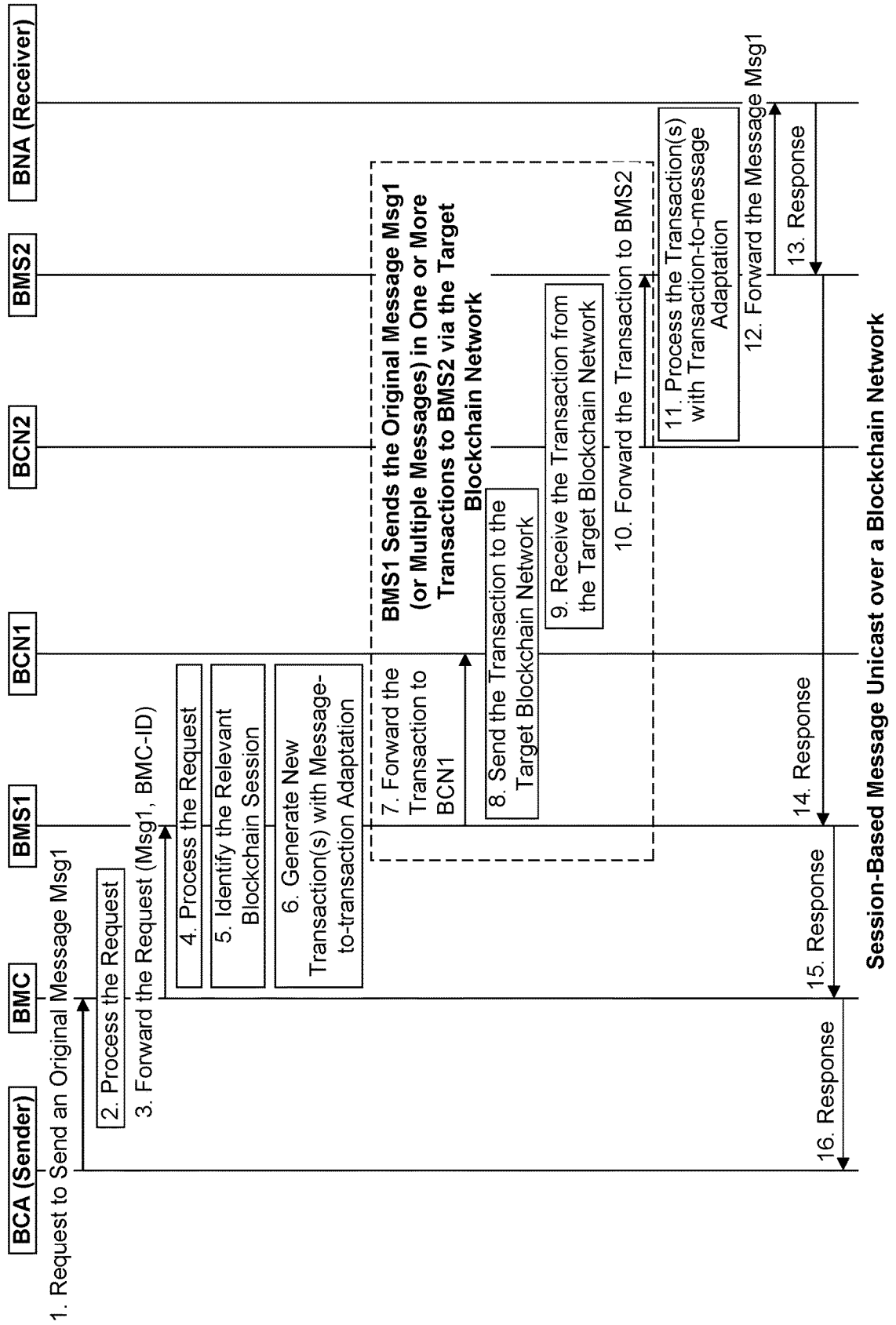
FIG. 21 illustrates an example session-based message unicast over a blockchain network.

FIG. 21 illustrates a procedure for a sender (e.g., a BCA) to send a message to a receiver (e.g., a BNA) via a target blockchain network using an established blockchain session. A BCN1 and a BCN2 participate in the target blockchain network. The entities involved in this procedure include the BCA, a BMC, a BMS1, the BCN1, the BCN2, a BMS2, and the BNA. Note that the sender may be either the BCA or the BNA. The receiver may also be either the BCA or the BNA. In addition to the BCN1 and the BCN2, there may be more BCNs in the target blockchain network.

In this procedure, the sender first may send an original message to the BMC, which may forward the original message to the BMS1. The BMS1 takes the original message and optionally packs it in a new message. Then, the BMS1 identifies the unicast blockchain session to be used for sending the new message. At last, the BMS1 uses the identified unicast blockchain session context information to generate a preliminary transaction including the new message. The BMS1 may send the preliminary transaction to the BCN1, which may generate a blockchain transaction based on the preliminary transaction. Then, the BCN1 broadcasts the blockchain transaction within the target blockchain network. Eventually, the BCN2 may receive this blockchain transaction and recover the preliminary transaction, which may be forwarded to the BMS2. The BMS2 may be able to recover the original message from the received preliminary transaction. The BMS2 may send the original message to the receiver. As a result of this process, the original message is also stored in the target blockchain.

Pre-Condition: The BCA has registered to or associated with the BMC. The BMC has registered to or associated with the BMS1. The BCN1 and the BCN2 participate in the target blockchain network. The BMS1 knows the BCN1 and can interact with it, while the BMS2 knows the BCN2 and can communicate with it. The BNA has registered to or associated with the BMS2. The BCA has discovered or configured with the BNA and knows its identifier. The BCA and the BNA have established one (or multiple) unicast blockchain sessions or the BMS1 and the BMS2 have established one (or multiple) unicast blockchain sessions that can be or might have been assigned to the BCA and the BNA.

Step 1: The BCA may send a messaging request to the BMC. This request may include the original message Msg1, which is to be sent to the BNA. Both the identifier of the BCA (e.g., the BCA-ID) and the identifier of the BNA (e.g., a BNA-ID) may be included in this request. Optionally, this request may include the following additional parameters:

The identifier of the unicast blockchain session (e.g., BCS-ID) to be used for transmitting the original message from the BCA to the BNA; or The transaction type (e.g., TXN-TYPE) as included in BCS-CONTEXT, which is the context information of the unicast blockchain session to be used for transmitting the original message from the BCA to the BNA.

Step 2: The BMC may receive the request. It authenticates and authorizes if the BCA is allowed to send the original message via the BMC.

Step 3: The BMC may send the request to the BMS1 and optionally may include its identifier (e.g., a BMC-ID). The BMC may insert BCS-ID and/or TXN-TYPE into this request on behalf of the BCA, if both parameters were not concluded in Step 1. Even both parameters were included in Step 1, the BMC may overwrite them.

Step 4: The BMS1 may process the request. It first obtains the BCA-ID and/or the BMC-ID and uses them to look up any applicable blockchain policy rules as maintained locally. Based on any found blockchain policy rule, the BMS1 authenticates and authorizes if the BCA is allowed to leverage the blockchain session and the target blockchain network to send messages to the BNA.

Step 5: The BMS1 identifies a relevant unicast blockchain session, which may be used to transmit the original message as included in the request received from Step 3. There are two possibilities: 1) BCS-ID or TXN-TYPE were included in Step 3, which the BMS1 may use to easily identify the unicast blockchain session; 2) if neither BCS-ID nor TXN-TYPE was included in Step 3, the BMS1 may use the BCA-ID and the BNA-ID to check if it has assigned a unicast blockchain session to the BCA and the BNA. If an existing unicast blockchain session is identified, the BMS1 retrieves its context information (e.g., BCS-CONTEXT) from its local storage or from a standalone BSCSF. The BCS-CONTEXT may include parameters such as the session identifier (BCS-ID), session type (BCS-TYPE), transaction type (TXN-TYPE), the name of the target blockchain network (BNWK-NAME), the identifier of the BCN1 (BCN1-ID), the identifier of the BMS2 (BMS2-ID), etc.

If the BMS1 does not identify any applicable unicast blockchain session after Step 5, it may use Steps 5-14 in FIG. 13 or Steps 9-14 in FIG. 16 to establish a new unicast blockchain session or assign an established unicast blockchain session for the BCA and the BNA.

Step 6: After identifying the relevant unicast blockchain session in Step 5, the BMS1 may leverage its context information to transform the original message as received in Step 3 into preliminary transactions what match the context information of the unicast blockchain session. Basically, the BMS1 takes the original message Msg1 as an input to generate one or multiple preliminary transactions, which is referred to as message-to-transaction adaptation since one original message may result in multiple preliminary transactions and/or multiple original messages may be all included in one preliminary transaction. Each generated preliminary transaction may include fields such as: Transaction Type (set to TXN-TYPE from BCS-CONTEXT), Application Type (set of APP-TYPE from BCS-CONTEXT), Session Identifier (set to BCS-ID from BCS-CONTEXT), and/or the Identifier of the BCN2 (e.g., R-BCN-ID from BCS-CONTEXT). The generated preliminary transaction follows the format as shown in FIG. 19.

Step 7: The BMS1 may send the preliminary transaction to the BCN1. The BCN1 may use TXN-TYPE or BCS-ID included in the preliminary transaction to identify the target blockchain network, which is required especially when the BCN1 participates in multiple blockchain networks. Alternatively, the BMS1 may also indicate BNWK-NAME to the BCN1, which may help the BCN1 to identifier the target blockchain network.

Step 8: The BCN1 may receive the preliminary transaction and adds extra fields specific to the target blockchain network to generate a new blockchain transaction according to the format shown in FIG. 20. Then, it may send the new blockchain transaction to the target blockchain network as denoted by BNWK-NAME.

Step 9: The BCN2 may receive the new blockchain transaction from the target blockchain network which was sent by the BCN1 in Step 8. It leverages BCS-ID or TXN-TYPE to search its locally maintained blockchain session context information or from a standalone BSCSF, in order to identify the relevant unicast blockchain session (e.g., its session identifier is equal to BCS-ID included in this blockchain transaction or its transaction type is equal to TXN-TYPE included in this blockchain transaction), which this transaction is sent over. As a result, it extracts its BCS-CONTEXT including the identifier of the BMS2.

Step 10: The BCN2 may remove the fields specific to the target blockchain network from the received blockchain transaction. As a result, the BCN2 recovers the preliminary transaction generated by the BMS1 in Step 6 and may send the recovered preliminary transaction to the BMS2.

If multiple preliminary transactions have been generated in Step 6, Steps 7-10 may be repeated multiple times until all these preliminary transactions have been successfully transmitted from the BMS1 to the BMS2.

Step 11: The BMS2 performs transaction-to-message adaptation to recover the original message(s) from the preliminary transaction(s) as received from Step 10. In this step, the BMS2 may search corresponding BCS-CONTEXT from its local storage or from a standalone BSCSF.

Step 12: The BMS2 may send the original message(s) to the BNA.

Step 13: The BNA may send a response to the BMS2 confirming the receipt of the original message(s).

Step 14: The BMS2 may send the response to the BMS1 confirming that the original message(s) has been received by the BNA.

Step 15: The BMS1 may send the response to the BMC confirming that the original message(s) has been received by the BNA.

Step 16: The BMC may send the response to the BCA confirming that the original message(s) has been received by the BNA.

After the transaction which was sent to the target blockchain network in Step 8 is added into the target blockchain and gets fully confirmed, the BCN1 (or the BCN2) may send a notification to the BMS1 (or the BMS2). If the BMS2 receives such a notification, it may forward the notification to the BMS1. Then, the BMS1 may notify the BCA via the BMC that the original message has also been successfully added into the target blockchain and fully confirmed.

Representative Message Multicast through one Blockchain Network

Figure 22:
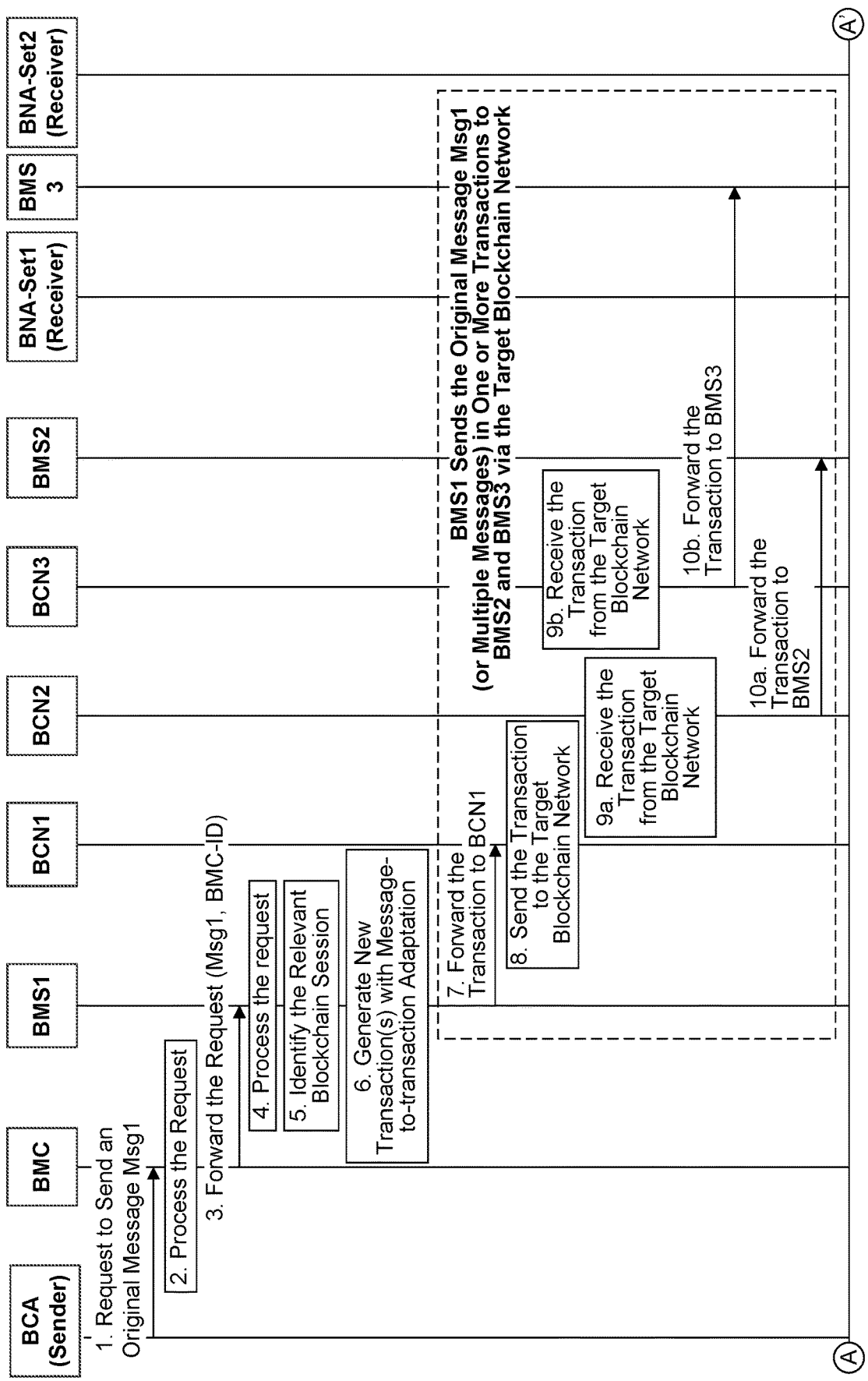
FIG. 22 illustrates an example session-based message multicast over a blockchain network.
Figure 22:
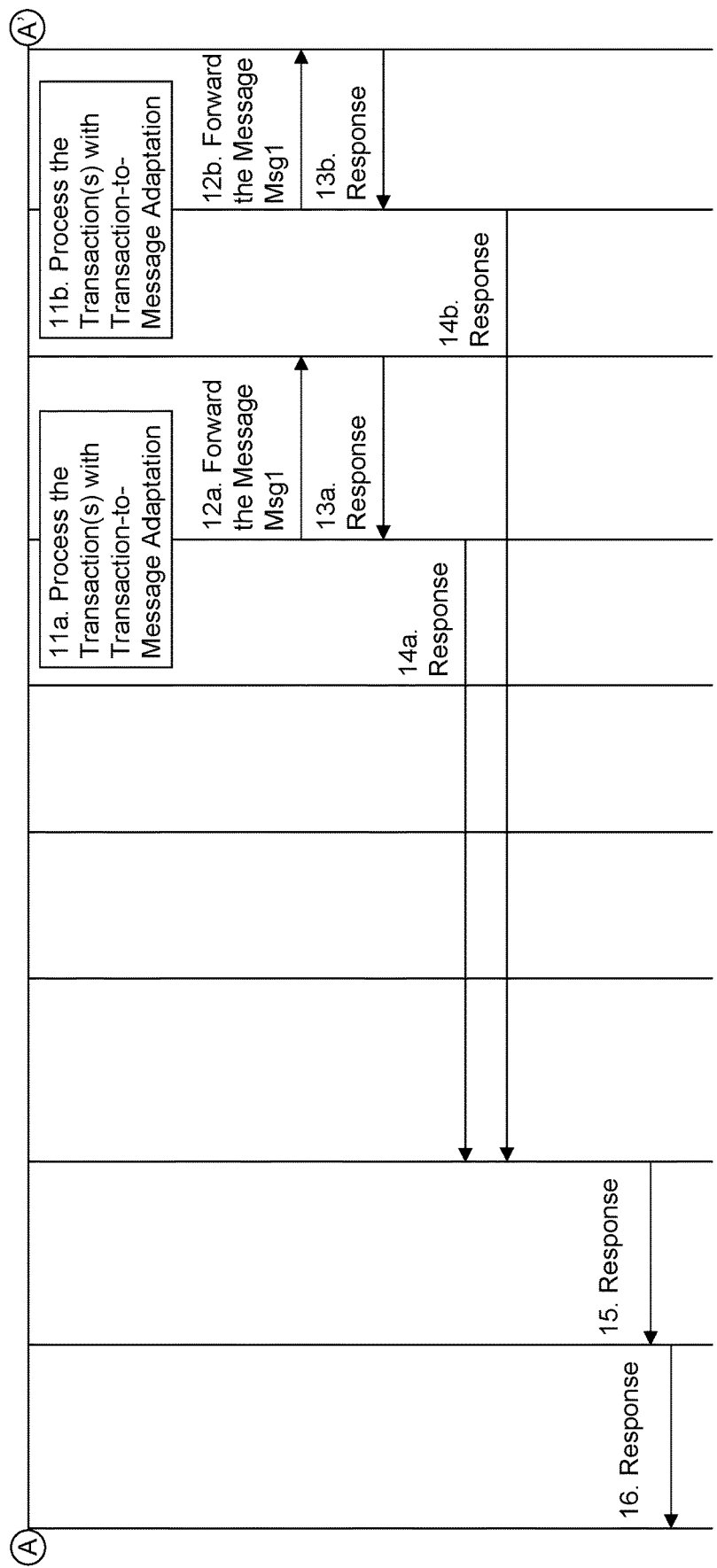

FIG. 22 illustrates the procedure for a sender (e.g., an BCA) to send an original message to a group of receivers (e.g., a BNA-Set1 and a BNA-Set2) via a target blockchain network using an established blockchain session. The BNA-Set1 consists of multiple BNAs that have registered to or associated with a BMS2. The BNA-Set2 also may include multiple BNAs but they have registered to or associated with a different BMS3. The entities involved in this procedure include the BCA, a BMC, a BMS1, the BCN1, the BCN2, the BCN3, the BMS2, a BMS3, and a group of BNAs included in the BNA-Set1 and the BNA-Set2. Note that the sender may be either the BCA or the BNA. Each receiver may be either the BCA/BMC or the BNA. The BMS1 accesses the target blockchain network via the BCN1, the BMS2 accesses the target blockchain network via the BCN2, and the BMS3 accesses the target blockchain network via the BCN3. The BCN2 and the BCN3 may be the same BCN. In addition to the BCN1, the BCN2, and the BCN3, there may be more BCNs in the target blockchain network.

In this procedure, the sender first may send an original message to the BMC, which may forward the original message to the BMS1. The BMS1 takes the original message and may optionally pack it in a new message. Then, the BMS1 identifies the multicast blockchain session to be used for sending the new message. At last, the BMS1 uses the identified multicast blockchain session context information to generate a preliminary transaction including the new message. The BMS1 may send the preliminary transaction to the BCN1. The BCN1 generates a new blockchain transaction including the preliminary transaction and broadcast the new blockchain transaction within the target blockchain network. Eventually, the BCN2 and the BCN3 may receive this blockchain transaction and recover the included preliminary transaction, which may be forwarded to the BMS2 and the BMS3, respectively. The BMS2 and the BMS3 may be able to recover the original message from the received preliminary transaction and send it to the BNAs included in the BNA-Set1 and the BNA-Set2, respectively. As a result of this process, the original message is also stored in the target blockchain.

Pre-Condition: The BCA has registered to or associated with the BMC. The BMC has registered to or associated with the BMS1. The BCN1, the BCN2, and the BCN3 participate in the target blockchain network. The BMS1 knows the BCN1 and can communicate with it, the BMS2 knows the BCN2 and can communicate with it, and the BMS3 knows the BCN3 and can communicate with it. The BNAs included in the BNA-Set1 have registered to or associated with the BMS2, while the BNAs included in the BNA-Set2 have registered to or associated with the BMS3. The BCA has discovered all BNAs and knows their identifiers. The BCA has established one (or multiple) multicast blockchain sessions with all BNAs as the receiver. Alternatively, the BMS1, the BMS2, and the BMS3 have established one (or multiple) multicast blockchain sessions which can be or might have been assigned to the BCA and all BNAs.

Step 1: Similar to Step 1 in FIG. 21. The may differ in that Step 1 in this figure includes a list of identifiers of multiple BNAs as included in the BNA-Set1 and the BNA-Set2.

Step 2: Similar to Step 2 in FIG. 21.

Step 3: Similar to Step 3 in FIG. 21.

Step 4: Similar to Step 4 in FIG. 21

Step 5: Similar to Step 5 in FIG. 21. From the context information of the identified multicast blockchain session, the BMS1 knows there are two other the BMSs (e.g., the BMS2 and the BMS3), which are the last hop to reach all receivers. As a result, the BMS1 expects to receive two responses from the BMS2 and the BMS3, respectively, in Step 14a and Step 14b.

Step 6: Similar to Step 6 in FIG. 21.

Step 7: Similar to Step 7 in FIG. 21.

BMS1 may send the preliminary transaction generated in Step 6 to the BCN1. Note that this preliminary transaction follows the format as shown in FIG. 19. The BCN1 may use TXN-TYPE or BCS-ID included in the preliminary transaction to identify the target blockchain network from the context information of the used multicast blockchain session. Alternatively, the BCN1 may also indicate BNWK-NAME to the BCN1, which may help the BCN1 to identifier the target blockchain network.

Step 8: Similar to Step 8 in FIG. 21.

Step 9a: Similar to Step 9 in FIG. 21. The BCN2 may receive the blockchain transaction from the target blockchain network which was sent by the BCN1 in Step 8.

Step 9b: Similar to Step 9 in FIG. 21. The BCN3 may receive the blockchain transaction from the target blockchain network which was sent by the BCN1 in Step 8. It leverages BCS-ID or TXN-TYPE to search its locally maintained blockchain session context information and identify the relevant multicast blockchain session (e.g., its session identifier is equal to BCS-ID included in this blockchain transaction or its transaction type is equal to TXN-TYPE included in this blockchain transaction), which this blockchain transaction is sent over. As a result, it extracts its BCS-CONTEXT including the identifier of the BMS3.

Step 10a: Similar to Step 10 in FIG. 21. The BCN2 recovers the preliminary transaction generated in Step 6 from the received transaction and may send the recovered preliminary transaction to the BMS2. Step 10b: Similar to Step 10 in FIG. 21. The BCN3 recovers the preliminary transaction generated in Step 6 from the received transaction and may send the recovered preliminary transaction to the BMS3.

If multiple preliminary transactions have been generated in Step 6, Steps 7a-10a and Steps 7b-10b may be repeated multiple times until all these preliminary transactions have been successfully received by the BMS2 and the BMS3.

Step 11 a: Similar to Step 11 in FIG. 21. The BMS2 performs transaction-to-message adaptation to recover the original message(s).

Step 11b: Similar to Step 11 in FIG. 21. The BMS3 performs transaction-to-message adaptation to recover the original message(s).

Step 12a: Similar to Step 12 in FIG. 21. The BMS2 may send the original message(s) to all BNAs in BNA-Set1.

Step 12b: Similar to Step 12 in FIG. 21. The BMS3 may send the original message(s) to all BNAs in a BNA-Set3.

Step 13a: Similar to Step 13 in FIG. 21. Each BNA in the BNA-Set1 may send a response to the BMS2 confirming the receipt of the original message(s).

Step 13b: Similar to Step 13 in FIG. 21. Each BNA in the BNA-Set2 may send a response to the BMS3 confirming the receipt of the original message(s).

Step 14a: Similar to Step 14 in FIG. 21. The BMS2 may send the response to the BMS1 confirming that the original message(s) has been received by all BNAs or some BNAs in the BNA-Set1. The identifiers of BNAs which have received the original message are included in this response.

Step 14b: Similar to Step 14 in FIG. 21. The BMS3 may send the response to the BMS1 confirming that the original message(s) has been received by all BNAs or some BNAs in the BNA-Set2. The identifiers of BNAs which have received the original message are included in this response.

Step 15: The BMS1 may send the response to the BMC confirming that the original message(s) has been received by all or some of BNAs. The identifiers of BNAs which have received the original message are included in this response.

Step 16: The BMC may send the response to the BCA confirming that the original message(s) has been received by all or some of BNAs. The identifiers of BNAs which have received the original message are included in this response.

After the transaction which was sent to the target blockchain network in Step 8 is added into the target blockchain and gets fully confirmed, the BCN1 (or the BCN2 or the BCN3) may send a notification to the BMS1 (or the BMS2 or the BMS3). If the BMS2 or the BMS3 receives such a notification, it may forward the notification to the BMS1. Then, the BMS1 may notify the BCA via the BMC that the original message has also been successfully added into the target blockchain and fully confirmed.

An alternative approach to FIG. 22 for message multicast through a blockchain network is described below:

Step 1: The BMS1 may proactively create one (or multiple) messaging category and each messaging category may correspond to a specific blockchain-based vertical application, as an example. Within the messaging category, multiple topics may be created for finer granularity control and each topic may represent a specific type or purpose of messages to be transmitted among application entities (e.g., BCAs or BNAs) of this blockchain-based vertical application. Each messaging category needs to have a unique identifier/name among the whole system that the BMS1 participates, while the identifier/name of each topic only needs to be unique locally within the messaging category. Each messaging category and all its topics may use and associate with one target blockchain network, or topics of the same messaging category may use and associate with different target blockchain network. The BMS1 also assigns each created messaging category/topics to an existing blockchain session.

Step 2: An application entity BNA (or the BCA) as a receiver may discover messaging categories and their topics, which the BMS1 created in Step 1.

Step 3: The BNA may send a subscription request to the BMS1 to subscribe on a discovered messaging category and one or multiple its topics. Such a subscription informs the BMS1 that the BNA would like to receive any future message, which is sent to the subscribed messaging category and topics. Without waiting the subscription from the BNA, the BMS1 may actively assign one or multiple messaging categories including topics to the BNA.

Step 4: An application entity BCA (or the BNA) as a sender may also discover messaging categories and their topics from the BMS1. Alternatively, the BMS1 may actively assign one or multiple messaging categories including topics to the BCA, which the BMS1 may or may not notify the BCA.

Step 5: When the BCA has a message to send, it may send the message to the messaging category and its topics it has discovered in Step 4. If the BMS1 has assigned a messaging category to the BCA in Step 4, the BCA does not need to explicitly indicate the messaging category when sending a message to the BMS1.

Step 6. The BMS1 may receive the message from the BCA and identifies the corresponding messaging categories and topics, which the message belongs to. Then, it may identify which application entity (e.g., the BNA) has subscribed to or has been assigned to the same messaging category and topics. As result, the identified application entity (e.g., the BNA) should be the receiver of the received message.

Step 7: The BMS1 uses the identified messaging category/topics to determine the associated blockchain session.

Step 8: The BMS1 uses the identified BNA as the receiver to determine other BMSs (e.g., the BMS2 and the BMS3).

Step 9: The BMS1 may send the message to the BMS2 through a target blockchain network using the blockchain session as identified in Step 7. This step is similar to Step 6-Step 16 in FIG. 22.

Representative Blockchain Session Cancellation

Figure 23:
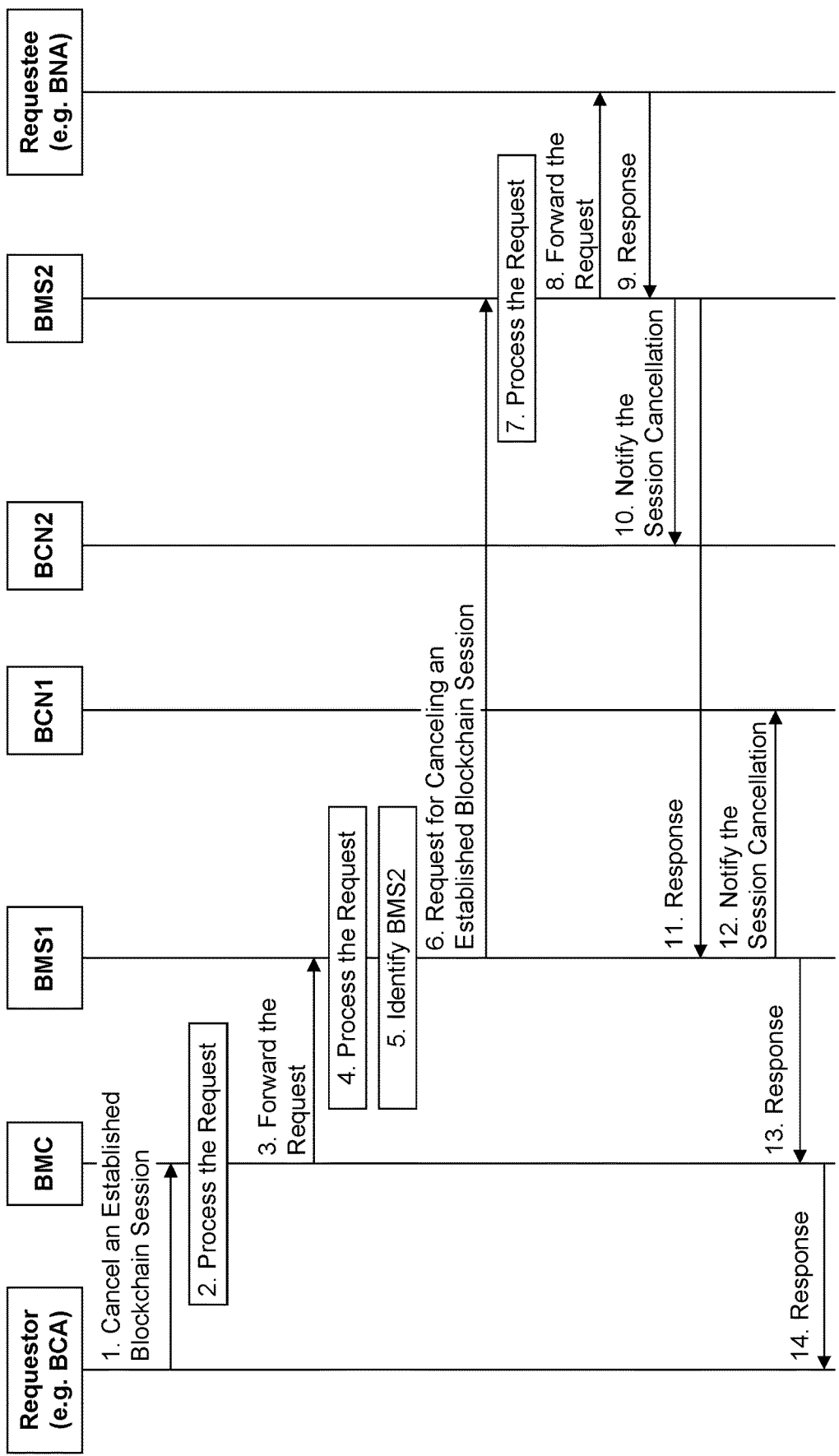
FIG. 23 illustrates an example application-initiated blockchain session cancellation.

FIG. 23 illustrates a procedure for a blockchain application as a requester (either a sender or a receiver) to trigger to cancel an established blockchain session being established with a requestee. The entities involved in this procedure include a BCA, a BMC, a BMS1, a BCN1, a BCN2, a BMS2, and a BNA. Note that the requester may be either the BCA or the BNA. The requestee may also be either the BCA/BMC or the BNA. The BMS1 accesses the target blockchain network via the BCN1, while the BMS2 accesses the target blockchain network via the BCN2.

In this procedure, the requestor first may send a blockchain session cancellation request to the BMC, which may send the request to the BMS1. This request indicates an established blockchain session to be canceled. Then, the BMS1 identifies and contacts another BMS2 in order to cancel the established blockchain session, which they both have previously established for the BCA and the BNA. After receiving the request from the BMS1, the BMS2 decides if such a request can and/or may be approved. It then may send the request to the BNA. In the meantime, the BMS2 may notify the BCN2 of this blockchain session cancellation so that the BCN2 can remove the context information of this blockchain session. Then, the BMS2 may send a response to the BMS1 indicating if the corresponding blockchain session is successfully canceled or not. The BMS1 may notify the BCN1 of this session cancellation as well so that the BCN1 can remove the context information of this blockchain session being canceled. The BMS1 may also send a response to the BCA via the BMC.

Pre-Condition: The BCA has registered to or associated with the BMC. The BMC has registered to or associated with the BMS1. The BCN1 and the BCN2 participate in the target blockchain network. The BMS1 knows the BCN1 and can communicate with it, while the BMS2 knows the BCN2 and can communicate with it. The BNA has registered to or associated with the BMS2. The BCA has discovered or configured with the BNA and knows its identifier. The BCA and the BNA have established one (or multiple) unicast blockchain sessions or the BMS1 and the BMS2 have established one (or multiple) unicast blockchain sessions which have been assigned to the BCA and the BNA.

Step 1: The BCA may send a request to the BMC in order to cancel an established blockchain session between the BCA and the BNA. This request may include the following parameters:

The identifier of the BCA (e.g., a BCA-ID);
The identifier of the BNA (e.g., a BNA-ID);
The identifier of this blockchain session (e.g., BCS-ID);
The type of blockchain transactions (TXN-TYPE) associated with this blockchain session; and
The security credentials which the BMC has assigned to the BCA if any when the BCA registered itself to or associated itself with the BMC.

Step 2: The BMC may process the request received from Step 1. It authorizes if the BCA is allowed to cancel an established blockchain session, for example, based on security credentials if any included in Step 1.

Step 3: The BMC may send the request to the BMS1. The BMC may append its identifier (e.g., a BMC-ID) in the request. Note that Step 1 and Step 2 may be skipped, but the BMC actively may send a session cancellation request to the BMS1 to cancel an established blockchain session between a sender and a receiver. As such, this cancellation request may contain: The identifier of the sender, the identifier of the receiver, the identifier of the blockchain session being canceled, and/or the type of blockchain transactions associated with this blockchain session being canceled.

Step 4: The BMS1 may process the request received from Step 3. It authorizes if the BCA and/or the BMC has the right to cancel the established blockchain session.

Step 5: If BCS-ID (or TXN-TYPE) is included in the request received from Step 3, the BMS1 may use it to easily find the corresponding blockchain session to be canceled. Otherwise, the BMS1 may use the BCA-ID and the BNA-ID (or the identifier of the sender and the identifier of the receiver) to look up the blockchain session to be canceled. After the blockchain session to be canceled is determined, the BMS1 identifies other receiver BMSs (e.g., the BMS2 or more other BMSs) from its context information (e.g., all identifiers included in R-BMS-ID field of this blockchain session's BCS-CONTEXT).

Step 6: The BMS1 may send a request to each receiver BMS (e.g., the BMS2) as identified in Step 5 to cancel the blockchain session determined in Step 5. This request may include the same parameters in the request from Step 3, or may include the identifier of this blockchain session (e.g., BCS-ID) and/or the type of blockchain transactions (TXN-TYPE) associated with this blockchain session.

Step 7: The BMS2 may process the request received from Step 6. The BMS2 first uses the same method as the BMS1 used in Step 5 to determine the blockchain session to be canceled. Then, it authenticates and authorizes if this blockchain session can be canceled. The BMS2 may directly reject the request based on any pre-configured policy rules on behalf of the requestee (e.g., the BNA). If the request is authorized, the BMS2 identifies all receiver BCNs (e.g., included in R-BCN-ID field of this blockchain session's BCS-CONTEXT) and all BNA (e.g., included in R-APP-ID field of this blockchain session's BCS-CONTEXT). Then, BCS-CONTEXT may be removed. If the BMS2 has previously-stored BCS-CONTEXT in a BSCSF, the BMS2 may send a request to the BSCSF to remove BCS-CONTEXT.

Step 8: The BMS2 may send a request to each BNA as identified in Step 7. The request may include the same parameters as included in Step 6. This request is to indicate that the corresponding blockchain session is now canceled and cannot be used in the future.

Step 9: The BNA may send a response to the BMS2.

Step 10: The BMS2 may send a session cancellation notification to each BCN (e.g., the BCN2) as identified in Step 7. This notification may include the identifier of the canceled blockchain session (e.g., BCS-ID) and/or its transaction type (TXN-TYPE), which the BCN2 may use to identify the corresponding blockchain session being canceled and remove its context information BCS-CONTEXT-P1.

Step 11: The BMS2 may send a response to the BMS1 indicating if the requested blockchain session has been successfully canceled or not.

Step 12: Similar to Step 10, the BMS1 may send a session cancellation notification to the BCN1. This notification may include the identifier of the canceled blockchain session (e.g., BCS-ID) and/or its transaction type (TXN-TYPE), which the BCN1 may use to identify the corresponding blockchain session being canceled and remove its context information BCS-CONTEXT-P1. If the BMS1 has previously stored BCS-CONTEXT in a BSCSF, the BMS1 may send a request to the BSCSF to remove BCS-CONTEXT.

Step 13: The BMS1 may send a response to the BMC indicating if the requested blockchain session has been successfully canceled or not.

Step 14: The BMC may send the response to the BCA.

Figure 24:
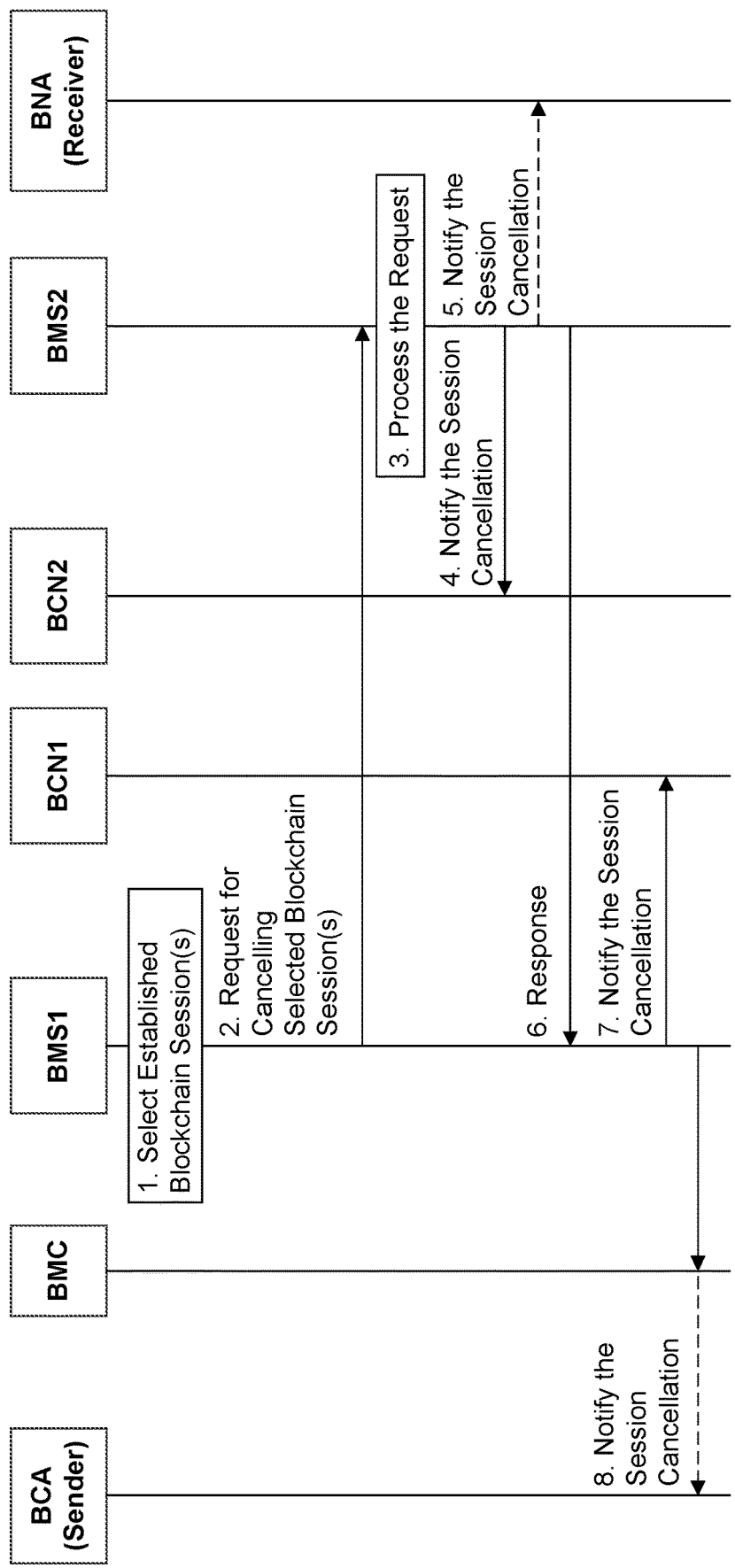
FIG. 24 illustrates an example BMS-initiated blockchain session cancellation.

FIG. 24 illustrates a procedure for a BMS1 to trigger to cancel one or multiple established blockchain sessions with another BMS2 across a target blockchain network. The entities involved in this procedure include a BCA, a BMC, the BMS1, a BCN1, a BCN2, the BMS2, and a BNA as the receiver. Note that the sender may be either the BCA or the BNA. The receiver may also be either the BCA/BMC or the BNA. The BMS1 accesses the target blockchain network via the BCN1, while the BMS2 accesses the target blockchain network via the BCN2. In addition to the BCN1 and the BCN2, there may be more the BCNs in the target blockchain network.

In this procedure, the BMS1 first selects existing blockchain sessions to be canceled. Then, the BMS1 contacts another the BMS2 requesting to cancel these selected blockchain sessions. After receiving the request from the BMS1, the BMS2 decides if such a request can and/or may be approved and satisfied. It the request is approved, the BMS2 may cancel these blockchain sessions. In the meantime, the BMS2 identifies the BCNs and BNAs (or other BCAs) associated with these sessions and may send a session cancellation notification to them.

Then, the BMS2 may send a response to the BMS1 indicating if the corresponding blockchain session is successfully canceled or not. The BMS1 may notify all other sender BCNs (e.g., the BCN1) and sender BCAs (or BNAs) of these canceled sessions to inform them that these sessions have been canceled and cannot be used in the future.

Pre-Condition: The BCA has registered to or associated with the BMC. The BMC has registered to or associated with the BMS1. The BCN1 and the BCN2 participate in the target blockchain network. The BMS1 knows the BCN1 and can communicate with it, while the BMS2 knows the BCN2 and can communicate with it. The BNA has registered to or associated with the BMS2. The BCA has discovered or configured with the BNA and knows its identifier. The BCA and the BNA have established one (or multiple) unicast blockchain sessions, or the BMS1 and the BMS2 have established one (or multiple) unicast blockchain sessions which have been assigned to the BCA and the BNA.

Step 1: The BMS1 selects existing blockchain sessions to be canceled based on certain local policies. For example, if an established blockchain session has not been used for a period of time, the BMS1 may decide to cancel it. In another example, if the BMS1 is establishing many new blockchain sessions and cannot hold too old blockchain sessions and their context information, the BMS1 may decide to cancel these old blockchain sessions. Also, if the sender BCN (e.g., S-BCN-ID in BCS-CONTEXT) of an existing blockchain session becomes unavailable anymore, the BMS1 may decide to cancel this blockchain session. For each selected session, the BMS1 may easily identify corresponding receiver the BMSs (e.g., R-BMS-ID in BCS-CONTEXT) and the sender BCN (e.g., S-BCN-ID in BCS-CONTEXT).

Step 2: The BMS1 may send a request to each receiver BMS (e.g., the BMS2) as identified in Step 1 to cancel the blockchain session determined in Step 1. This request may include the following parameters as included in BCS-CONTEXT of this blockchain session being canceled:

The identifier of this blockchain session (e.g., BCS-ID); and/or

The type of blockchain transactions (TXN-TYPE).

Step 3: The BMS2 may process the request received from Step 2. The BMS2 first uses BCS-ID and/or TXN-TYPE from Step 2 to determine the blockchain session to be canceled. Then, it authenticates and authorizes if this blockchain session can be canceled by the BMS1. The BMS2 may directly reject the request based on any pre-configured policy rules. If the request is authorized, the BMS2 identifies all receiver BCNs (e.g., included in R-BCN-ID in BCS-CONTEXT) and all BNA (e.g., included in R-APP-ID in BCS-CONTEXT) from the context information of this blockchain session. Then, BCS-CONTEXT may be removed. If the BMS2 has previously-stored BCS-CONTEXT in a BSCSF, the BMS2 may send a request to the BSCSF to remove BCS-CONTEXT.

Step 4: The BMS2 may send a session cancellation notification to each BCN (e.g., the BCN2) as identified in Step 3. This notification may include the identifier of the canceled blockchain session (e.g., BCS-ID) and/or its transaction type (TXN-TYPE), which the BCN2 may use to identify the corresponding blockchain session being canceled and remove its context information BCS-CONTEXT-P1.

Step 5: The BMS2 may send a session cancellation notification to each BNA if there is any as identified in Step 3. The notification may include the same parameters as included in Step 4. This notification is to indicate that the corresponding blockchain session is now canceled and cannot be used in the future.

Step 6: The BMS2 may send a response to the BMS1 indicating if the requested blockchain session has been successfully canceled or not.

Step 7: Similar to Step 4, the BMS1 may send a session cancellation notification to each BCN (e.g., the BCN1) as identified in Step 1 for the blockchain session being canceled. This notification may include the identifier of the canceled blockchain session (e.g., BCS-ID) and/or its transaction type (TXN-TYPE), which the BCN1 may use to identify the corresponding blockchain session being canceled and remove its context information BCS-CONTEXT-P1.

Step 8: The BMS1 may send a session cancellation notification to each BCA (or BCA) as identified in Step 1 for the blockchain session being canceled, via the corresponding BMC. This notification may include the identifier of the canceled blockchain session (e.g., BCS-ID) and/or its transaction type (TXN-TYPE). This notification is to indicate that the corresponding blockchain session is now canceled and cannot be used in the future. Then, the BMS1 may remove BCS-CONTEXT of the canceled blockchain session; If the BMS1 has previously stored BCS-CONTEXT in a BSCSF, the BMS1 may send a request to the BSCSF to remove BCS-CONTEXT.

Representative Architectural Embodiment for 5GS

Figure 25:
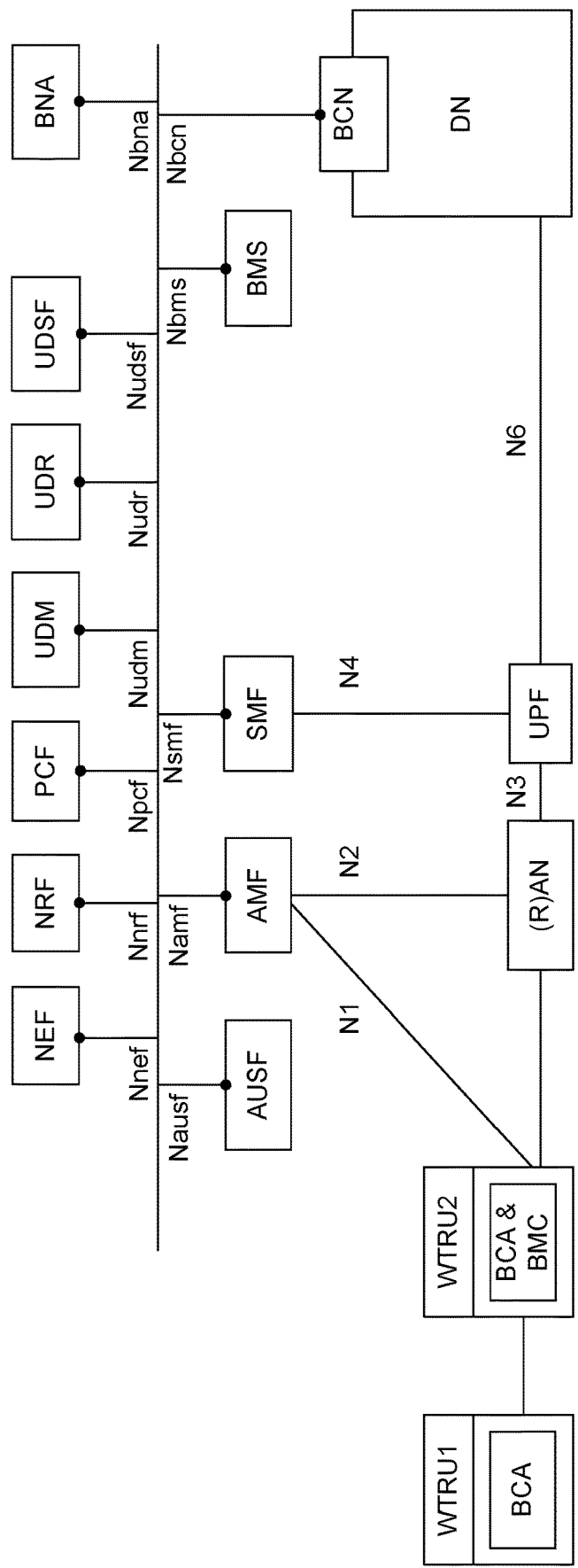
FIG. 25 illustrates an example 5G system architecture extension A with blockchain messaging enablement.

FIG. 25 shows the embodiment of implementing the proposed blockchain messaging-related logical entities in FIG. 12 in the context of 5G and beyond system architecture. The core network refers to either a 5G core network or future wireless core network.

- A BMS may be implemented as a new control plane Network Function (NF) or even an Application Function (AF). The BMS may reside in a core network or in an edge network. The BMS needs to interact with existing core network functions. For example, the BMS registers itself to NRF so that it may discover or be discovered by other NFs including other BMSs. The BMS leverages AUSF to authenticate any received blockchain messaging-related request or message from WTRUs. The BMS may also check with PCF for any blockchain messaging-related policies. The BMS may leverage UDSF to store blockchain session context information. The BMS may be exposed to and accessed by third-parties as facilitated by NEF. The BMS may also be implemented as a part of an existing network function such as AUSF or NEF.
- A BCN may be a new NF within the core network or outside of the core network as provided by a third-party. If a BCN is provided by a third-party, the BMS may access it via NEF.
- A BNA may be implemented as an AF. If the BNA is provided by a third-party, it cannot interact with the BMS directly, but via NEF.
- A BCA and a BMC may be mostly implemented within a WTRU (e.g., WTRU2). Alternatively, a constrained WTRU such as a narrow-band IoT device may host the BCA only (e.g., WTRU1), and the BMC may be hosted by other power WTRUs (e.g., WTRU2) such as a vehicle, a gateway, an edge server, etc. The BMC in a WTRU may be leveraged by BCAs within the same WTRU or BCAs hosted in other WTRUs.
- BSCSF may be implemented as a new NF or as a part of UDSF.

Figure 26:
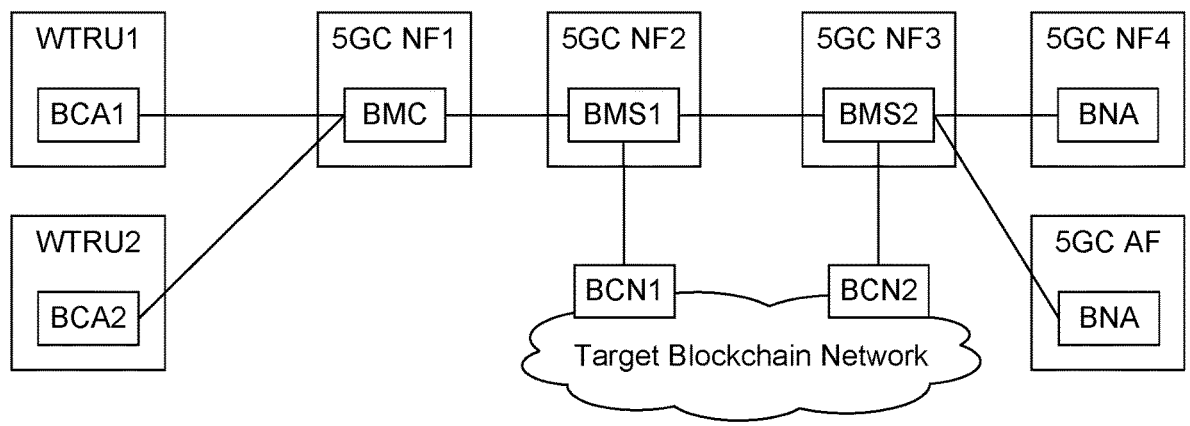
FIG. 26 illustrates an example 5G system architecture extension B with blockchain messaging enablement.

- As shown in FIG. 26, a BNA may be implemented as new functionality of any current 5GC network function such as NF4 (e.g., an AMF), so that this NF4 may interact with the BMS and send messages through blockchain networks to another NF/AF/UE. For example, an AMF when it detects a new WTRU, it may send this event in a notification through a target blockchain network via a the BMS to an AUSF for authorizing the WTRU. As a result, this notification and the included event may also be stored in the target blockchain network.
- As shown in FIG. 26, a BMC may be implemented as a part of any current 5GC network function such as NF1, which may be a serving AMF. As such, a WTRU1 (or WTRU2) may only host a BCA1 (or a BCA2). Then the BCA1 (or the BCA2) hosted by the WTRU1 (or WTRU2) talks to the BMC hosted by the serving AMF. As such, the BMC in the serving AMF may serve multiple BCAs hosted by multiple WTRUs. The proposed interactions between the BCA and BMC may be implemented as new procedures between the WTRU and its serving AMF over 5GS N1 interface.
- As shown in FIG. 26, the BMS may even be implemented as a new functionality of any current 5GC network function such as NF2 and NF3 (e.g., an AMF, an SMF). For example, an AMF may have an embedded the BMS and an SMF may have another embedded the BMS. As such, the AMF and the SMF may send messages to each other through a target blockchain network via their embedded BMS. The proposed interaction between two BMSs may be implemented as new procedures between NF2 and NF3. Also, the proposed interaction between the BMS and the BCN may be implemented as new procedures between NF2 and the BCN1 and between NF3 and the BCN2.

Representative Blockchain Session Establishment in 5GS

Figure 27:
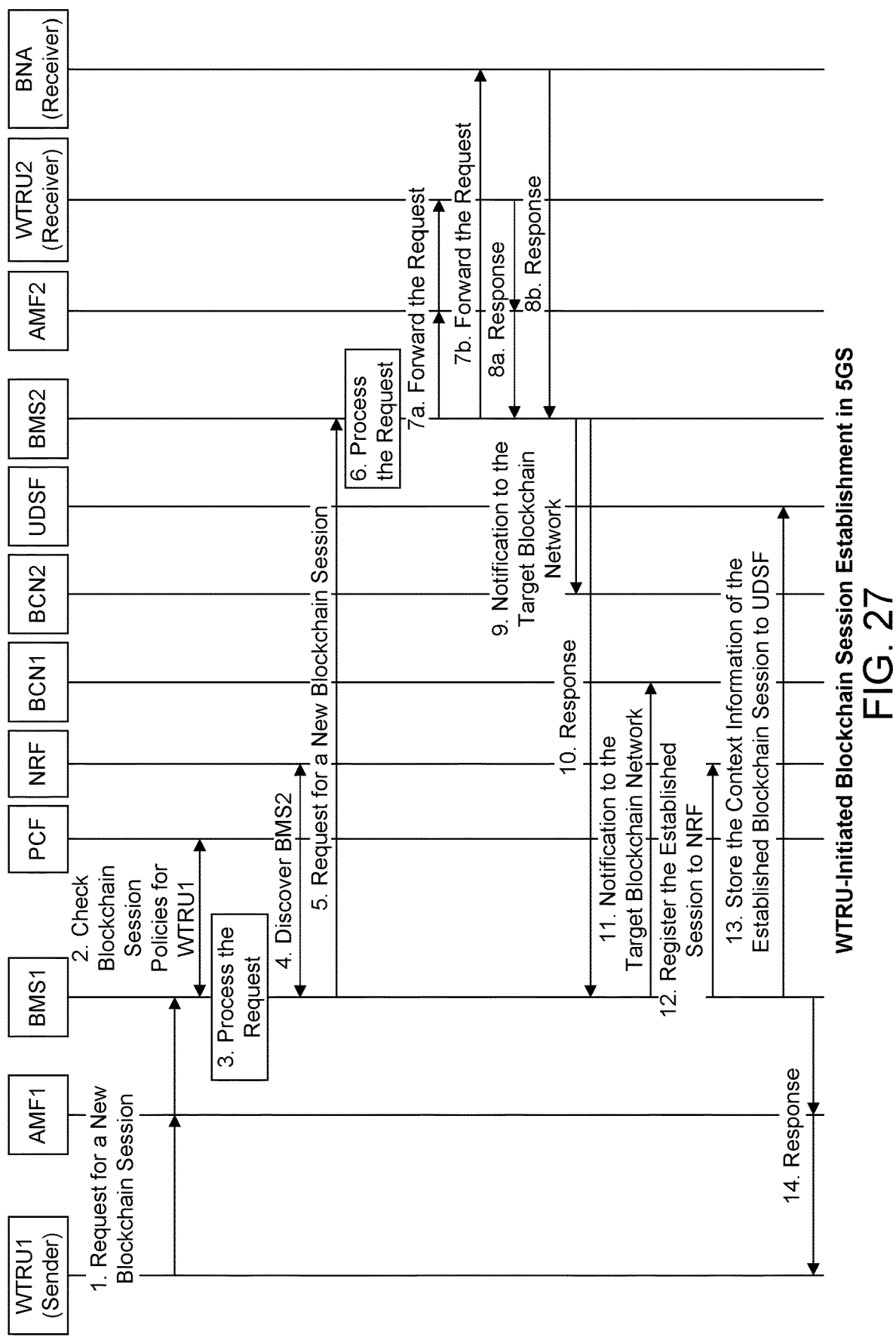
FIG. 27 illustrates an example WTRU-initiated blockchain session establishment in 5GS.

FIG. 27 illustrates a procedure for WTRU1 to initiate to establish a blockchain session with another WTRU2 and/or another BNA in 5GS. The BNA may be implemented as an AF in 5GS. A BMS1 and the BMS2 are implemented as control plane functions (or AFs) in 5GS, while a BCN1 and a BCN2 may be implemented as AFs in 5GS or third-party functions. WTRU1 or WTRU2 may host a BCA/BMC or a BNA. FIG. 27 is an extension of FIGS. 13 to 5GS.

Pre-Condition: WTRU1 and WTRU2 have been registered to their serving AMF. WTRU1 and WTRU2 have also registered to the BMS1 and the BMS2, respectively. The BNA has registered to the BMS2. The BMS1 knows the BCN1 and the BMS2 knows the BCN2. Both the BMS1 and the BMS2 are configured with an NRF and have registered to the NRF. The BMS1 and the BMS2 are also configured with a PCF and a UDSF. Alternatively, they may discover a PCF and a UDSF from the NRF.

Step 1: Similar to Step 1 in FIG. 13. WTRU1 may send this request to WTRU1's serving AMF (e.g., AMF1), which may forward the request to the BMS1. In addition to the parameter included in Step 1 of FIG. 13, this request may include the following parameters:

The identifier of WTRU1 (e.g., WTRU1-ID);
The identifier of the BMS1 (e.g., a BMS1-ID);
The identifier of WTRU2 (e.g., WTRU2-ID); and
The identifier of the BNA (e.g., a BNA-ID).

Step 2: The BMS1 may send a request to the PCF to check if there is any blockchain session policy, which can and/or may be applied to the request as received in Step 1. Note that the BMS1 may discover the PCF from the NRF if it has not been configured with a PCF yet. The BMS1 may pass WTRU1-ID, WTRU2-ID, the BMS1-ID, and the BNA-ID to the PCF, which takes these parameters and/or other parameters in Step 1 to generate new blockchain session policy rules (or retrieve existing rules from a UDR). For example, the PCF may use WTRU1-ID and WTRU2-ID to retrieve their subscription data from a UDM and check if there is any blockchain-related restrictions and rules as included in their subscription data. These blockchain-related restrictions may be used to generate new blockchain session policy rules. Then, the PCF passes these blockchain session policy rules (either new ones or the existing ones as retrieved from the UDSF) to the BMS1.

Step 3: Similar to Step 4 in FIG. 13. They may differ in that the BMS1 may now consider the blockchain session policy rules when processing the request as received in Step 1. Note that these blockchain session policy rules have been received from the PCF as a result of Step 2 and/or have been previously stored locally at the BMS1.

Step 4: The BMS1 may send a request including WTRU2-ID and the BNA-ID to the NRF to discover another BMS (e.g., the BMS2) which WTRU2 and the BNA have registered to. As a result, the NRF may send a response including the identifier of the BMS2 (e.g., a BMS2-ID) to the BMS1.

Step 5: Similar to Step 6 in FIG. 13. In addition to the parameter included in Step 6 of FIG. 13, this request may include the following parameters:
The identifier of WTRU1 (e.g., WTRU1-ID); and
The identifier of WTRU2 (e.g., WTRU2-ID).

Step 6: Similar to Step 7 in FIG. 13. WTRU1-ID and WTRU2-ID may be leveraged by the BMS2 to generate the unique identifier of the blockchain session being established. In addition, the context information of the established blockchain session may also include WTRU1-ID and WTRU2-ID, in addition to including the identifiers of the BCA/BMC or the BNA which WTRU1 and WTRU2 host. But both WTRU1-ID and WTRU2-ID may be included in the Privacy-Protected part (e.g., BCS-CONTEXT-P2). In other words:
Set S-DEVICE-ID=WTRU1-ID; and
Set R-DEVICE-ID=WTRU2-ID.

Step 7a: Similar to Step 8 in FIG. 13. If WTRU2 is a receiver, the BMS2 may send the request towards WTRU2 via its serving AMF (e.g., AMF2). To this end, the BMS2 may include WTRU2-ID in this request. Note that the BMS2 may find WTRU2's serving AMF from a UDM by giving WTRU2-ID. This request may also include WTRU1-ID.

Step 7b: Similar to Step 8 in FIG. 13. If the BNA is a receiver, the BMS2 may send the request to the BNA directly. This request may be relayed by an NEF if the BNA is outside of 5GS. This request may also include WTRU1-ID.

Step 8a: Similar to Step 9 in FIG. 13. If WTRU2 is a receiver, WTRU2 may send a response to the BMS2 via its serving AMF (e.g., AMF2). For this purpose, WTRU2 may include the BMS2-ID in this response. Step 8b: Similar to Step 9 in FIG. 13. If the BNA is a receiver, the BNA may send a response to the BMS2 directly. This response may be relayed by an NEF if the BNA is outside of 5GS.

Step 9: Similar to Step 10 in FIG. 13.
Step 10: Similar to Step 11 in FIG. 13.
Step 11: Similar to Step 12 in FIG. 13.

Step 12: The BMS1 may send a request to the NRF to register the established blockchain session. The BMS1 may pass the whole context information of the established blockchain session to the NRF or just the following two parameters which may uniquely identifier the established blockchain session.

The identifier of the established blockchain session (BCS-ID); and/or
The type of transactions for the established blockchain session (TXN-TYPE).

Step 13: The BMS1 may store the context information of the established blockchain session to the UDSF. The BMS1 may be requested to perform this step by the BMS2 in Step 10. Alternatively, the BMS2 may store the context information of the established blockchain session to the UDSF immediately after Step 9. Then, in Step 10, the BMS2 may inform the BMS1 that the context information of the established blockchain session has been stored to the UDSF. As a result, the BMS1 may skip Step 13. Note that both the BMS1 and the BMS2 may discover the UDSF from the NRF. Also, the UDSF may be implemented as a part of the BMS1 and the BMS2. Any UDSF which has no restriction and is open to store blockchain session context information may be discovered by the BMS1 and the BMS2.

Step 14: Similar to Step 13 in FIG. 13. The BMS1 may send a response to WTRU1 via its serving AMF (e.g., AMF1). In addition to the parameter included in Step 13 of FIG. 13, this response may also include WTRU1-ID.

Figure 28:
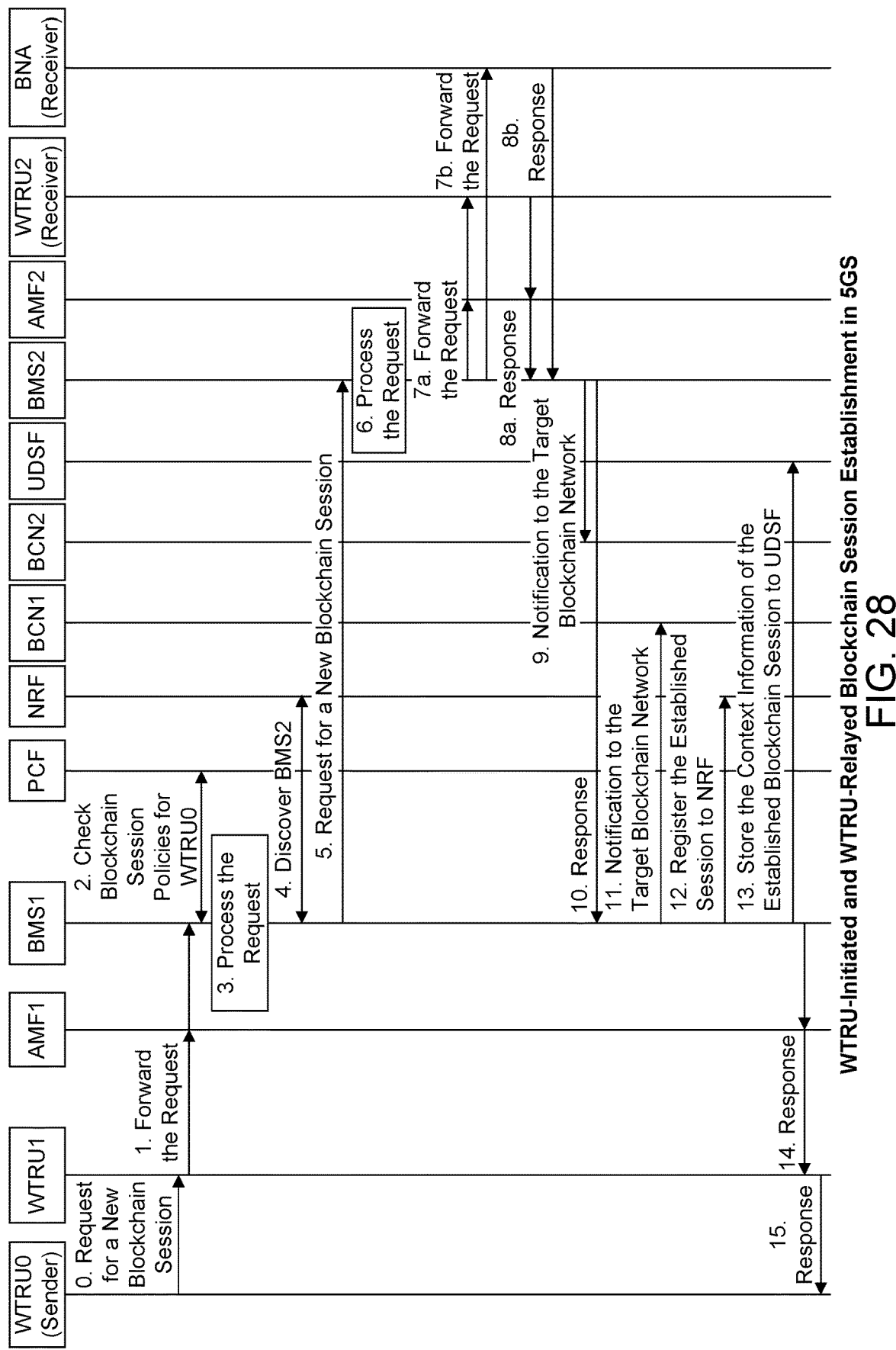
FIG. 28 illustrates an example WTRU-initiated and WTRU-relayed blockchain session establishment in 5GS

Based on FIG. 27, FIG. 28 illustrates a WTRU-relayed blockchain session establishment procedure for 5GS. Compared to FIG. 27, FIG. 28 introduces the following differences.

The sender is changed from WTRU1 to WTRU0. WTRU0-ID is the identifier of WTRU0. WTRU0 may host a BCA, while WTRU1 may host a BMC. Alternatively, WTRU0 may host a BNA while WTRU1 may host a BMS.

UE0 may send a request to WTRU1 in Step 0. This request is similar to Step 1 in FIG. 27, but needs to include WTRU0-ID. WTRU0 and WTRU1 may communicate with each other directly via 3GPP PC5 or non-3GPP connectivity (e.g., WiFi, Bluetooth, etc.).

In Step 1, WTRU1 may send the request as received in Step 0 to the BMS1 via WTRU1's serving AMF (e.g., AMF). This step is similar to Step 1 in FIG. 27, but may include both WTRU1-ID and WTRU0-ID.

Steps 2-13 are the same in both FIG. 27 and FIG. 28. They may differ in that WTRU0-ID may be used and leveraged instead of WTRU1-ID in these steps.

In Step 14, the BMS1 may send a response to WTRU1 and WTRU1's serving AMF. This response is similar to the one in Step 14 in FIG. 27, but may include both WTRU1-ID and WTRU0-ID.

In Step 15, WTRU1 knows WTRU0-ID from Step 14 and may send the response to WTRU0.

Figure 29:
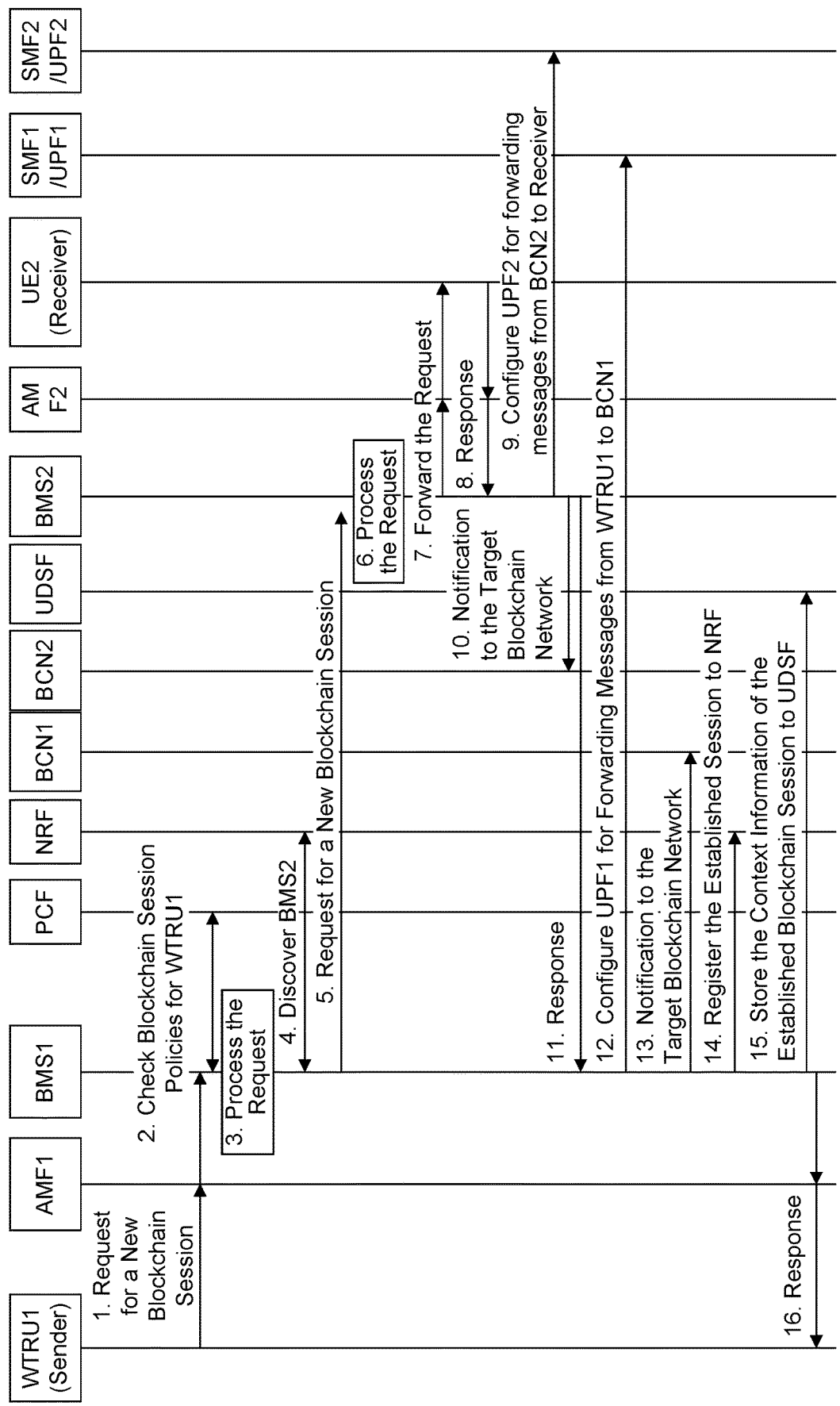
FIG. 29 illustrates an example WTRU-initiated blockchain session establishment in 5GS with data path configuration.

FIG. 29 illustrates another WTRU-initiated blockchain session management procedure, which also provides data path configuration functionality. FIG. 29 is extended from FIG. 27, but FIG. 29 assumes that WTRU1 as the sender, after the blockchain session is established, may use the 5GS data plane to send messages through the target blockchain network to receivers. To this end, the data path WTRU1 may use for transmitting messages needs to be configured and set up during the blockchain session establishment.

Pre-Condition: WTRU1 and WTRU2 have been registered to their serving AMF. WTRU1 and WTRU2 have also registered to the BMS1 and a BMS2, respectively. The BNA has registered to or associated with the BMS2. The BMS1 knows a BCN1 and the BMS2 knows a BCN2. Both the BMS1 and the BMS2 are configured with an NRF and have registered to the NRF. The BMS1 and the BMS2 are also configured with a PCF and a UDSF. Alternatively, they may discover a PCF and a UDSF from the NRF.

Step 1: Similar to Step 1 in FIG. 27.

Step 2: Similar to Step 2 in FIG. 27. The new blockchain session policy rules which the BMS1 may receive from the PCF may specify that WTRU1 should use 5GS data path for blockchain messaging after the blockchain session is established. These blockchain session policy rules may also specify the UPFs (e.g., UPF1 and UPF2) on the data path from WTRU1 to the receiver (e.g., WTRU2).

Step 3: Similar to Step 3 in FIG. 27.

Step 4: Similar to Step 4 in FIG. 27.

Step 5: Similar to Step 5 in FIG. 27.

Step 6: Similar to Step 6 in FIG. 27.

Step 7: Similar to Step 7a in FIG. 27. The BMS2 may include a BCN2-ID in this step and request WTRU2 to establish a data path between WTRU2 and a BCN2, so that the BCN2 is able to forward any message with WTRU2 as the destination to WTRU2 via the data path to be established. To this end, WTRU2 triggers 5G PDU Session Establishment with its serving SMF (e.g., SMF2) by giving the BCN2-ID as the Data Network Name. As a result, WTRU2 may know the address of UPF2 (e.g., UPF2-ID).

Step 8: Similar to Step 8a in FIG. 27. If WTRU2 has triggered and established a 5G PDU session towards the BCN2-ID, WTRU2 may include UPF2-ID and other information about this 5G PDU session in this response to the BMS2.

Step 9: Assume SMF2 be selected as the serving SMF for WTRU2. The BMS2 may send a request to SMF2 to establish a data path between the BCN2 and WTRU2. This request may include a BMS2-ID and WTRU2-ID. After receiving this request, SMF2 determines and selects UPF2. Then SMF2 configures UPF2 with the BCN2-ID (e.g., its IP address) and WTRU2-ID (e.g., its IP address). With this configuration on UPF2, when UPF2 receives a message from the BCN2 with WTRU2-ID as the destination address, UPF2 may forward the message to WTRU2. The BMS2 may include UPF2-ID in the context information of established blockchain session.

Alternatively, the BMS2 itself may not configure the data path between the BCN2 and WTRU2 in Step 9. Instead, it may instruct the BCN2 (via Step 10) to establish a data path with WTRU2, or may instruct WTRU2 (via Step 7) to establish a data path with the BCN2.

Step 10: Similar to Step 9 in FIG. 27. Additionally, the BMS2 may also inform the BCN2 of the address of UPF2 (e.g., UPF2-ID), which the BMS2 determines in Step 9 or receive from Step 8. The BMS2 may also indicate that the BCN2 needs to establish a 5G PDU session towards WTRU2 and include the address of SMF2 (e.g., SMF2-ID). In this case, the BCN2 needs to contact SMF2 for requesting a 5G PDU session with WTRU2. After the BCN2 establishes such a 5G PDU session with WTRU2, it may send a notification to the BMS2 including the information about this 5G PDU session such as UPF2-ID, which the BMS2 may include in the context information of the established blockchain session.

Step 11: Similar to Step 10 in FIG. 27. Additionally, the BMS2 may also inform the BMS1 of the address of UPF2 (e.g., UPF2-ID).

Step 12: Similar to Step 9. Assume SMF1 be selected as the serving SMF for WTRU1. The BMS1 may send a request to SMF1 to establish a data path between WTRU1 and the BCN1. This request may include WTRU1-ID and a BCN1-ID. After receiving this request, SMF1 determines and selects UPF1. Then SMF1 configures UPF1 with WTRU1-ID (e.g., its IP address) and the BCN1-ID (e.g., its IP address). With this configuration on UPF1, when UPF1 receives a message from WTRU1 with the BCN1-ID as the destination address, UPF1 may forward the message to the BCN1. The BMS1 may also include UPF1-ID in the context information of established blockchain session.

Alternatively, the BMS1 itself may not configure data path between WTRU1 and the BCN1 in Step 12. Instead, it may instruct the BCN1 (via Step 13) to establish a data path with WTRU1, or may instruct WTRU1 (via Step 16) to establish a data path with the BCN1.

Step 13: Similar to Step 11 in FIG. 27. Additionally, the BMS1 may also inform the BCN1 of the address of UPF1 (e.g., UPF1-ID). The BMS1 may also indicate that the BCN1 needs to establish a 5G PDU session with WTRU1 and include the address of SMF2 (e.g., SMF2-ID). In this case, the BCN1 needs to contact SMF1 for requesting a 5G PDU session with WTRU1 by giving WTRU1-ID. After the BCN1 establishes such a 5G PDU session, it may send a notification to the BMS1 including the information about this 5G PDU session such as UPF1-ID, which the BMS1 may include in the context information of the established blockchain session.

Step 14: Similar to Step 12 in FIG. 27. Additionally, the BMS1 may also inform the NRF of the address of UPF1 (e.g., UPF1-ID) and UPF2 (e.g., UPF2-ID).

Step 15: Similar to Step 13 in FIG. 27. Additionally, the BMS1 may also inform the UDSF of the address of UPF1 (e.g., UPF1-ID) and UPF2 (e.g., UPF2-ID) as a part of the context information of the established blockchain session.

Step 16: Similar to Step 14 in FIG. 27. Additionally, the BMS1 may also inform WTRU1 of the address of UPF1 (e.g., UPF1-ID). The BMS1 may include the BCN1-ID in this step and ask WTRU1 to establish a data path between WTRU1 and the BCN1, so that WTRU1 is able to send messages to the BCN1 over this data path. To this end, WTRU1 triggers 5G PDU Session Establishment with its serving SMF (e.g., SMF1) by giving the BCN1-ID as the Data Network Name. As a result, WTRU1 may know the address of UPF1 (e.g., UPF1-ID). After WTRU1 establishes such a 5G PDU session, it may send a notification to the BMS1 including the information about this 5G PDU session such as UPF1-ID, which the BMS1 may include in the context information of the established blockchain session.

Representative Messaging Through a Blockchain Network in 5GS

Figure 30:
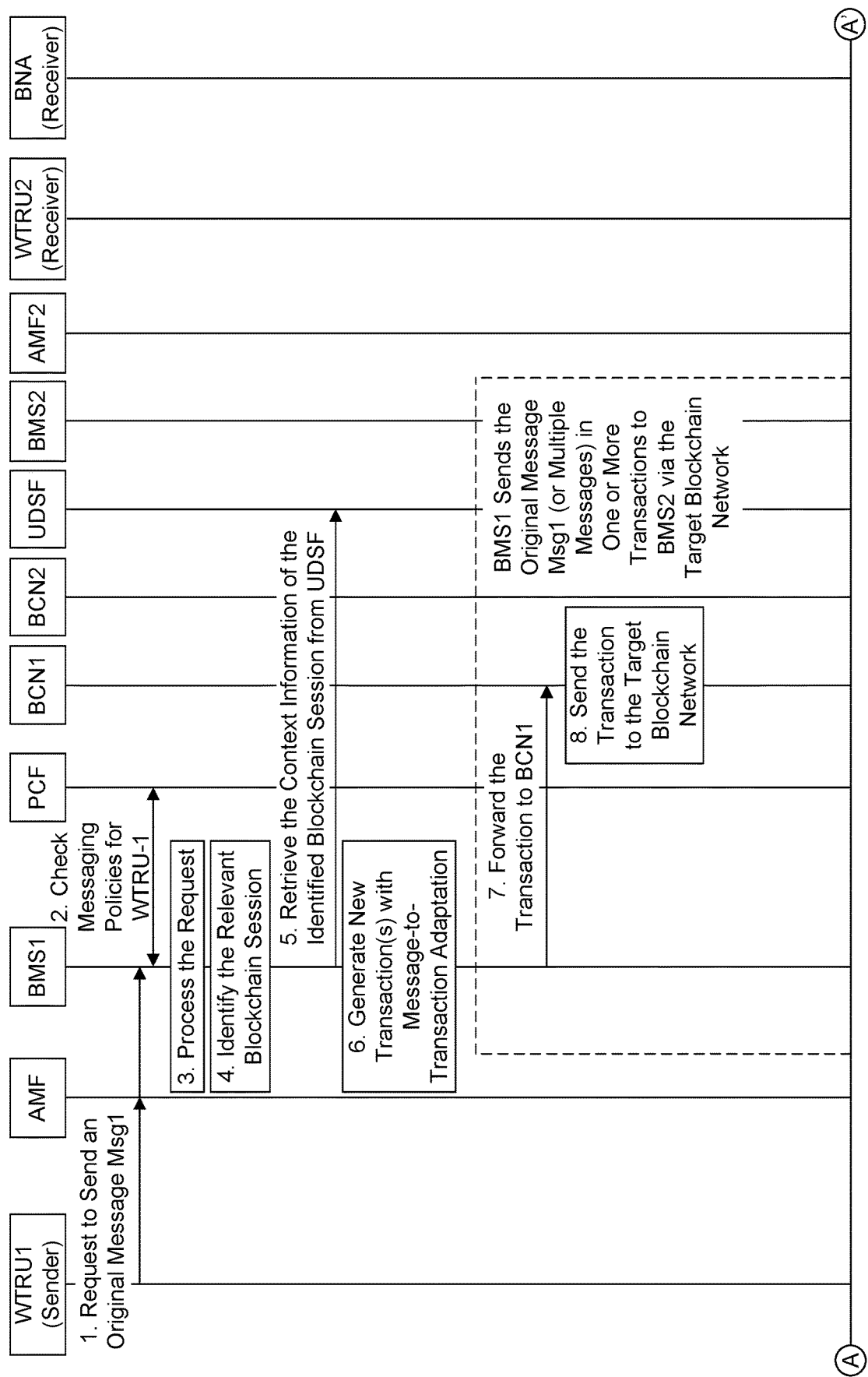
FIG. 30 illustrates example session-based messaging over a blockchain network through 5GS control plane.
Figure 30:
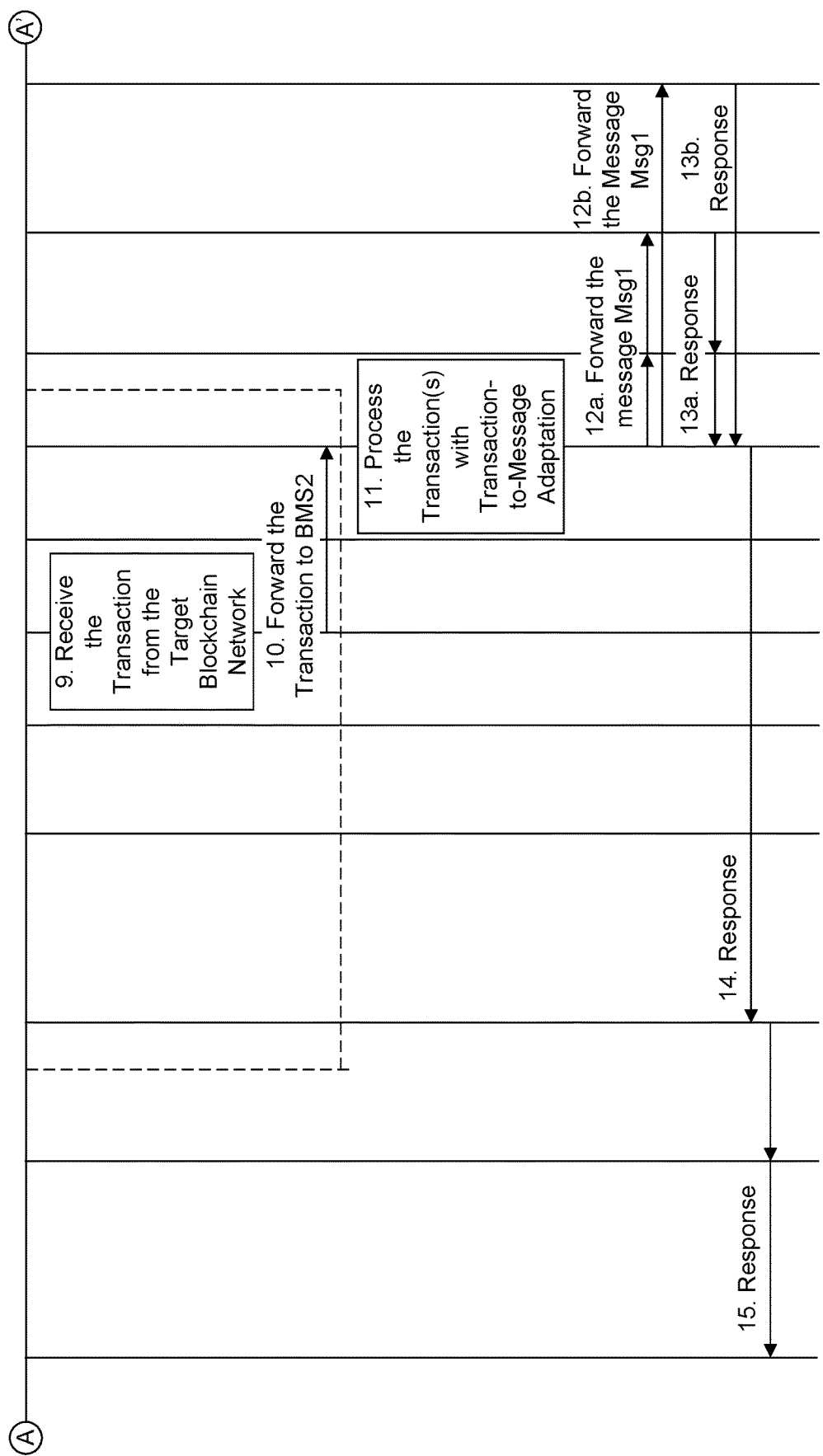

FIG. 30 illustrates a procedure for WTRU1 as a sender to send messages to receivers (WTRU2 and/or a BNA) using an established blockchain session over the target blockchain network through 5G control plane. The BNA may be implemented as an AF in 5GS. A BMS1 and a BMS2 are implemented as control plane NFs (or AFs) in 5GS, while the BCN1 and the BCN2 may be implemented as AFs in 5GS or third-party functions. WTRU1 or WTRU2 may host a BCA/BMC or the BNA. FIG. 30 is an extension of FIG. 21.

Pre-Condition: WTRU1 and WTRU2 have been registered to their serving AMF. WTRU1 and WTRU2 have also registered to the BMS1 and the BMS2, respectively. The BNA has registered to or associated with the BMS2. The BMS1 knows the BCN1 and the BMS2 knows the BCN2. Both the BMS1 and the BMS2 are configured with an NRF and have registered to the NRF. The BMS1 and the BMS2 are also configured with a PCF and a UDSF. Alternatively, they may discover a PCF and a UDSF from the NRF. WTRU1 and WTRU2 (or the BNA) have established one (or multiple) blockchain sessions, or the BMS1 and the BMS2 have established one (or multiple) blockchain sessions that may be or might have been assigned to WTRU1 and WTRU2 (or the BNA).

Step 1: Similar to Step 1 in FIG. 21. WTRU1 may send this request to WTRU1's serving AMF (e.g., AMF1), which may forward the request to the BMS1. In addition to the parameter included in Step 1 of FIG. 21, this request may include the following parameters:
  The identifier of WTRU1 (e.g., WTRU1-ID);
  an identifier of the BMS1 (BMS1-ID);
  The identifier of WTRU2 (e.g., WTRU2-ID); and
  The identifier of the BNA (e.g., a BNA-ID).

Step 2: The BMS1 may send a request to the PCF to check if there is any blockchain messaging policies, which may be applied to the request as received in Step 1. Note that the BMS1 may discover the PCF from the NRF if it has not been configured with a PCF yet. The BMS1 may pass WTRU1-ID, WTRU2-ID, the BMS1-ID, and the BNA-ID to the PCF, which takes these parameters and/or other parameters in Step 1 to generate a new blockchain messaging policy rules (or retrieve existing rules from a UDR). For example, the PCF may use WTRU1-ID and WTRU2-ID to retrieve their subscription data from a UDM and check if there is any blockchain-related restrictions and rules as included in their subscription data. These blockchain-related restrictions may be used to generate new blockchain messaging policy rules. Then, the PCF passes these blockchain messaging policy rules (either new ones or the existing ones as retrieved from the UDSF) to the BMS1.

Step 3: Similar to Step 4 in FIG. 21. They may differ in that the BMS1 may now consider the blockchain messaging policy rules when processing the request as received in Step 1. Note that these blockchain messaging policy rules have been received from the PCF as a result of Step 2 to have previously stored locally at the BMS1.

Step 4: Similar to Step 5 in FIG. 21. Additionally, the BMS1 may also use WTRU1-ID and/or WTRU2-ID to identify the established blockchain session between the sender and the receiver. As a result of this step, the BMS1 knows the identifier of this blockchain session (e.g., BCS-ID) and/or its transaction type (e.g., TXN-TYPE).

Step 5: The BMS1 may retrieve the context information of the identified blockchain session in Step 4 from the UDSF. The BMS1 may send BCS-ID, TXN-TYPE, WTRU1-ID, and/or WTRU2-ID to the UDSF. Then, the UDSF may send the whole context information BCS-CONTEXT to the BMS1.

Step 6: Similar to Step 6 in FIG. 21.
Step 7: Similar to Step 7 in FIG. 21.
Step 8: Similar to Step 8 in FIG. 21.
Step 9: Similar to Step 9 in FIG. 21.
Step 10: Similar to Step 10 in FIG. 21.
Step 11: Similar to Step 11 in FIG. 21.

Step 12a: Similar to Step 12 in FIG. 21. If WTRU2 is a receiver, the BMS2 may send the message as recovered in Step 11 to WTRU2 via its serving AMF (e.g., AMF2). To this end, the BMS2 may include WTRU2-ID in this request. Note that the BMS2 may find WTRU2's serving AMF from a UDM by giving WTRU2-ID. WTRU1-ID may be also included in Step 12a.

Step 12b: Similar to Step 12 in FIG. 21. If the BNA is a receiver, the BMS2 may send the message as recovered in Step 11 to the BNA directly. This request may be relayed by an NEF if the BNA is outside of 5GS.

Step 13a: Similar to Step 13 in FIG. 21. If WTRU2 is a receiver, WTRU2 may send a response to the BMS2 via its serving AMF (e.g., AMF2). For this purpose, WTRU2 may include the BMS2-ID in this response.

Step 13b: Similar to Step 13 in FIG. 21. If the BNA is a receiver, the BNA may send a response to the BNA directly. This response may be relayed by an NEF if the BNA is outside of 5GS.

Step 14: Similar to Step 14 in FIG. 21.

Step 15: Similar to Step 15 in FIG. 21. The BMS1 may send a response to WTRU1 via its serving AMF (e.g., AMF1). This response may include WTRU1-ID.

Figure 31:
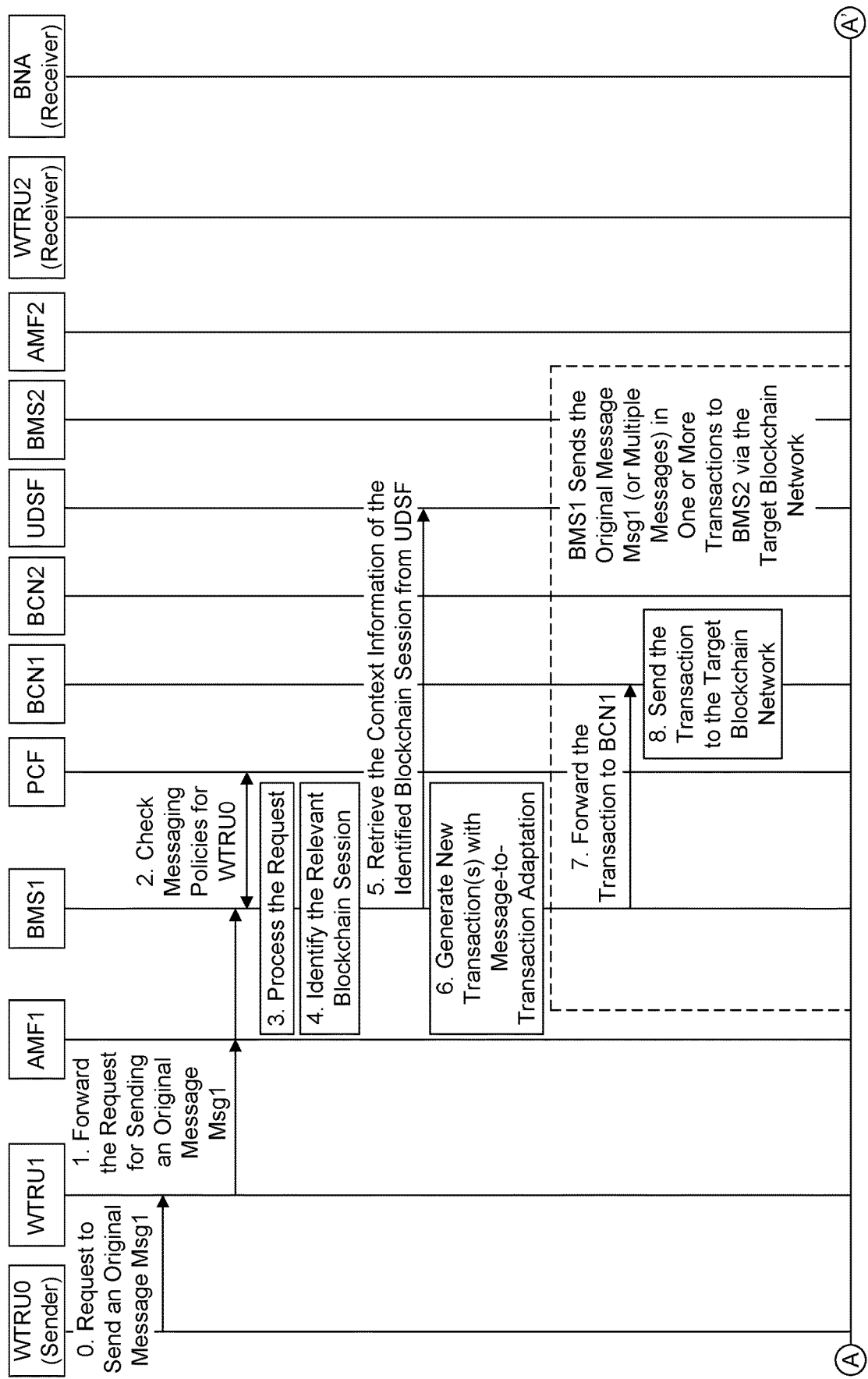
FIG. 31 illustrates an example session-based and WTRU-relayed message unicast over a blockchain network through 5GS control plane.
Figure 31:
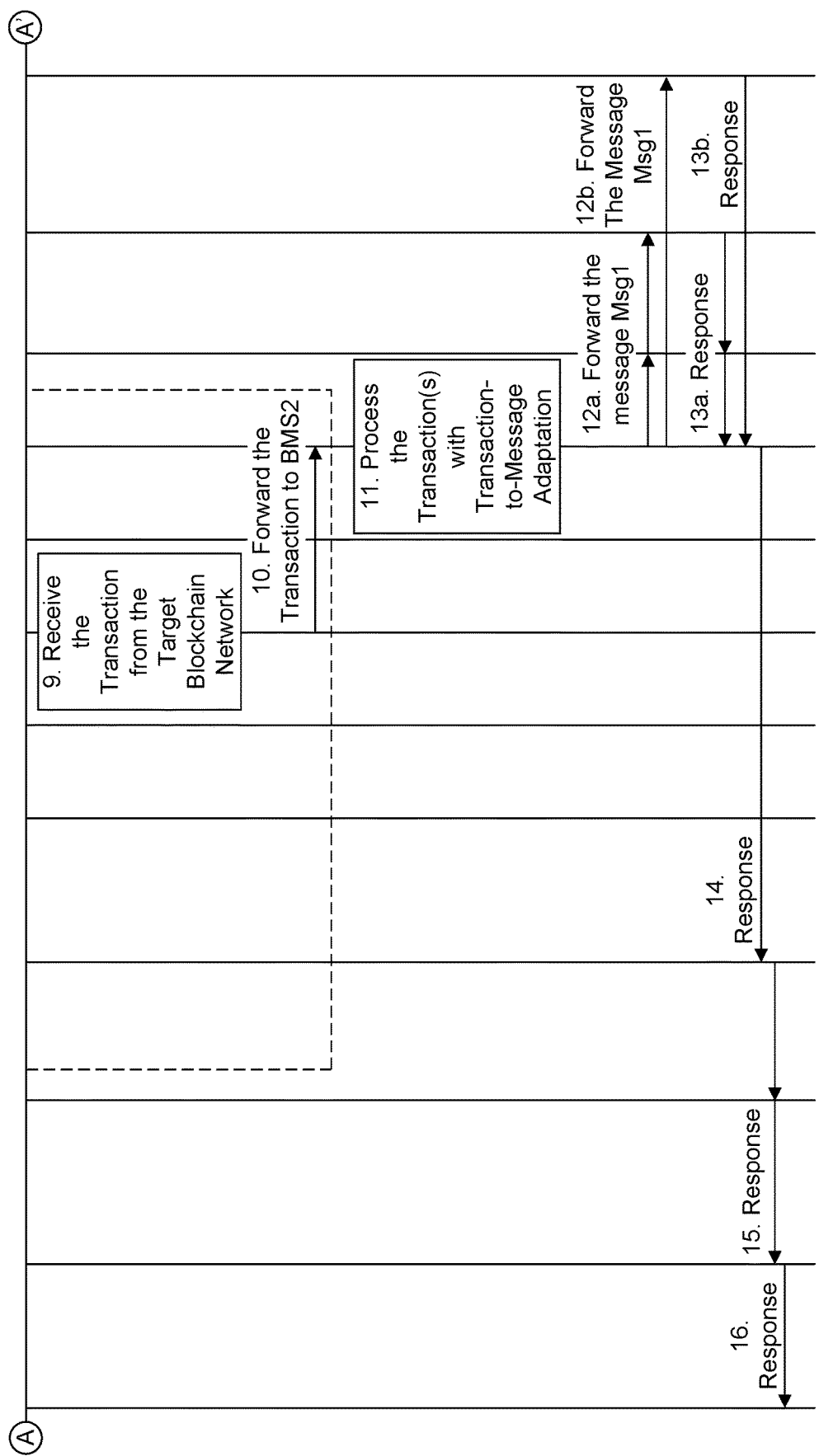

Based on FIG. 30, FIG. 31 illustrates a WTRU-relayed blockchain messaging procedure for 5GS. Compared to FIG. 30, FIG. 31 introduces the following differences.

The sender is changed from WTRU1 to WTRU0. WTRU0-ID is the identifier of WTRU0. WTRU0 may host a BCA, while WTRU1 may host a BMC. Alternatively, WTRU0 may host a BNA while WTRU1 may host a BMS.
  UE0 may send a request to WTRU1 in Step 0. This request is similar to Step 1 in FIG. 30, but needs to include WTRU0-ID. WTRU0 and WTRU1 may communicate with each other directly via 3GPP PC5 or non-3GPP connectivity (e.g., WiFi, Bluetooth, etc.).
  In Step 1, WTRU1 may send the request from Step 0 to a BMS1 via WTRU1's serving AMF (e.g., AMF). This step is similar to Step 1 in FIG. 30, but may include both WTRU1-ID and WTRU0-ID.
  Steps 2-14 are the same in both FIG. 30 and FIG. 31. They may differ in that WTRU0-ID may be used and leveraged instead of WTRU1-ID in these steps.
  In Step 15, the BMS1 may send a response to WTRU1 and WTRU1's serving AMF. This response is similar to the one in Step 15 in FIG. 30, but may include both WTRU1-ID and WTRU0-ID.
  In Step 16, WTRU1 knows WTRU0-ID from Step 15 and may send the response to WTRU0.

Figure 32:
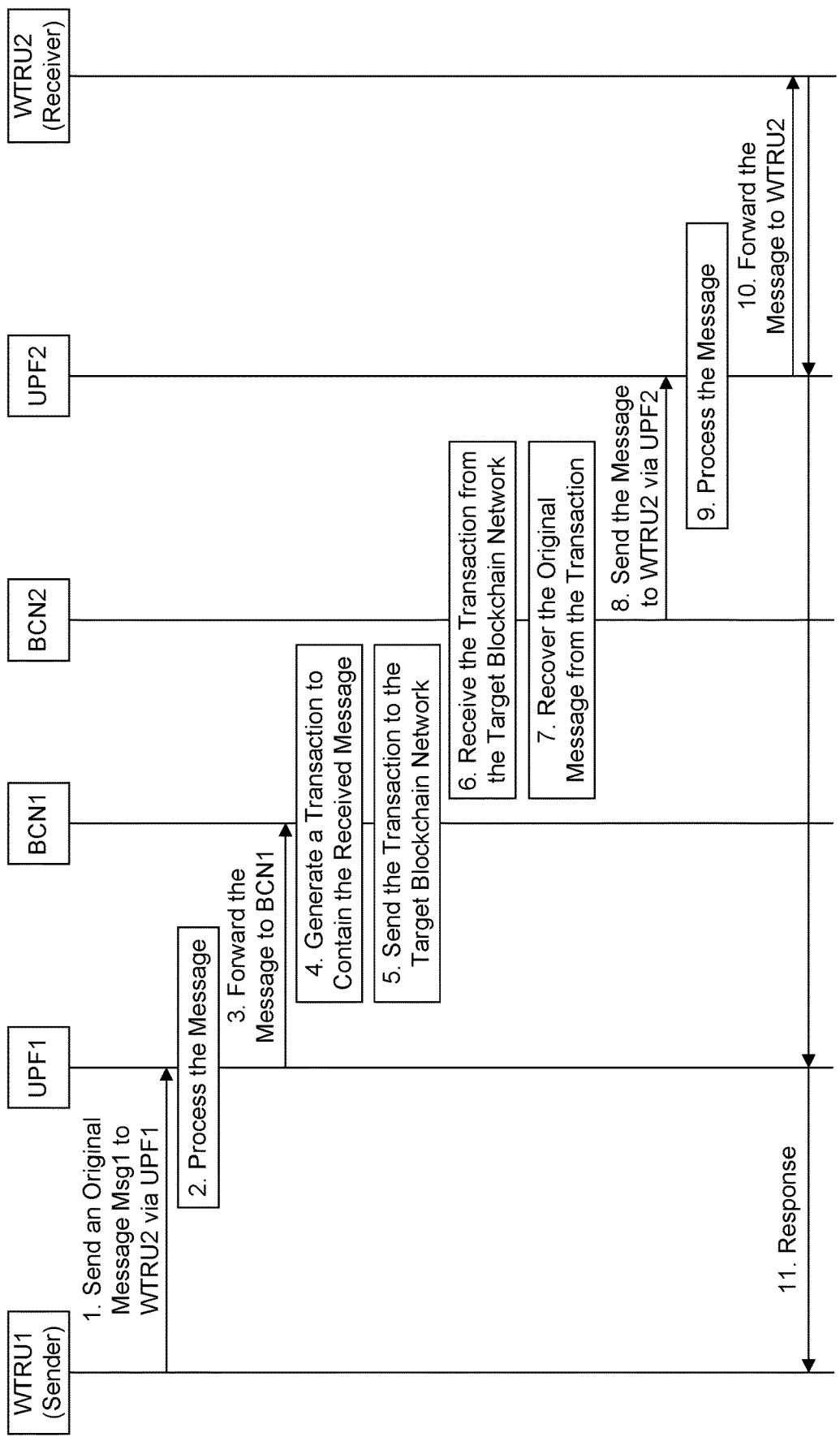
FIG. 32 illustrates an example session-based message unicast over a blockchain network through 5GS data plane.

FIG. 32 illustrates a procedure for a sender (e.g., WTRU1) to send messages to a receiver (e.g., WTRU2) using an established blockchain session over the target blockchain network through 5G data plane. A BMS1 and A BMS2 are implemented as control plane NFs (or AFs) in 5GS, while a BCN1 and a BCN2 may be implemented as AFs in 5GS or third-party functions. WTRU1 or WTRU2 may host a BCA/BMC (or a BNA).

Pre-Condition: WTRU1 and WTRU2 have established one (or multiple) blockchain sessions. In addition, based on the procedure in FIG. 29, WTRU1 has established a 3GPP PDU session towards the BCN1, and another 3GPP PDU session has been established between the BCN2 and WTRU2.

Step 1: Similar to Step 1 in FIG. 21. This request is sent towards the BCN1 over the 3GPP PDU session which WTRU1 has established via UPF1 towards the BCN1. This request may be intercepted and routed by UPF1. In addition to the parameter included in Step 1 of FIG. 21, this request may include the following parameters:
  The identifier of WTRU1 (e.g., WTRU1-ID);
  The identifier of the BCN1 (e.g., the BCN1-ID);
  The identifier of WTRU2 (e.g., WTRU2-ID); and
  The identifier of the BMS1 (e.g., a BMS1-ID) which WTRU1 has registered to and has facilitated WTRU1 to establish the blockchain session.

Step 2: UPF1 intercepts the request from Step 1. It may forward the request to the BCN1. Optionally, UPF1 may perform Step 6 in FIG. 21 to generate a preliminary transaction to include the original message.

Step 3: UPF1 may send the request to the BCN1, which may include the original message or the preliminary transaction which if UPF1 generated in Step 2. If this request includes a preliminary transaction, the BCN1 skips Step 4.

Step 4: The BCN1 may receive the request from Step 3. If this request does not include a preliminary transaction but the original message, the BCN1 performs Step 6 in FIG. 21 to generate a preliminary transaction to include the original message.

Step 5: Similar to Step 8 in FIG. 21.

Step 6: Similar to Step 9 in FIG. 21

Step 7: The BCN2 may perform Step 10 and Step 11 in FIG. 21 to recover the original message or the preliminary transaction from the received blockchain transaction. If the BCN2 only recovers the preliminary transaction, UPF2 needs to recover the original message in Step 9.

Step 8: The BCN2 may send a request towards WTRU2. This request may include the original message or the preliminary transaction as recovered in Step 7.

Step 9: UPF2 intercepts the request from Step 8. If this request only includes the original message, UPF2 just may send the request to WTRU2. Otherwise, if this request includes the preliminary transaction as sent in Step 3, UPF2 needs to first perform Step 11 in FIG. 21 to recover the original message. Then UPF2 may send the original message to WTRU2.

Step 10: WTRU2 may send a response to WTRU1, which may be routed through UPF2, the BCN2, the BCN1 and UPF1.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method implemented in a first device communicatively couplable to a first network node of a distributed ledger system, the method comprising:
   receiving (i) first information indicating a request to send a message, (ii) message contents, and (iii) second information indicating a destination for the message contents;
   determining a second device communicatively couplable to a second network node of the distributed ledger system based, at least in part, on the second information and the second device being associated with (i) the destination for the message contents and (ii) the second network node, wherein the second network node is different from the first network node;
   sending, to the second device via any of wireless and wired communications other than via the distributed ledger system, a first transmission comprising third information indicating a notification to receive the message contents for the destination;
   receiving, from the second device via any of wireless and wired communications other than via the distributed ledger system, a second transmission comprising fourth information indicating a confirmation to the notification;
   generating a digital transaction record for the message contents; and
   sending the digital transaction record to the second network node via the first network node and the distributed ledger system.

2. The method of claim 1, wherein receiving (i) first information indicating a request to send a message, (ii) message contents, and (iii) second information indicating a destination for the message contents comprises:
   receiving a third transmission from a third device via any of wired and wireless transmission media, wherein the third transmission comprises (i) the first information indicating a request to send a message, (ii) the message contents, and (iii) the second information indicating a destination for the message contents.

3. The method of claim 1, wherein the notification to receive a message comprises fifth information indicating a source of the message contents.

4. The method of claim 1, wherein the distributed ledger system comprises a plurality of network nodes, wherein the plurality of network nodes comprises the first and second network nodes, and wherein determining a second device communicatively couplable to a second network node comprises determining the second node based, at least in part, the second information, sixth information indicating the plurality of network nodes of the distributed ledger system, and seventh information indicating the second device is associated with the second network node.

5. The method of claim 1, wherein generating a digital transaction record for the message contents comprises at least one of:
generating the digital transaction record for the message contents based at least in part on one or more policy rules;
generating the digital transaction record for the message contents based at least in part on seventh information indicating a type of transaction; and
generating the digital transaction record for the message contents based at least in part on any of a type and a format for the digital transaction record.

6. The method of claim 5, comprising one of:
receiving the one or more policy rules; and
retrieving the one or more policy rules from a repository based at least in part on the second information.

7. The method of claim 6, wherein the first information comprises the seventh information.

8. The method of claim 6, comprising:
retrieving the seventh information from a repository based at least in part on ninth information indicating the source of the message contents.

9. The method of claim 4, comprising:
receiving the sixth information from the first network node or another network node of the plurality of network nodes of the distributed ledger system.

10. The method of claim 1, comprising:
receiving, from the second device via any of wireless and wired communications, eighth information indicating a status of reception of the message contents.

11. A first device communicatively couplable to a first network node of a distributed ledger system and comprising circuitry, including a transmitter, a receiver, a processor and memory, the first device configured to:
receive (i) first information indicating a request to send a message, (ii) message contents, and (iii) second information indicating a destination for the message contents;
determine a second device communicatively couplable to a second network node of the distributed ledger system based, at least in part, on the second information and the second device being associated with (i) the destination for the message contents and (ii) the second network node, wherein the second network node is different from the first network node;
send, to the second device via any of wireless and wired communications other than via the distributed ledger system, a first transmission comprising third information indicating a notification to receive the message contents for the destination;
receive, from the second device via any of wireless and wired communications other than via the distributed ledger system, a second transmission comprising fourth information indicating a confirmation to the notification;
generate a digital transaction record for the message contents; and
send the digital transaction record to the second network node via the first network node and the distributed ledger system.

12. The first device of claim 11, wherein the first device being configured to receive (i) first information indicating a request to send a message, (ii) message contents, and (iii) second information indicating a destination for the message contents comprises the first device being configured to:
receive a third transmission from a third device via any of wired and wireless transmission media, wherein the third transmission comprises (i) the first information indicating a request to send a message, (ii) the message contents, and (iii) the second information indicating a destination for the message contents.

13. The first device of claim 11, wherein the notification to receive a message comprises fifth information indicating a source of the message contents.

14. The first device of claim 11, wherein the distributed ledger system comprises a plurality of network nodes, wherein the plurality of network nodes comprises the first and second network nodes, and wherein the first device being configured to determine a second device communicatively couplable to a second network node comprises the first device being configured to determine the second node based, at least in part, the second information and sixth information indicating the plurality of network nodes of the distributed ledger system, and seventh information indicating the second device is associated with the second network node.

15. The first device of claim 11, wherein the first device being configured to generate a digital transaction record for the message contents comprises the first device being configured to generate at least one of:
the digital transaction record for the message contents based at least in part on one or more policy rules;
the digital transaction record for the message contents based at least in part on seventh information indicating a type of transaction; and
the digital transaction record for the message contents based at least in part on any of a type and a format for the digital transaction record.

16. The first device of claim 15, wherein the first device is configured to:
receive the one or more policy rules; or
retrieve the one or more policy rules from a repository based at least in part on the second information.

17. The first device of claim 16, wherein the first information comprises the seventh information.

18. The first device of claim 6, wherein the first device is configured to:
retrieve the seventh information from a repository based at least in part on ninth information indicating the source of the message contents.

19. The first device of claim 14, wherein the first device is configured to:
receive the sixth information from the first network node or another network node of the plurality of network nodes of the distributed ledger system.

20. The first device of claim 11, wherein the first device is configured to:

receive, from the second device via any of wireless and wired communications, eighth information indicating a status of reception of the message contents.

\* \* \* \* \*